(12) United States Patent
Banerjee et al.

(10) Patent No.: US 12,540,178 B2
(45) Date of Patent: *Feb. 3, 2026

(54) ANTI-ADGRE2 ANTIBODIES AND USES THEREOF

(71) Applicant: Millennium Pharmaceuticals, Inc., Cambridge, MA (US)

(72) Inventors: Antara Banerjee, Cambridge, MA (US); Xingyue He, Cambridge, MA (US); Shawn Jennings, Cambridge, MA (US)

(73) Assignee: Millennium Pharmaceuticals, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,598

(22) Filed: Apr. 25, 2022

(65) Prior Publication Data

US 2023/0018888 A1    Jan. 19, 2023

Related U.S. Application Data

(60) Provisional application No. 63/179,756, filed on Apr. 26, 2021.

(51) Int. Cl.
*C07K 16/28* (2006.01)
*A61K 39/00* (2006.01)

(52) U.S. Cl.
CPC ........ *C07K 16/28* (2013.01); *A61K 2039/505* (2013.01); *C07K 2317/24* (2013.01); *C07K 2317/565* (2013.01); *C07K 2317/622* (2013.01); *C07K 2317/94* (2013.01)

(58) Field of Classification Search
CPC .... C07K 16/10; C07K 16/28; C07K 16/2851; C07K 16/40; C07K 2317/31; C07K 2317/565; C07K 2317/622; C07K 2317/76; C07K 2319/30; C07K 2317/56; C07K 2317/569; A61P 31/14; C12N 15/79; C12N 2800/10; G01N 33/56983; G01N 2333/165; G01N 2469/10

See application file for complete search history.

(56) References Cited

U.S. PATENT DOCUMENTS

| | | |
|---|---|---|
| 2016/0053318 A1 | 2/2016 | Bonder et al. |
| 2018/0327506 A1 | 11/2018 | Karsunky et al. |
| 2023/0018888 A1 | 1/2023 | Banerjee et al. |
| 2024/0180968 A1 | 6/2024 | Gavin et al. |

FOREIGN PATENT DOCUMENTS

| | | |
|---|---|---|
| CN | 114106199 A | 3/2022 |
| WO | WO 2018/027197 A1 | 2/2018 |
| WO | 2019/213610 A1 | 11/2019 |
| WO | 2022/232016 A2 | 11/2022 |
| WO | 2022/232035 A1 | 11/2022 |
| WO | 2022/232044 A2 | 11/2022 |

OTHER PUBLICATIONS

Hamann et. al., Pharm. Reviews 67:338-367 (2015) (Year: 2015).*
Boyden et. al., N Engl J Med 374:656-663 (2016) (Year: 2016).*
Yona et. al., FAESB Journal 22:742-751 (2008) (Year: 2008).*
Shahswar et. al., Blood, 132(Suppl_1):5259 (2018) (Year: 2018).*
Reichert & Valge-Archer, Nat. Rev. Drug Disc. 2007; 6:349-356 (Year: 2007).*
Chan and Carter, Nature Reviews Immunology, 2010; 10:301-316 (Year: 2010).*
Grossbard et. al., Blood 80:863-878 (1992) (Year: 1992).*
HogenEsch and Nikitin, J Control Release, 10:183-186 (2012) (Year: 2012).*
International Search Report and Written Opinion for PCT/US22/26161, dated Sep. 30, 2022. 13 pages.
Kwakkenbos et al., "The human EGF-TM7 family member EMR2 is a heterodimeric receptor expressed on myeloid cells", Journal of Leukocyte Biology, vol. 71, May 2002, pp. 854-862.
Lewis et al., "Expression of CD11c and EMR2 on neutrophils: potential diagnostic biomarkers for sepsis and systemic inflammation", Clinical & Experimental Immunology, vol. 182, No. 2, Sep. 22, 2015 (Sep. 22, 2015 ), pp. 184-194.
Rutkowski et al., "Epidermal growth factor module-containing mucin-like receptor 2 is a newly identified adhesion G protein-coupled receptor associated with poor overall survival and an invasive phenotype in glioblastoma", Journal of Neuro-Oncology, Kluwer Academic Publishers, BO, vol. 105, No. 2, Apr. 19, 2011 (Apr. 19, 2011), pp. 165-171.
Safaee et al., "The role of epidermal growth factor-like module containing mucin-like hormone receptor 2 in human cancers", Oncology Reviews, vol. 8, No. 1, Apr. 1, 2014 (Apr. 1, 2014). 5 pages.
International Search Report for PCT/IB2021/060769 dated Feb. 14, 2024 (5 pages).
Bhudia, et al., "G Protein-Coupling of Adhesion GPCRs ADGRE2/EMR2 and ADGRE5/CD97, and Activation of G Protein Signalling by an Anti-EMR2 Antibody", Scientific Reports Nature Research, Jan. 22, 2020, 10:1004; https://doi.org/10.1038/s41598-020-57989-6 (9 pages).
Dondelinger, et al., "Understanding the Significance and Implications of Antibody Numbering and Antigen-Binding Surface/Residue Definition", Frontiers in Immunology, Oct. 16, 2018; vol. 9, doi:10.3389/fimmu.2018.02278, pp. 1-15 (15 pages), XP055572450 DOI: http://dx.doi.org/10.3389/fimmu.2018.02278.
Kussie, et al., "A Single Engineered Amino Acid Substitution Changes Antibody Specificity", The Journal of Immunology, Jan. 1, 1994; 152 (1): pp. 146-152 (8 pages); https://doi.org/10.4049/jimmunol.152.1.146.

(Continued)

*Primary Examiner* — Julie Wu
*Assistant Examiner* — Francesca Edgingtongiordan
(74) *Attorney, Agent, or Firm* — Proskauer Rose LLP

(57) ABSTRACT

Antibodies, fragments thereof and fusion proteins that specifically bind to ADGRE2, are described, as well as methods of making and using such antibodies. Such antibodies, fusion proteins and fragments thereof are useful for the treatment and diagnosis of various autoimmune diseases and cancers, including, for example, acute myeloid leukemia.

8 Claims, 6 Drawing Sheets

Specification includes a Sequence Listing.

(56) References Cited

OTHER PUBLICATIONS

Liu, et al., "Fine Mapping of the Antigen-Antibody Interaction of Scfv215, a Recombinant Antibody Inhibiting RNA Polymerase II from *Drosophila melanogaster*", Journal of Molecular Recognition; Mar.-Apr. 1999;12(2):103-11. DOI: 10.1002/(SICI)1099-1352(199903/04)12:2<103:AID-JMR447>3.0.CO;2-B.

Panka, et al., "Variable Region Framework Differences Result in Decreased or Increased Affinity of Variant Anti-digoxin Antibodies", Proceedings of the National Academy of Sciences of the United States of America; vol. 85, May 1988, pp. 3080-3084 (4 pages), Immunology; 85(9):3080-4. DOI: 10.1073/pnas.85.9.3080.

Rudikoff et al., "Single Amino Acid Substitution Altering Antigen-Binding Specificity", Proceedings of the National Academy of Sciences, National Academy of Sciences, vol. 79, No. 6, Mar. 1, 1982, pp. 1979-1983, XP002683593, ISSN: 0027-8424, DOI: 10.1073/PNAS.79.6.1979 (5 pages).

Sela-Culang, et al., "The Structural Basis of Antibody-Antigen Recognition", Frontiers in Immunology, Oct. 8, 2013, vol. 4, doi:10.3389/fimmu.2013.00302, XP055557261 DOI: http://dx.doi.org/10.3389/fimmu.2013.00302; pp. 1-13 (13 pages).

Wong, et al., "Structural Requirements for a Specificity Switch and for Maintenance of Affinity Using Mutational Analysis of a Phage-Displayed Anti-Arsonate Antibody of Fab Heavy Chain First Complementarity-Determining Region", The Journal of Immunology, Jun. 15, 1998, 160 (12): pp. 5990-5997 (9 pages); https://doi.org/10.4049/jimmunol.160.12.5990; pp. 5990-5997.

Xiang, et al., "Modification in Framework Region I Results in a Decreased Affinity of Chimeric Anti-TAG72 Antibody". Mol Immunol. Jan.-Feb. 1991;28(1-2):141-8. DOI: 10.1016/0161-5890(91)90097-4.

* cited by examiner

|  |  | # residues changed from mouse query | # residues different from germline or mat. consensus |
|---|---|---|---|
| IGHV1-46*01 | Germline-Low risk | 9 | 17 |
|  | Germline-LM risk | 15 | 11 |
|  | Germline-LMH risk | 18 | 7 |
|  | Germline graft | 26 | 0 |
| IGHV1-3*01 | Germline Low risk | 9 | 15 |
|  | Germline LM risk | 16 | 8 |
| IGHV1-2*01 | Germline Low risk | 11 | 12 |
|  | Germline LM risk | 17 | 6 |

FIG. 1

|  |  | # residues changed from mouse query | # residues different from germline or mat. consensus |
|---|---|---|---|
| IGKV3D-20*01 | Germline-Low risk | 14 | 12 |
|  | Germline-LM risk | 18 | 8 |
|  |  |  |  |
| IGKV3-11*01 | Germline Low risk | 13 | 12 |
|  | Germline LM risk | 17 | 8 |
| IGKV6D-41-2 | Germline Low risk | 11 | 5 |
|  | Germline LM risk | 14 | 2 |

FIG. 2

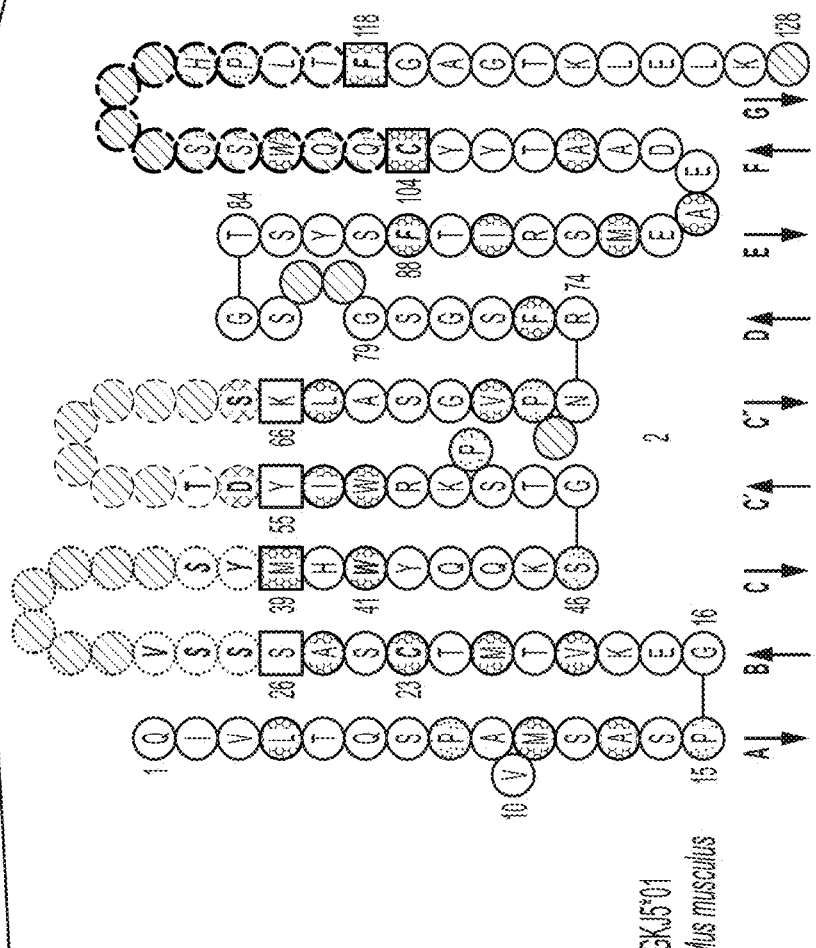

SEQUENCE LISTING

<160> NUMBER OF SEQ ID NOS: 47

<210> SEQ ID NO 1
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 1

Gly Tyr Thr Phe Thr Asn Tyr Trp
1               5

<210> SEQ ID NO 2
<211> LENGTH: 8
<212> TYPE: PRT
<213> ORGANISM: Artificial Sequence
<220> FEATURE:

```
<223> OTHER INFORMATION: Description of Artificial Sequence: Synthetic
      peptide

<400> SEQUENCE: 2

Val Tyr Pro Gly Asp Gly Asp Thr
1               5

<210> SEQ ID NO 3
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Ala Arg Gly Phe Thr Ala Tyr Gly Met Asp Tyr
1               5                   10

<210> SEQ ID NO 4
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Ser Ser Val Ser Tyr
1               5

<210> SEQ ID NO 5
<211> LENGTH: 3
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Asp Thr Ser
1

<210> SEQ ID NO 6
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Gln Gln Trp Ser Ser Asn Pro Leu Thr
1               5

<210> SEQ ID NO 7
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 7

Gln Val Gln Leu Gln Gln Ser Gly Ala Glu Val Ala Lys Pro Gly Ala
1               5                   10                  15

Ser Val Lys Leu Ser Cys Lys Ala Ser Gly Tyr Thr Phe Thr Asn Tyr
```

```
                  20                  25                  30

Trp Met Gln Trp Ile Lys Gln Ala Pro Gly Gln Gly Leu Glu Trp Ile
                35                  40                  45

Gly Ala Val Tyr Pro Gly Asp Gly Asp Thr Arg His Thr Gln Lys Phe
         50                  55                  60

Lys Gly Lys Ala Thr Leu Thr Ala Asp Lys Ser Thr Ser Thr Ala Tyr
 65                  70                  75                  80

Met Glu Val Ser Ser Leu Arg Ser Glu Asp Thr Ala Val Tyr Tyr Cys
                 85                  90                  95

Ala Arg Gly Phe Thr Ala Tyr Gly Met Asp Tyr Trp Gly Gln Gly Thr
             100                 105                 110

Thr Val Thr Val Ser Ser
         115

<210> SEQ ID NO 8
<211> LENGTH: 106
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 8

Glu Ile Val Leu Thr Gln Ser Pro Ala Thr Leu Ser Leu Ser Pro Gly
  1               5                  10                  15

Glu Arg Ala Thr Leu Ser Cys Ser Ala Ser Ser Ser Val Ser Tyr Met
                 20                  25                  30

His Trp Tyr Gln Gln Lys Pro Gly Leu Ala Pro Arg Leu Leu Ile Tyr
             35                  40                  45

Asp Thr Ser Lys Leu Ala Ser Gly Ile Pro Ala Arg Phe Ser Gly Ser
         50                  55                  60

Gly Ser Gly Thr Asp Phe Thr Leu Thr Ile Ser Arg Leu Glu Pro Glu
 65                  70                  75                  80

Asp Phe Ala Val Tyr Tyr Cys Gln Gln Trp Ser Ser Asn Pro Leu Thr
                 85                  90                  95

Phe Gly Gln Gly Thr Lys Val Glu Ile Lys
            100                 105

<210> SEQ ID NO 9
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 9

Gln Val Gln Leu Gln Gln Ser Gly Ala Glu Val Lys Lys Pro Gly Ala
  1               5                  10                  15

Ser Val Lys Leu Ser Cys Lys Ala Ser Gly Tyr Thr Phe Thr Asn Tyr
                 20                  25                  30

Trp Met Gln Trp Ile Arg Gln Ala Pro Gly Gln Gly Leu Glu Trp Ile
             35                  40                  45

Gly Ala Val Tyr Pro Gly Asp Gly Asp Thr Arg Tyr Thr Gln Lys Phe
         50                  55                  60

Gln Gly Arg Ala Thr Leu Thr Ala Asp Thr Ser Ile Ser Thr Ala Tyr
 65                  70                  75                  80

Met Glu Val Ser Arg Leu Arg Ser Asp Asp Thr Ala Val Tyr Tyr Cys
```

Ala Arg Gly Phe Thr Ala Tyr Gly Met Asp Tyr Trp Gly Gln Gly Thr
            100                 105                 110

Thr Val Thr Val Ser Ser
        115

<210> SEQ ID NO 10
<211> LENGTH: 106
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 10

Glu Ile Val Leu Thr Gln Ser Pro Ala Thr Met Ser Ala Ser Pro Gly
1               5                   10                  15

Glu Arg Val Thr Met Ser Cys Ser Ala Ser Ser Val Ser Tyr Met
            20                  25                  30

His Trp Tyr Gln Gln Lys Ser Gly Leu Ser Pro Lys Arg Trp Ile Tyr
        35                  40                  45

Asp Thr Ser Lys Leu Ala Ser Gly Val Pro Arg Phe Ser Gly Ser
 50                  55                  60

Gly Ser Gly Thr Asp Tyr Thr Phe Thr Ile Ser Arg Met Glu Pro Glu
65                  70                  75                  80

Asp Phe Ala Thr Tyr Tyr Cys Gln Gln Trp Ser Ser Asn Pro Leu Thr
            85                  90                  95

Phe Gly Gly Gly Thr Lys Leu Glu Ile Lys
        100                 105

<210> SEQ ID NO 11
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 11

Gln Val Gln Leu Gln Gln Ser Gly Ala Glu Val Lys Lys Pro Gly Ala
1               5                   10                  15

Ser Val Lys Leu Ser Cys Lys Ala Ser Gly Tyr Thr Phe Thr Asn Tyr
            20                  25                  30

Trp Met Gln Trp Val Arg Gln Ala Pro Gly Gln Gly Leu Glu Trp Ile
        35                  40                  45

Gly Ala Val Tyr Pro Gly Asp Gly Asp Thr Arg Tyr Thr Gln Lys Phe
    50                  55                  60

Gln Gly Arg Ala Thr Leu Thr Ala Asp Thr Ser Thr Ser Thr Val Tyr
65                  70                  75                  80

Met Glu Val Ser Ser Leu Arg Ser Glu Asp Thr Ala Val Tyr Tyr Cys
            85                  90                  95

Ala Arg Gly Phe Thr Ala Tyr Gly Met Asp Tyr Trp Gly Gln Gly Thr
            100                 105                 110

Thr Val Thr Val Ser Ser
        115

<210> SEQ ID NO 12
<211> LENGTH: 106
<212> TYPE: PRT

<213> ORGANISM: Artificial Sequence
<220> FEATURE:
<223> OTHER INFORMATION: Description of Artificial Sequence: Synthetic
      polypeptide

<400> SEQUENCE: 12

Glu Ile Val Leu Thr Gln Ser Pro Ala Thr Met Ser Ala Ser Pro Gly
1               5                   10                  15

Glu Arg Val Thr Met Ser Cys Ser Ala Ser Ser Ser Val Ser Tyr Met
            20                  25                  30

His Trp Tyr Gln Gln Lys Ser Gly Leu Ser Pro Lys Arg Trp Ile Tyr
        35                  40                  45

Asp Thr Ser Lys Leu Ala Ser Gly Val Pro Asp Arg Phe Ser Gly Ser
    50                  55                  60

Gly Ser Gly Thr Asp Tyr Thr Phe Thr Ile Ser Arg Met Glu Pro Glu
65                  70                  75                  80

Asp Phe Ala Thr Tyr Tyr Cys Gln Gln Trp Ser Ser Asn Pro Leu Thr
                85                  90                  95

Phe Gly Gly Gly Thr Lys Leu Glu Ile Lys
            100                 105

<210> SEQ ID NO 13
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 13

Gln Val Gln Leu Gln Gln Ser Gly Ala Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Trp Met Gln Trp Val Arg Gln Ala Pro Gly Gln Gly Leu Glu Trp Met
        35                  40                  45

Gly Ala Val Tyr Pro Gly Asp Gly Asp Thr Arg His Thr Gln Lys Phe
    50                  55                  60

Lys Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Phe Thr Ala Tyr Gly Met Asp Tyr Trp Gly Gln Gly Thr
            100                 105                 110

Leu Val Thr Val Ser Ser
        115

<210> SEQ ID NO 14
<211> LENGTH: 106
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 14

Glu Ile Val Leu Thr Gln Ser Pro Ala Thr Met Ser Ala Ser Pro Gly
1               5                   10                  15

Glu Arg Val Thr Met Ser Cys Ser Ala Ser Ser Ser Val Ser Tyr Met
            20                  25                  30

His Trp Tyr Gln Gln Lys Ser Gly Gln Ser Pro Lys Arg Trp Ile Tyr
            35                  40                  45

Asp Thr Ser Lys Leu Ala Ser Gly Val Pro Ala Arg Phe Ser Gly Ser
        50                  55                  60

Gly Ser Gly Thr Asp Tyr Thr Phe Thr Ile Ser Ser Met Glu Pro Glu
65                  70                  75                  80

Asp Phe Ala Thr Tyr Tyr Cys Gln Gln Trp Ser Ser Asn Pro Leu Thr
                85                  90                  95

Phe Gly Gly Gly Thr Lys Leu Glu Ile Lys
            100                 105

<210> SEQ ID NO 15
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 15

Gln Val Gln Leu Gln Gln Ser Gly Ala Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Trp Met Gln Trp Val Arg Gln Ala Pro Gly Gln Gly Leu Glu Trp Ile
        35                  40                  45

Gly Ala Val Tyr Pro Gly Asp Gly Asp Thr Arg His Thr Gln Lys Phe
50                  55                  60

Lys Gly Arg Val Thr Met Thr Ala Asp Lys Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Phe Thr Ala Tyr Gly Met Asp Tyr Trp Gly Gln Gly Thr
            100                 105                 110

Leu Val Thr Val Ser Ser
        115

<210> SEQ ID NO 16
<211> LENGTH: 106
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 16

Gln Ile Val Leu Thr Gln Ser Pro Ala Thr Leu Ser Leu Ser Pro Gly
1               5                   10                  15

Glu Arg Ala Thr Leu Thr Cys Ser Ala Ser Ser Val Ser Tyr Met
            20                  25                  30

His Trp Tyr Gln Gln Lys Pro Gly Leu Ser Pro Lys Arg Trp Ile Tyr
        35                  40                  45

Asp Thr Ser Lys Leu Ala Ser Gly Val Pro Asp Arg Phe Ser Gly Ser
        50                  55                  60

Gly Ser Gly Thr Asp Tyr Thr Phe Thr Ile Arg Arg Leu Glu Pro Glu
65                  70                  75                  80

Asp Phe Ala Thr Tyr Tyr Cys Gln Gln Trp Ser Ser Asn Pro Leu Thr
                85                  90                  95

```
<210> SEQ ID NO 17
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Gln Val Gln Leu Gln Gln Ser Gly Ala Glu Val Lys Lys Pro Gly Ala
1               5                   10                  15

Ser Val Lys Leu Ser Cys Lys Ala Ser Gly Tyr Thr Phe Thr Asn Tyr
            20                  25                  30

Trp Met Gln Trp Ile Arg Gln Ala Pro Gly Gln Gly Leu Glu Trp Ile
        35                  40                  45

Gly Ala Val Tyr Pro Gly Asp Gly Asp Thr Arg Tyr Thr Gln Lys Phe
    50                  55                  60

Gln Gly Arg Ala Thr Leu Thr Ala Asp Thr Ser Thr Ser Thr Ala Tyr
65                  70                  75                  80

Met Glu Val Ser Ser Leu Arg Ser Glu Asp Thr Ala Val Tyr Tyr Cys
                85                  90                  95

Ala Arg Gly Phe Thr Ala Tyr Gly Met Asp Tyr Trp Gly Gln Gly Thr
            100                 105                 110

Thr Val Thr Val Ser Ser
        115

<210> SEQ ID NO 18
<211> LENGTH: 106
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Glu Ile Val Leu Thr Gln Ser Pro Ala Thr Leu Ser Ala Ser Pro Gly
1               5                   10                  15

Glu Arg Val Thr Met Ser Cys Ser Ala Ser Ser Val Ser Tyr Met
            20                  25                  30

His Trp Tyr Gln Gln Lys Pro Gly Leu Ala Pro Arg Arg Trp Ile Tyr
        35                  40                  45

Asp Thr Ser Lys Leu Ala Ser Gly Val Pro Asp Arg Phe Ser Gly Ser
    50                  55                  60

Gly Ser Gly Thr Asp Tyr Thr Phe Thr Ile Ser Arg Met Glu Pro Glu
65                  70                  75                  80

Asp Phe Ala Thr Tyr Tyr Cys Gln Gln Trp Ser Ser Asn Pro Leu Thr
                85                  90                  95

Phe Gly Gly Gly Thr Lys Leu Glu Ile Lys
            100                 105

<210> SEQ ID NO 19
<211> LENGTH: 239
<212> TYPE: PRT
<213> ORGANISM: Artificial Sequence
<220> FEATURE:
<223> OTHER INFORMATION: Description of Artificial Sequence: Synthetic
      polypeptide
```

<400> SEQUENCE: 19

```
Gln Val Gln Leu Gln Gln Ser Gly Ala Glu Val Ala Lys Pro Gly Ala
1               5                   10                  15

Ser Val Lys Leu Ser Cys Lys Ala Ser Gly Tyr Thr Phe Thr Asn Tyr
            20                  25                  30

Trp Met Gln Trp Ile Lys Gln Ala Pro Gly Gln Gly Leu Glu Trp Ile
        35                  40                  45

Gly Ala Val Tyr Pro Gly Asp Gly Asp Thr Arg His Thr Gln Lys Phe
    50                  55                  60

Lys Gly Lys Ala Thr Leu Thr Ala Asp Lys Ser Thr Ser Thr Ala Tyr
65                  70                  75                  80

Met Glu Val Ser Ser Leu Arg Ser Glu Asp Thr Ala Val Tyr Tyr Cys
                85                  90                  95

Ala Arg Gly Phe Thr Ala Tyr Gly Met Asp Tyr Trp Gly Gln Gly Thr
            100                 105                 110

Thr Val Thr Val Ser Ser Gly Gly Gly Ser Gly Gly Gly Gly Ser
        115                 120                 125

Gly Gly Gly Gly Ser Glu Ile Val Leu Thr Gln Ser Pro Ala Thr Met
130                 135                 140

Ser Ala Ser Pro Gly Glu Arg Val Thr Met Ser Cys Ser Ala Ser Ser
145                 150                 155                 160

Ser Val Ser Tyr Met His Trp Tyr Gln Gln Lys Ser Gly Gln Ser Pro
                165                 170                 175

Lys Arg Trp Ile Tyr Asp Thr Ser Lys Leu Ala Ser Gly Val Pro Ala
            180                 185                 190

Arg Phe Ser Gly Ser Gly Ser Gly Thr Asp Tyr Thr Phe Thr Ile Ser
        195                 200                 205

Ser Met Glu Pro Glu Asp Phe Ala Thr Tyr Tyr Cys Gln Gln Trp Ser
    210                 215                 220

Ser Asn Pro Leu Thr Phe Gly Gly Gly Thr Lys Leu Glu Ile Lys
225                 230                 235
```

<210> SEQ ID NO 20
<211> LENGTH: 239
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 20

```
Gln Val Gln Leu Gln Gln Ser Gly Ala Glu Val Lys Lys Pro Gly Ala
1               5                   10                  15

Ser Val Lys Leu Ser Cys Lys Ala Ser Gly Tyr Thr Phe Thr Asn Tyr
            20                  25                  30

Trp Met Gln Trp Ile Arg Gln Ala Pro Gly Gln Gly Leu Glu Trp Ile
        35                  40                  45

Gly Ala Val Tyr Pro Gly Asp Gly Asp Thr Arg Tyr Thr Gln Lys Phe
    50                  55                  60

Gln Gly Arg Ala Thr Leu Thr Ala Asp Thr Ser Ile Ser Thr Ala Tyr
65                  70                  75                  80

Met Glu Val Ser Arg Leu Arg Ser Asp Asp Thr Ala Val Tyr Tyr Cys
                85                  90                  95

Ala Arg Gly Phe Thr Ala Tyr Gly Met Asp Tyr Trp Gly Gln Gly Thr
            100                 105                 110
```

```
Thr Val Thr Val Ser Ser Gly Gly Gly Ser Gly Gly Gly Ser
            115                 120                 125

Gly Gly Gly Gly Ser Glu Ile Val Leu Thr Gln Ser Pro Ala Thr Met
130                 135                 140

Ser Ala Ser Pro Gly Glu Arg Val Thr Met Ser Cys Ser Ala Ser Ser
145                 150                 155                 160

Ser Val Ser Tyr Met His Trp Tyr Gln Gln Lys Ser Gly Leu Ser Pro
                165                 170                 175

Lys Arg Trp Ile Tyr Asp Thr Ser Lys Leu Ala Ser Gly Val Pro Asp
                180                 185                 190

Arg Phe Ser Gly Ser Gly Ser Gly Thr Asp Tyr Thr Phe Thr Ile Ser
            195                 200                 205

Arg Met Glu Pro Glu Asp Phe Ala Thr Tyr Tyr Cys Gln Gln Trp Ser
210                 215                 220

Ser Asn Pro Leu Thr Phe Gly Gly Gly Thr Lys Leu Glu Ile Lys
225                 230                 235
```

<210> SEQ ID NO 21
<211> LENGTH: 239
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 21

```
Gln Val Gln Leu Gln Gln Ser Gly Ala Glu Val Lys Lys Pro Gly Ala
1               5                   10                  15

Ser Val Lys Leu Ser Cys Lys Ala Ser Gly Tyr Thr Phe Thr Asn Tyr
                20                  25                  30

Trp Met Gln Trp Val Arg Gln Ala Pro Gly Gln Gly Leu Glu Trp Ile
            35                  40                  45

Gly Ala Val Tyr Pro Gly Asp Gly Asp Thr Arg Tyr Thr Gln Lys Phe
50                  55                  60

Gln Gly Arg Ala Thr Leu Thr Ala Asp Thr Ser Thr Ser Thr Val Tyr
65                  70                  75                  80

Met Glu Val Ser Ser Leu Arg Ser Glu Asp Thr Ala Val Tyr Tyr Cys
                85                  90                  95

Ala Arg Gly Phe Thr Ala Tyr Gly Met Asp Tyr Trp Gly Gln Gly Thr
            100                 105                 110

Thr Val Thr Val Ser Ser Gly Gly Gly Ser Gly Gly Gly Ser
            115                 120                 125

Gly Gly Gly Gly Ser Glu Ile Val Leu Thr Gln Ser Pro Ala Thr Met
130                 135                 140

Ser Ala Ser Pro Gly Glu Arg Val Thr Met Ser Cys Ser Ala Ser Ser
145                 150                 155                 160

Ser Val Ser Tyr Met His Trp Tyr Gln Gln Lys Ser Gly Leu Ser Pro
                165                 170                 175

Lys Arg Trp Ile Tyr Asp Thr Ser Lys Leu Ala Ser Gly Val Pro Asp
                180                 185                 190

Arg Phe Ser Gly Ser Gly Ser Gly Thr Asp Tyr Thr Phe Thr Ile Ser
            195                 200                 205

Arg Met Glu Pro Glu Asp Phe Ala Thr Tyr Tyr Cys Gln Gln Trp Ser
210                 215                 220

Ser Asn Pro Leu Thr Phe Gly Gly Gly Thr Lys Leu Glu Ile Lys
```

<210> SEQ ID NO 22
<211> LENGTH: 242
<212> TYPE: PRT
<213> ORGANISM: Artificial Sequence
<220> FEATURE:
<223> OTHER INFORMATION: Description of Artificial Sequence: Synthetic
polypeptide

<400> SEQUENCE: 22

```
Gln Val Gln Leu Gln Gln Ser Gly Ala Glu Val Lys Lys Pro Gly Ala
1               5                   10                  15
Ser Val Lys Val Ser Cys Lys Ala Ser Gly Tyr Thr Phe Thr Asn Tyr
            20                  25                  30
Trp Met Gln Trp Val Arg Gln Ala Pro Gly Gln Gly Leu Glu Trp Met
        35                  40                  45
Gly Ala Val Tyr Pro Gly Asp Gly Asp Thr Arg His Thr Gln Lys Phe
    50                  55                  60
Lys Gly Arg Val Thr Met Thr Arg Asp Thr Ser Ser Thr Val Tyr
65                  70                  75                  80
Met Glu Leu Ser Ser Leu Arg Ser Glu Asp Thr Ala Val Tyr Tyr Cys
                85                  90                  95
Ala Arg Gly Phe Thr Ala Tyr Gly Met Asp Tyr Trp Gly Gln Gly Thr
            100                 105                 110
Leu Val Thr Val Ser Ser Ala Ser Thr Gly Gly Gly Ser Gly Gly
        115                 120                 125
Gly Gly Ser Gly Gly Gly Ser Glu Ile Val Leu Thr Gln Ser Pro
    130                 135                 140
Ala Thr Leu Ser Leu Ser Pro Gly Glu Arg Ala Thr Leu Ser Cys Ser
145                 150                 155                 160
Ala Ser Ser Ser Val Ser Tyr Met His Trp Tyr Gln Gln Lys Pro Gly
                165                 170                 175
Leu Ala Pro Arg Leu Leu Ile Tyr Asp Thr Ser Lys Leu Ala Ser Gly
            180                 185                 190
Ile Pro Asp Arg Phe Ser Gly Ser Gly Ser Gly Thr Asp Phe Thr Leu
        195                 200                 205
Thr Ile Ser Arg Leu Glu Pro Glu Asp Phe Ala Val Tyr Tyr Cys Gln
    210                 215                 220
Gln Trp Ser Ser Asn Pro Leu Thr Phe Gly Gln Gly Thr Lys Val Glu
225                 230                 235                 240
Ile Lys
```

<210> SEQ ID NO 23

<400> SEQUENCE: 23

000

<210> SEQ ID NO 24
<211> LENGTH: 15
<212> TYPE: PRT
<213> ORGANISM: Artificial Sequence
<220> FEATURE:
<223> OTHER INFORMATION: Description of Artificial Sequence: Synthetic
peptide

<400> SEQUENCE: 24

Gly Gly Gly Gly Ser Gly Gly Gly Gly Ser Gly Gly Gly Gly Ser

<210> SEQ ID NO 25
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Gly Gly Gly Gly Ser Gly Gly Gly Ser Gly Gly Gly Ser Gly Gly
1               5                   10                  15

Gly Gly Ser

<210> SEQ ID NO 26
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

Gly Gly Gly Gly Ser Gly Gly Gly Gly Ser Gly Gly Gly Gly Ser Gly
1               5                   10                  15

Gly Gly Ser Gly Gly Gly Gly Ser
            20

<210> SEQ ID NO 27
<211> LENGTH: 29
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 27

Gly Gly Gly Gly Ser Gly Gly Gly Ser Gly Gly Gly Gly Ser Gly
1               5                   10                  15

Gly Gly Gly Ser Gly Gly Gly Ser Gly Gly Gly Gly Ser
            20                  25

<210> SEQ ID NO 28
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

Met Asp Met Arg Val Pro Ala Gln Leu Leu Gly Leu Leu Leu Leu Trp
1               5                   10                  15

Leu Pro Asp Thr Arg Cys
            20

<210> SEQ ID NO 29
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

```
Met Glu Phe Gly Leu Ser Trp Val Phe Leu Val Ala Leu Leu Arg Gly
1               5                   10                  15

Val Gln Cys

<210> SEQ ID NO 30
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 30

Gln Val Gln Leu Val Gln Ser Gly Ala Glu Val Ala Lys Pro Gly Ala
1               5                   10                  15

Ser Val Lys Leu Ser Cys Lys Ala Ser Gly Tyr Thr Phe Thr Asn Tyr
            20                  25                  30

Trp Met Gln Trp Ile Lys Gln Ala Pro Gly Gln Gly Leu Glu Trp Ile
        35                  40                  45

Gly Ala Val Tyr Pro Gly Asp Gly Asp Thr Arg His Thr Gln Lys Phe
    50                  55                  60

Lys Gly Lys Ala Thr Leu Thr Ala Asp Lys Ser Thr Ser Thr Ala Tyr
65                  70                  75                  80

Met Glu Val Ser Ser Leu Arg Ser Glu Asp Thr Ala Val Tyr Tyr Cys
                85                  90                  95

Ala Arg Gly Phe Thr Ala Tyr Gly Met Asp Tyr Trp Gly Gln Gly Thr
            100                 105                 110

Thr Val Thr Val Ser Ser
        115

<210> SEQ ID NO 31
<211> LENGTH: 106
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

Glu Ile Val Leu Thr Gln Ser Pro Ala Thr Met Ser Ala Ser Pro Gly
1               5                   10                  15

Glu Arg Val Thr Met Ser Cys Ser Ala Ser Ser Ser Val Ser Tyr Met
            20                  25                  30

His Trp Tyr Gln Gln Lys Ser Gly Gln Ser Pro Lys Arg Trp Ile Tyr
        35                  40                  45

Asp Thr Ser Lys Leu Ala Ser Gly Val Pro Ala Arg Phe Ser Gly Ser
    50                  55                  60

Gly Ser Gly Thr Asp Tyr Thr Phe Thr Ile Ser Ser Met Glu Pro Glu
65                  70                  75                  80

Asp Phe Ala Thr Tyr Tyr Cys Gln Gln Trp Ser Ser Asn Pro Leu Thr
                85                  90                  95

Phe Gly Gly Gly Thr Lys Leu Glu Ile Lys
            100                 105

<210> SEQ ID NO 32
<211> LENGTH: 18
<212> TYPE: PRT
<213> ORGANISM: Artificial Sequence
<220> FEATURE:
```

<223> OTHER INFORMATION: Description of Artificial Sequence: Synthetic
      peptide

<400> SEQUENCE: 32

Met Ala Leu Pro Val Thr Ala Leu Leu Leu Pro Leu Ala Leu Leu Leu
1               5                   10                  15

His Ala

<210> SEQ ID NO 33
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 33

Met Glu Thr Asp Thr Leu Leu Leu Trp Val Leu Leu Leu Trp Val Pro
1               5                   10                  15

Gly Ser Thr Gly
            20

<210> SEQ ID NO 34
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 34

Met Tyr Arg Met Gln Leu Leu Ser Cys Ile Ala Leu Ser Leu Ala Leu
1               5                   10                  15

Val Thr Asn Ser
            20

<210> SEQ ID NO 35
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 35

Met Glu Thr Pro Ala Gln Leu Leu Phe Leu Leu Leu Leu Trp Leu Pro
1               5                   10                  15

Asp Thr Thr Gly
            20

<210> SEQ ID NO 36
<211> LENGTH: 21
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 36

Met Ala Leu Pro Val Thr Ala Leu Leu Leu Pro Leu Ala Leu Leu Leu
1               5                   10                  15

His Ala Ala Arg Pro
            20

```
<210> SEQ ID NO 37
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 37

Met Lys Trp Val Thr Phe Ile Ser Leu Leu Phe Ser Ser Ala Tyr Ser
1               5                   10                  15

<210> SEQ ID NO 38
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 38

Met Asp Ser Lys Gly Ser Ser Gln Lys Gly Ser Arg Leu Leu Leu Leu
1               5                   10                  15

Leu Val Val Ser Asn Leu Leu Leu Cys Gln Gly Val Val Ser
            20                  25                  30

<210> SEQ ID NO 39
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 39

Gln Val Gln Leu Gln Gln Ser Gly Ala Glu Leu Ala Arg Pro Gly Ala
1               5                   10                  15

Ser Val Lys Leu Ser Cys Lys Ala Ser Gly Tyr Thr Phe Thr Asn Tyr
            20                  25                  30

Trp Met Gln Trp Ile Lys Gln Arg Pro Gly Gln Gly Leu Glu Trp Ile
        35                  40                  45

Gly Ala Val Tyr Pro Gly Asp Gly Asp Thr Arg His Thr Gln Lys Phe
    50                  55                  60

Lys Gly Lys Ala Thr Leu Thr Ala Asp Lys Ser Ser Ser Thr Ala Tyr
65                  70                  75                  80

Met Gln Val Ser Ser Leu Ala Ser Glu Asp Ser Ala Val Tyr Tyr Cys
                85                  90                  95

Ala Arg Gly Phe Thr Ala Tyr Gly Met Asp Tyr Trp Gly Gln Gly Thr
            100                 105                 110

Ser Val Thr Val Ser Ser
        115

<210> SEQ ID NO 40
<211> LENGTH: 115
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (20)..(20)
<223> OTHER INFORMATION: M or L
<220> FEATURE:
<221> NAME/KEY: MOD_RES
```

<222> LOCATION: (31)..(31)
<223> OTHER INFORMATION: S or N
<220> FEATURE:
<221> NAME/KEY: MOD_RES
<222> LOCATION: (37)..(37)
<223> OTHER INFORMATION: I or V
<220> FEATURE:
<221> NAME/KEY: MOD_RES
<222> LOCATION: (51)..(51)
<223> OTHER INFORMATION: V or I
<220> FEATURE:
<221> NAME/KEY: MOD_RES
<222> LOCATION: (60)..(60)
<223> OTHER INFORMATION: Y or H
<220> FEATURE:
<221> NAME/KEY: MOD_RES
<222> LOCATION: (67)..(67)
<223> OTHER INFORMATION: R or K
<220> FEATURE:
<221> NAME/KEY: MOD_RES
<222> LOCATION: (83)..(83)
<223> OTHER INFORMATION: L or V
<220> FEATURE:
<221> NAME/KEY: MOD_RES
<222> LOCATION: (87)..(87)
<223> OTHER INFORMATION: T or A
<220> FEATURE:
<221> NAME/KEY: MOD_RES
<222> LOCATION: (98)..(98)
<223> OTHER INFORMATION: T or R
<220> FEATURE:
<221> NAME/KEY: MOD_RES
<222> LOCATION: (99)..(99)
<223> OTHER INFORMATION: Y or A
<220> FEATURE:
<221> NAME/KEY: MOD_RES
<222> LOCATION: (101)..(101)
<223> OTHER INFORMATION: A or G

<400> SEQUENCE: 40

Gln Val Gln Leu Gln Gln Ser Gly Ala Glu Leu Ala Arg Pro Gly Ala
1               5                   10                  15

Ser Val Lys Xaa Ser Cys Lys Ala Ser Gly Tyr Thr Phe Thr Xaa Tyr
            20                  25                  30

Trp Met Gln Trp Xaa Lys Gln Arg Pro Gly Gln Gly Leu Glu Trp Ile
        35                  40                  45

Gly Ala Xaa Tyr Pro Gly Asp Gly Asp Thr Arg Xaa Thr Gln Lys Phe
    50                  55                  60

Lys Gly Xaa Ala Thr Leu Thr Ala Asp Lys Ser Ser Ser Thr Ala Tyr
65                  70                  75                  80

Met Gln Xaa Ser Ser Leu Xaa Ser Glu Asp Ser Ala Val Tyr Tyr Cys
            85                  90                  95

Ala Xaa Xaa Tyr Xaa Met Asp Tyr Trp Gly Gln Gly Thr Ser Val Thr
            100                 105                 110

Val Ser Ser
        115

<210> SEQ ID NO 41
<211> LENGTH: 106
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 41

Gln Ile Val Leu Thr Gln Ser Pro Ala Val Met Ser Ala Ser Pro Gly
1               5                   10                  15

```
Glu Lys Val Thr Met Thr Cys Ser Ala Ser Ser Val Ser Tyr Met
                20                  25                  30

His Trp Tyr Gln Gln Lys Ser Gly Thr Ser Pro Lys Arg Trp Ile Tyr
            35                  40                  45

Asp Thr Ser Lys Leu Ala Ser Gly Val Pro Asn Arg Phe Ser Gly Ser
        50                  55                  60

Gly Ser Gly Thr Ser Tyr Ser Phe Thr Ile Arg Ser Met Glu Ala Glu
65                  70                  75                  80

Asp Ala Ala Thr Tyr Tyr Cys Gln Gln Trp Ser Asn Pro Leu Thr
                85                  90                  95

Phe Gly Ala Gly Thr Lys Leu Glu Leu Lys
            100                 105
```

<210> SEQ ID NO 42
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (10)..(10)
<223> OTHER INFORMATION: I or V
<220> FEATURE:
<221> NAME/KEY: MOD_RES
<222> LOCATION: (59)..(59)
<223> OTHER INFORMATION: A or N
<220> FEATURE:
<221> NAME/KEY: MOD_RES
<222> LOCATION: (72)..(72)
<223> OTHER INFORMATION: L or F
<220> FEATURE:
<221> NAME/KEY: MOD_RES
<222> LOCATION: (75)..(75)
<223> OTHER INFORMATION: S or R

<400> SEQUENCE: 42

```
Gln Ile Val Leu Thr Gln Ser Pro Ala Xaa Met Ser Ala Ser Pro Gly
1               5                   10                  15

Glu Lys Val Thr Met Thr Cys Ser Ala Ser Ser Val Ser Tyr Met
                20                  25                  30

His Trp Tyr Gln Gln Lys Ser Gly Thr Ser Pro Lys Arg Trp Ile Tyr
            35                  40                  45

Asp Thr Ser Lys Leu Ala Ser Gly Val Pro Xaa Arg Phe Ser Gly Ser
        50                  55                  60

Gly Ser Gly Thr Ser Tyr Ser Xaa Thr Ile Xaa Ser Met Glu Ala Glu
65                  70                  75                  80

Asp Ala Ala Thr Tyr Tyr Cys Gln Gln Trp Ser Ser Asn Pro Pro Leu
                85                  90                  95

Thr Phe Gly Ala Gly Thr Lys Leu Glu Leu Lys
            100                 105
```

<210> SEQ ID NO 43
<211> LENGTH: 118
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 43

```
Gln Val Gln Leu Gln Gln Ser Gly Ala Glu Leu Ala Arg Pro Gly Ala
1               5                   10                  15
```

Ser Val Lys Leu Ser Cys Lys Ala Ser Gly Tyr Thr Phe Thr Asn Tyr
            20                  25                  30

Trp Met Gln Trp Ile Lys Gln Arg Pro Gly Gln Gly Leu Glu Trp Ile
        35                  40                  45

Gly Ala Val Tyr Pro Asp Gly Asp Thr Met Met Thr Gln Lys Phe
 50                  55                  60

Lys Gly Lys Ala Thr Leu Thr Ala Asp Lys Ser Ser Thr Ala Tyr
 65                  70                  75                  80

Met Gln Val Ser Ser Leu Ala Ser Glu Asp Ser Ala Val Tyr Tyr Cys
                85                  90                  95

Ala Arg Gly Phe Thr Ala Tyr Gly Met Asp Tyr Trp Gly Gln Gly Thr
            100                 105                 110

Ser Val Thr Val Ser Ser
        115

<210> SEQ ID NO 44
<211> LENGTH: 106
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 44

Gln Ile Val Leu Thr Gln Ser Pro Ala Val Met Ser Ala Ser Pro Gly
 1               5                  10                  15

Glu Lys Val Thr Met Thr Cys Ser Ala Ser Ser Ser Val Ser Tyr Met
            20                  25                  30

His Trp Tyr Gln Gln Lys Ser Gly Thr Ser Pro Lys Arg Trp Ile Tyr
        35                  40                  45

Asp Thr Ser Lys Leu Ala Ser Gly Val Pro Asn Arg Phe Ser Gly Ser
 50                  55                  60

Gly Ser Gly Thr Ser Tyr Ser Phe Thr Ile Arg Ser Met Glu Ala Glu
 65                  70                  75                  80

Asp Ala Ala Thr Tyr Tyr Cys Gln Gln Trp Ser Ser Asn Pro Leu Thr
                85                  90                  95

Phe Gly Ala Gly Thr Lys Leu Glu Leu Lys
            100                 105

<210> SEQ ID NO 45
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 45

Gly Gly Gly Gly Ser
 1               5

<210> SEQ ID NO 46
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 46

```
Ala Ser Thr Gly Gly Gly Ser Gly Gly Gly Ser Gly Gly Gly
1               5                   10                  15

Gly Ser

<210> SEQ ID NO 47
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 47

Gly Ser Gly Ser Gly Ser
1               5
```

ANTI-ADGRE2 ANTIBODIES AND USES THEREOF

BACKGROUND

Anti-ADGRE2 antibodies bind Adhesion G Protein-coupled Receptor E2, ADGRE2 antigen, also known as EMR2, CD312, VBU or CD97. ADGRE2 is expressed by monocytes, macrophages, dendritic cells and granulocytes. ADGRE2 is expressed on cancer cells in cancers, including acute myeloid leukemia. ADGRE2 binds to the chondroitin sulfate moiety of glycosaminoglycan chains and promotes cell attachment. ADGRE2 is highly expressed in cancerous cells, including acute myeloid leukemia cells.

RELATED APPLICATIONS

This application claims priority under 35 U.S.C. § 119(e) to U.S. Provisional Patent Application No. 63/179,756, filed Apr. 26, 2021. The foregoing applications are incorporated by reference herein.

PARTIES TO A JOINT RESEARCH AGREEMENT

The instant application was made by or on behalf of a party to a joint research agreement. The parties to the joint research agreement are Millennium Pharmaceuticals Inc. and Memorial Sloan-Kettering Cancer Center.

SEQUENCE LISTING

The instant application contains a Sequence Listing which has been submitted electronically in ASCII format and is hereby incorporated by reference in its entirety. Said ASCII copy, created on Apr. 19, 2022, is named MIL-018US1_SL.txt and is 41,000 bytes in size.

SUMMARY OF INVENTION

The present invention provides humanized anti-ADGRE2 antibodies and antigen-binding fragments thereof, for the treatment of autoimmune diseases and cancers, including leukemia, lymphoma, or myeloma, including, for example, relapsed and refractory acute myeloid leukemia. The antibodies and fragments thereof of the present invention can be used alone, in fusion proteins or conjugated to at least one diagnostic and/or therapeutic agent or in combination with other treatment modalities.

In some aspects, provided herein is a humanized anti-ADGRE2 antibody or antigen-binding fragment thereof comprising:

(a) an immunoglobulin heavy chain variable ($V_H$) region comprising an amino acid sequence that is at least about 80% identical to

```
                                        (SEQ ID NO: 7)
QVQLQQSGAEVAKPGASVKLSCKASGYTFTNYWMQWIKQAPGQGLEWIG
AVYPGDGDTRHTQKFKGKATLTADKSTSTAYMEVSSLRSEDTAVYYCAR
GFTAYGMDYWGQGTTVTVSS,
``` an immunoglobulin light chain variable ($V_L$) region comprising an amino acid sequence that is at least about 80% identical to

```
                                        (SEQ ID NO: 8)
EIVLTQSPATLSLSPGERATLSCSASSSVSYMHWYQQKPGLAPRLLIYD
TSKLASGIPDRFSGSGSGTDFTLTISRLEPEDFAVYYCQQWSSNPLTFG
QGTKVEIK;
```

(b) an immunoglobulin heavy chain variable ($V_H$) region comprising an amino acid sequence that is at least about 80% identical to

```
                                        (SEQ ID NO: 9)
QVQLQQSGAEVKKPGASVKLSCKASGYTFTNYWMQWIRQAPGQGLEWIG
AVYPGDGDTRYTQKFQGRATLTADTSISTAYMEVSRLRSDDTAVYYCAR
GFTAYGMDYWGQGTTVTVSS,
``` and an immunoglobulin light chain variable ($V_L$) region comprising an amino acid sequence that is at least about 80% identical to

```
                                        (SEQ ID NO: 10)
EIVLTQSPATMSASPGERVTMSCSASSSVSYMHWYQQKSGLSPKRWIYD
TSKLASGVPDRFSGSGSGTDYTFTISRMEPEDFATYYCQQWSSNPLTFG
GGTKLEIK;
```

(c) an immunoglobulin heavy chain variable ($V_H$) region comprising an amino acid sequence that is at least about 80% identical to

```
                                        (SEQ ID NO: 11)
QVQLQQSGAEVKKPGASVKLSCKASGYTFTNYWMQWVRQAPGQGLEWIG
AVYPGDGDTRYTQKFQGRATLTADTSTSTVYMEVSSLRSEDTAVYYCAR
GFTAYGMDYWGQGTTVTVSS,
``` and an immunoglobulin light chain variable ($V_L$) region comprising an amino acid sequence that is at least about 80% identical to

```
                                        (SEQ ID NO: 12)
EIVLTQSPATMSASPGERVTMSCSASSSVSYMHWYQQKSGLSPKRWIYD
TSKLASGVPDRFSGSGSGTDYTFTISRMEPEDFATYYCQQWSSNPLTFG
GGTKLEIK;
``` or (d) an immunoglobulin heavy chain variable ($V_H$) region comprising an amino acid sequence that is at least about 80% identical to

```
                                        (SEQ ID NO: 13)
QVQLQQSGAEVKKPGASVKVSCKASGYTFTNYWMQWVRQAPGQGLEWMG
AVYPGDGDTRHTQKFKGRVTMTRDTSTSTVYMELSSLRSEDTAVYYCAR
GFTAYGMDYWGQGTLVTVSS,
``` and an immunoglobulin light chain variable ($V_L$) region comprising an amino acid sequence that is at least about 80% identical to

```
                                        (SEQ ID NO: 14)
EIVLTQSPATMSASPGERVTMSCSASSSVSYMHWYQQKSGQSPKRWIYD
TSKLASGVPARFSGSGSGTDYTFTISSMEPEDFATYYCQQWSSNPLTFG
GGTKLEIK;
```

(e) an immunoglobulin heavy chain variable ($V_H$) region comprising an amino acid sequence that is at least about 80% identical to

```
                                                (SEQ ID NO: 15)
QVQLQQSGAEVKKPGASVKVSCKASGYTFTNYWMQWVRQAPGQGLEWIG
AVYPGDGDTRHTQKFKGRVTMTADKSTSTVYMELSSLRSEDTAVYYCAR
GFTAYGMDYWGQGTLVTVSS,
``` and an immunoglobulin light chain variable (V$_L$) region comprising an amino acid sequence that is at least about 80% identical to

```
                                                (SEQ ID NO: 16)
QIVLTQSPATLSLSPGERATLTCSASSSVSYMHWYQQKPGLSPKRWIYD
TSKLASGVPDRFSGSGSGTDYTFTIRRLEPEDFATYYCQQWSSNPLTFG
QGTKVEIK;
```

(f) an immunoglobulin heavy chain variable (V$_H$) region comprising an amino acid sequence that is at least about 80% identical to

```
                                                (SEQ ID NO: 17)
QVQLQQSGAEVKKPGASVKLSCKASGYTFTNYWMQWIRQAPGQGLEWIG
AVYPGDGDTRYTQKFQGRATLTADTSTSTAYMEVSSLRSEDTAVYYCAR
GFTAYGMDYWGQGTTVTVSS,
``` and an immunoglobulin light chain variable (V$_L$) region comprising an amino acid sequence that is at least about 80% identical to

```
                                                (SEQ ID NO: 18)
EIVLTQSPATLSASPGERVTMSCSASSSVSYMHWYQQKPGLAPRRWIYD
TSKLASGVPDRFSGSGSGTDYTFTISRMEPEDFATYYCQQWSSNPLTFG
GGTKLEIK;
```

(g) an immunoglobulin heavy chain variable (V$_H$) region comprising an amino acid sequence that is at least about 80% identical to

```
                                                (SEQ ID NO: 30)
QVQLVQSGAEVAKPGASVKLSCKASGYTFTNYWMQWIKQAPGQGLEWIG
AVYPGDGDTRHTQKFKGKATLTADKSTSTAYMEVSSLRSEDTAVYYCAR
GFTAYGMDYWGQGTTVTVSS,
``` and an immunoglobulin light chain variable (V$_L$) region comprising an amino acid sequence that is at least about 80% identical to

```
                                                (SEQ ID NO: 31)
EIVLTQSPATMSASPGERVTMSCSASSSVSYMHWYQQKSGQSPKRWIYD
TSKLASGVPARFSGSGSGTDYTFTISSMEPEDFATYYCQQWSSNPLTFG
GGTKLEIK.
```

In some embodiments, provided herein is a humanized anti-ADGRE2 antibody or antigen-binding fragment thereof comprising:

(a) an immunoglobulin heavy chain variable (V$_H$) region comprising an amino acid sequence of

```
                                                (SEQ ID NO: 7)
QVQLQQSGAEVAKPGASKVLSCKASGYTFTNYWMQWIKQAPGQGLEWIG
AVYPGDGDTRHTQKFKGKATLTADKSTSTAYMEVSSLRSEDTAVYYCAR
GFTAYGMDYWGQGTTVTVSS,
``` and an immunoglobulin light chain variable (V$_L$) region comprising an amino acid sequence of

```
                                                (SEQ ID NO: 8)
EIVLTQSPATLSLSPGERATLSCSASSSVSYMHWYQQKPGLAPRLLIYD
TSKLASGIPDRFSGSGSGTDFTLTISRLEPEDFAVYYCQQWSSNPLTFG
QGTKVEIK;
```

(b) an immunoglobulin heavy chain variable (V$_H$) region comprising an amino acid sequence of

```
                                                (SEQ ID NO: 9)
QVQLQQSGAEVKKPGASVKLSCKASGYTFTNYWMQWIRQAPGQGLEWIG
AVYPGDGDTRYTQKFQGRATLTADTSISTAYMEVSRLRSDDTAVYYCAR
GFTAYGMDYWGQGTTVTVSS,
``` and an immunoglobulin light chain variable (V$_L$) region comprising an amino acid sequence of

```
                                                (SEQ ID NO: 10)
EIVLTQSPATMSASPGERVTMSCSASSSVSYMHWYQQKSGLSPKRWIYD
TSKLASGVPDRFSGSGTDYTFTISRMEPEDFATYYCQQWSSNPLTFGGG
TKLEIK;
```

(c) an immunoglobulin heavy chain variable (V$_H$) region comprising an amino acid sequence of

```
                                                (SEQ ID NO: 11)
QVQLQQSGAEVKKPGASVKLSCKASGYTFTNYWMQWVRQAPGQGLEWIG
AVYPGDGDTRYTQKFQGRATLTADTSTSTVYMEVSSLRSEDTAVYYCAR
GFTAYGMDYWGQGTTVTVSS,
``` and an immunoglobulin light chain variable (V$_L$) region comprising an amino acid sequence of

```
                                                (SEQ ID NO: 12)
EIVLTQSPATMSASPGERVTMSCSASSSVSYMHWYQQKSGLSPKRWIYD
TSKLASGVPDRFSGSGSGTDYTFTISRMEPEDFATYYCQQWSSNPLTFG
GGTKLEIK;
``` or (d) an immunoglobulin heavy chain variable (V$_H$) region comprising an amino acid sequence of

```
                                                (SEQ ID NO: 13)
QVQLQQSGAEVKKPGASVKVSCKASGYTFTNYWMQWVRQAPGQGLEWMG
AVYPGDGDTRHTQKFKGRVTMTRDTSTSTVYMELSSLRSEDTAVYYCAR
GFTAYGMDYWGQGTLVTVSS,
``` and an immunoglobulin light chain variable (V$_L$) region comprising an amino acid sequence of

```
                                                (SEQ ID NO: 14)
EIVLTQSPATMSASPGERVTMSCSASSSVSYMHWYQQKSGQSPKRWIYD
TSKLASGVPARFSGSGSGTDYTFTISSMEPEDFATYYCQQWSSNPLTFG
GGTKLEIK;
```

(e) an immunoglobulin heavy chain variable (V$_H$) region comprising an amino acid sequence of

```
                                                (SEQ ID NO: 15)
QVQLQQSGAEVKKPGASVKVSCKASGYTFTNYWMQWVRQAPGQGLEWIG
AVYPGDGDTRHTQKFKGRVTMTADKSTSTVYMELSSLRSEDTAVYYCAR
GFTAYGMDYWGQGTLVTVSS,
``` and an immunoglobulin light chain variable (V$_L$) region comprising an amino acid sequence of

```
                                                   (SEQ ID NO: 16)
QIVLTQSPATLSLSPGERATLTCSASSSVSYMHWYQQKPGLSPKRWIYD
TSKLASGVPDRFSGSGSGTDYTFTIRRLEPEDFATYYCQQWSSNPLTFG
QGTKVEIK;
```

(f) an immunoglobulin heavy chain variable (V$_H$) region comprising an amino acid sequence of

```
                                                   (SEQ ID NO: 17)
QVQLQQSGAEVKKPGASVKLSCKASGYTFTNYWMQWIRQAPGQGLEWIG
AVYPGDGDTRYTQKFQGRATLTADTSTSTAYMEVSSLRSEDTAVYYCAR
GFTAYGMDYWGQGTTVTVSS,
``` and
an immunoglobulin light chain variable (V$_L$) region comprising an amino acid

```
                                                   (SEQ ID NO: 18)
EIVLTQSPATLSASPGERVTMSCSASSSVSYMHWYQQKPGLAPRRWIYD
TSKLASGVPDRFSGSGSGTDYTFTISRMEPEDFATYYCQQWSSNPLTFG
GGTKLEIK;
```

(g) an immunoglobulin heavy chain variable (V$_H$) region comprising an amino acid sequence of

```
                                                   (SEQ ID NO: 31)
EIVLTQSPATMSASPGERVTMSCSASSSVSYMHWYQQKSGQSPKRWIYD
TSKLASGVPARFSGSGSGTDYTFTISSMEPEDFATYYCQQWSSNPLTFG
GGTKLEIK.
``` and
an immunoglobulin light chain variable (V$_L$) region comprising an amino acid sequence of

```
                                                   (SEQ ID NO: 31)
EIVLTQSPATMSASPGERVTMSCSASSSVSYMHWYQQKSGQSPKRWIYD
TSKLASGVPARFSGSGSGTDYTFTISSMEPEDFATYYCQQWSSNPLTFG
GGTKLEIK.
```

In some embodiments, provided herein is a humanized anti-ADGRE2 antibody or antigen-binding fragment thereof comprising:
  a heavy chain complementarity determining region (HCDR) 1 comprising an amino acid sequence of GYTFTNYW (SEQ ID NO: 1), an HCDR2 comprising an amino acid sequence of VYPGDGDT (SEQ ID NO: 2), an HCDR3 comprising an amino acid sequence of ARGFTAYGMDY (SEQ ID NO: 3); and
  a light chain complementarity determining region (LCDR) 1 comprising an amino acid sequence of SSVSY (SEQ ID NO: 4), an LCDR2 comprising an amino acid sequence of DTS (SEQ ID NO: 5), and an LCDR3 comprising an amino acid sequence of QQWSSNPLT (SEQ ID NO: 6).

In some embodiments, provided herein is a humanized anti-ADGRE2 antibody or antigen-binding fragment thereof, wherein the anti-ADGRE2 antibody or fragment thereof is selected from the group consisting of an IgA antibody, IgG antibody, IgE antibody, IgM antibody, bi- or multi-specific antibody, Fab fragment, Fab' fragment, F(ab')2 fragment, Fd' fragment, Fd fragment, isolated CDRs or sets thereof; single-chain variable fragment (scFv), polypeptide-Fc fusion, single domain antibody, cameloid antibody; masked antibody, Small Modular ImmunoPharmaceutical ("SMIPs™"), single chain, Tandem diabody, VHHs, Anticalin, Nanobody, minibodies, BiTE, ankyrin repeat protein, DARPIN, Avimer, DART, TCR-like antibody, Adnectin, Affilin, Trans-body; Affibody, TrimerX, MicroProtein, Fynomer, Centyrin; and KALBITOR.

In some embodiments, the humanized anti-ADGRE2 antibody or antigen-binding fragment thereof is a monoclonal antibody or a single-chain variable fragment (scFv).

In some embodiments, the humanized anti-ADGRE2 antibody or fragment thereof is an antibody comprising an IgG constant region.

In some embodiments, the humanized anti-ADGRE2 antibody or antigen-binding fragment thereof is a single-chain variable fragment (scFv).

In some embodiments, the scFv comprises a signal sequence, a heavy chain variable sequence, a GS-Linker, and a light chain variable sequence.

In some embodiments, the scFv comprises a sequence having at least about 80% identity to:

(a)
```
                                                   (SEQ ID NO: 19)
QVQLQQSGAEVAKPGASVKLSCKASGYTFTNYWMQWIKQAPGQGLEWIG

AVYPGDGDTRHTQKFKGKATLTADKSTSTAYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGQSPKRWIYDTSKLASGVPARFSG

SGSGTDYTFTISSMEPEDFATYYCQQWSSNPLTFGGGTKLEIK;
```

(b)
```
                                                   (SEQ ID NO: 20)
QVQLQQSGAEVKKPGASVKLSCKASGYTFTNYWMQWIRQAPGQGLEWIG

AVYPGDGDTRYTQKFQGRATLTADTSISTAYMEVSRLRSDDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;
```

(c)
```
                                                   (SEQ ID NO: 21)
QVQLQQSGAEVKKPGASVKLSCKASGYTFTNYWMQWVRQAPGQGLEWIG

AVYPGDGDTRYTQKFQGRATLTADTSTSTVYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;
or
```

(d)
```
                                                   (SEQ ID NO: 22)
QVQLQQSGAEVKKPGASVKVSCKASGYTFTNYWMQWVRQAPGQGLEWMG

AVYPGDGDTRHTQKFKGRVTMTRDTSTSTVYMELSSLRSEDTAVYYCAR

GFTAYGMDYWGQGTLVTVSSASTGGGGSGGGGSGGGGSEIVLTQSPATL

SLSPGERATLSCSASSSVSYMHWYQQKPGLAPRLLIYDTSKLASGIPDR

FSGSGSGTDFTLTISRLEPEDFAVYYCQQWSSNPLTFGQGTKVEIK.
```

In some embodiments, the single-chain variable fragment (scFv) comprises a sequence of:

```
                                                   (SEQ ID NO: 19)
QVQLQQSGAEVAKPGASVKLSCKASGYTFTNYWMQWIKQAPGQGLEWIG

AVYPGDGDTRHTQKFKGKATLTADKSTSTAYMEVSSLRSEDTAVYYCAR

GFTAYGMDYWGQGTTVTVSSGGGGSGGGGSGGGGSEIVLTQSPATMSAS
```

-continued

```
                                                 (SEQ ID NO: 20)
QVQLQQSGAEVKKPGASVKLSCKASGYTFTNYWMQWIRQAPGQGLEWIG

AVYPGDGDTRYTQKFQGRATLTADTSISTAYMEVSRLRSDDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;

(SEQ ID NO: 21)
QVQLQQSGAEVKKPGASVKLSCKASGYTFTNYWMQWVRQAPGQGLEWIG

AVYPGDGDTRYTQKFQGRATLTADTSTSTVYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;
or
                                                 (SEQ ID NO: 22)
QVQLQQSGAEVKKPGASVKVSCKASGYTFTNYWMQWVRQAPGQGLEWMG

AVYPGDGDTRHTQKFKGRVTMTRDTSTSTVYMELSSLRSEDTAVYYCAR

GFTAYGMDYWGQGTLVTVSSASTGGGGSGGGGSGGGGSEIVLTQSPATL

SLSPGERATLSCSASSSVSYMHWYQQKPGLAPRLLIYDTSKLASGIPDR

FSGSGSGTDFTLTISRLEPEDFAVYYCQQWSSNPLTFGQGTKVEIK.
```

In some embodiments, the humanized anti-ADGRE2 antibody has a disassociation constant ($K_D$) is than less than about $10^{-8}$ M $K_D$, less than about $10^{-9}$ M $K_D$, less than about $10^{-10}$ M $K_D$, less than about $10^{-11}$ M $K_D$, less than about $10^{-12}$ M $K_D$, or less than about $10^{-13}$ M $K_D$.

In some embodiments, the humanized anti-ADGRE2 antibody has EC50 between about 1-100 nM.

In some embodiments, the EC50 is between about 10-95 nM.

In some embodiments, the EC50 is between about 25-75 nM.

In some embodiments, provided herein is a method of treating a cancer comprising administering the humanized anti-ADGRE2 antibody or antigen-binding fragment thereof.

In some embodiments, the cancer is selected from leukemia, lymphoma, and myeloma.

In some aspects, a pharmaceutical composition comprising a humanized anti-ADGRE2 antibody or fragment thereof and a pharmaceutically acceptable carrier, wherein the humanized anti-ADGRE2 antibody or antibody fragment thereof comprises:

(a) an immunoglobulin heavy chain variable ($V_H$) region comprising an amino acid sequence that is at least about 80% identical to

```
                                                 (SEQ ID NO: 7)
QVQLQQSGAEVAKPGASVKLSCKASGYTFTNYWMQWIKQAPGQGLEWIG
AVYPGDHDTRHTQKFKGKATLTADKSTSTAYMEVSSLRSEDTAVYYCAR
GFTAYGMDYWGQGTTVTVSS,
```
and
an immunoglobulin light chain variable ($V_L$) region comprising an amino acid sequence that is at least about 80% identical to

```
                                                 (SEQ ID NO: 8)
EIVLTQSPATLSLSPGERATLSCSASSSVSYMHWYQQKPGLAPRLLIYD
TSKLASGIPDRFSGSGSGTDFTLTISRLEPEDFAVYYCQQWSSNPLTFG
QGTKVEIK;
```

(b) an immunoglobulin heavy chain variable ($V_H$) region comprising an amino acid sequence that is at least about 80% identical to

```
                                                 (SEQ ID NO: 9)
QVQLQQSGAEVKKPGASVKLSCKASGYTFTNYWMQWIRQAPGQGLEWIG
AVYPGDGDTRYTQKFQGRATLTADTSISTAYMEVSRLRSDDTAVYYCAR
GFTAYGMDYWGQGTTVTVSS,
```
and
an immunoglobulin light chain variable ($V_L$) region comprising an amino acid sequence that is at least about 80% identical to

```
                                                 (SEQ ID NO: 10)
EIVLTQSPATMSASPGERVTMSCSASSSVSYMHWYQQKSGLSPKRWIYD
TSKLASGVPDRFSGSGSGTDYTFTISRMEPEDFATYYCQQWSSNPLTFG
GGTKLEIK;
```

(c) an immunoglobulin heavy chain variable ($V_H$) region comprising an amino acid sequence that is at least about 80% identical to

```
                                                 (SEQ ID NO: 11)
QVQLQQSGAEVKKPGASVKLSCKASGYTFTNYWMQWVRQAPGQGLEWIG
AVYPGDGDTRYTQKFQGRATLTADTSTSTVYMEVSSLRSEDTAVYYCAR
GFTAYGMDYWGQGTTVTVSS,
```
and
an immunoglobulin light chain variable ($V_L$) region comprising an amino acid sequence that is at least about 80% identical to

```
                                                 (SEQ ID NO: 12)
EIVLTQSPATMSASPGERVTMSCSASSSVSYMHWYQQKSGLSPKRWIYD
TSKLASGVPDRFSGSGSGTDYTFTISRMEPEDFATYYCQQWSSNPLTFG
GGTKLEIK;
```

(d) an immunoglobulin heavy chain variable ($V_H$) region comprising an amino acid sequence that is at least about 80% identical to

```
                                                 (SEQ ID NO: 13)
QVQLQQSGAEVKKPGASVKVSCKASGYTFTNYWMQWVRQAPGQGLEWMG
AVYPGDGDTRHTQKFKGRVTMTRDTSTSTVYMELSSLRSEDTAVYYCAR
GFTAYGMDYWGQGTLVTVSS,
```
and
an immunoglobulin light chain variable ($V_L$) region comprising an amino acid sequence that is at least about 80% identical to

```
                                                 (SEQ ID NO: 14)
EIVLTQSPATMSASPGERVTMSCSASSSVSYMHWYQQKSGQSPKRWIYD
TSKLASGVPARFSGSGSGTDYTFTISSMEPEDFATYYCQQWSSNPLTFG
GGTKLEIK;
```

(e) an immunoglobulin heavy chain variable ($V_H$) region comprising an amino acid sequence that is at least about 80% identical to (SEQ ID NO: 15)
QVQLQQSGAEVKKPGASVKVSCKASGYTFTNYWMQWVRQAPGQGLEWIG
AVYPGDGDTRHTQKFKGRVTMTADKSTSTVYMELSSLRSEDTAVYYCAR
GFTAYGMDYWGQGTLVTVSS, and an immunoglobulin light chain variable (V$_L$) region comprising an amino acid sequence that is at least about 80% identical to (SEQ ID NO: 16)
QIVLTQSPATLSLSPGERATLTCSASSSVSYMHWYQQKPGLSPKRWIYD
TSKLASGVPDRFSGSGSGTDYTFTIRRLEPEDFATYYCQQWSSNPLTFG
QGTKVEIK;

or (f) an immunoglobulin heavy chain variable (V$_H$) region comprising an amino acid sequence that is at least about 80% identical to (SEQ ID NO: 17)
QVQLQQSGAEVKKPGASVKLSCKASGYTFTNYWMQWIRQAPGQGLEWIG
AVYPGDGDTRYTQKFQGRATLTADTSTSTAYMEVSSLRSEDTAVYYCAR
GFTAYGMDYWGQGTTVTVSS, and an immunoglobulin light chain variable (V$_L$) region comprising an amino acid sequence that is at least about 80% identical to (SEQ ID NO: 18)
ETVLTQSPATLSASPGERVTMSCSASSSVSYMHWYQQKPGLAPRRWIYDT
SKLASGVPDRFSGSGSGTDYTFTISRMEPEDFATYYCQQWSSNPLTFGGG
TKLEIK;

or (g) an immunoglobulin heavy chain variable (V$_H$) region comprising an amino acid sequence that is at least about 80% identical to (SEQ ID NO: 30)
QVQLVQSGAEVAKPGASVKLSCKASGYTFTNYWMQWIKQAPGQGLEWIGA
VYPGDGDTRHTQKFKGKATLTADKSTSTAYMEVSSLRSEDTAVYYCARGF
TAYGMDYWGQGTTVTVSS, and an immunoglobulin light chain variable (V$_L$) region comprising an amino acid sequence that is at least about 80% identical to (SEQ ID NO: 31)
ETVLTQSPATMSASPGERVTMSCSASSSVSYMHWYQQKSGQSPKRWIYDT
SKLASGVPARFSGSGSGTDYTFTISSMEPEDFATYYCQQWSSNPLTFGGG
TKLBIK.

In some embodiments, the pharmaceutical composition comprises a humanized anti-ADGRE2 antibody or antigen-binding fragment, wherein the humanized anti-ADGRE2 antibody or antigen-binding fragment comprises:

(a) an immunoglobulin heavy chain variable (V$_H$) region comprising an amino acid sequence of (SEQ ID NO: 7)
QVQLQQSGAEVAKPGASVKLSCKASGYTFTNYWMQWIKQAPGQGLEWIGA
VYPGDGDTRHTQKFKGKATLTADKSTSTAYMEVSSLRSEDTAVYYCARGF
TAYGMDYWGQGTTVTVSS, and an immunoglobulin light chain variable (V$_L$) region comprising an amino acid sequence of (SEQ ID NO: 8)
EIVLTQSPATLSLSPGERATLSCSASSSVSYMHIWYQQKPGLAPRLLIYD
TSKLASGIPDRFSGSGSGTDFTLTISRLEPEDFAVYYCQQWSSNPLTFGQ
GTKVEIK;

(b) an immunoglobulin heavy chain variable (V$_H$) region comprising an amino acid sequence of (SEQ ID NO: 9)
QVQLQQSGAEVKKPGASVKLSCKASGYTFTNYWMQWIRQAPGQGLEWIGA
VYPGDGDTRYTQKFQGRATLTADTSISTAYMEVSRLRSDDTAVYYCARGF
TAYGMDYWGQGTTVTVSS, and an immunoglobulin light chain variable (V$_L$) region comprising an amino acid sequence of (SEQ ID NO: 10)
EIVLTQSPATMSASPGERVTMSCSASSSVSYMHWYQQKSGLSPKRWIYDT
SKLASGVPDRFSGSGSGTDYTFTISRMEPEDFATYYCQQWSSNPLTFGGG
TKLEIK (c) an immunoglobulin heavy chain variable (V$_H$) region comprising an amino acid sequence of (SEQ ID NO: 11)
QVQLQQSGAEVKKPGASVKLSCKASGYTFTNYWMQWVRQAPGQGLEWIGA
VYPGDGDTRYTQKFQGRATLTATSTSTVYMEVSSLRSEDTAVYYCARGFT
AYGMDYWGQGTTVTVSS, and an immunoglobulin light chain variable (V$_L$) region comprising an amino acid sequence of (SEQ ID NO: 12)
EIVLTQSPATMSASPGERVTMSCSASSSVSYMHWYQQKSGLSPKRWIYDT
SKLASGVPDRFSGSGSGTDYTFTISRMEPEDFATYYCQQWSSNPLTFGGG
TKLEIK;

(d) an immunoglobulin heavy chain variable (V$_H$) region comprising an amino acid sequence of (SEQ ID NO: 13)
QVQLQQSGAEVKKPGASVKVSCKASGYTFTNYWMQWVRQAPGQGLEWMGA

VYPGDGDTRHTQKFKGRVTMTRDTSTSTVYMELSSLRSEDTAVYYCARGF

TAYGMDYWGQGTLVTVSS, and an immunoglobulin light chain variable (V$_L$) region comprising an amino acid sequence of (SEQ ID NO: 14)
EIVLTQSPATMSASPGERVTMSCSASSSVSYMHWYQQKSGQSPKRWIYDT

SKLASGVPARFSGSGSGTDYTFTISSMEPEDFATYYCQQWSSNPLTFGGG

TKLEIK;

(e) an immunoglobulin heavy chain variable (V$_H$) region comprising an amino acid sequence of (SEQ ID NO: 15)
QVQLQQSGAEVKKPGASVKVSCKASGYTFTNYWMQWVRQAPGQGLEWIGA

VYPGDGDTRHTQKFKGRVTMTADKSTSTVYMELSSLRSEDTAVYYCARGF

TAYGMDYWGQGTLVTVSS, and an immunoglobulin light chain variable (V$_L$) region comprising an amino acid sequence of (SEQ ID NO: 16)
QIVLTQSPATLSLSPGERATLTCSASSSVSYMHWYQQKPGLSPKRWIYDT

SKLASGVPDRFSGSGSGTDYTFTIRRLEPEDFATYYCQQWSSNPLTFGQG

TKVEIK;

or (f) an immunoglobulin heavy chain variable (V$_H$) region comprising an amino acid sequence of (SEQ ID NO: 17)
QVQLQQSGAEVKKPGASVKLSCKASGYTFTNYWMQWIRQAPGQGLEWIGA

VYPGDGDTRYTQKFQGRATLTADTSTSTAYMEVSSLRSEDTAVYYCARGF

TAYGMDYWGQGTTVTVSS, and an immunoglobulin light chain variable (V$_L$) region comprising an amino acid sequence of (SEQ ID NO: 18)
EIVLTQSPATLSASPGERVTMSCSASSSVSYMHWYQQKPGLAPRRWIYDT

SKLASGVPDRFSGSGSGTDYTFTISRMEPEDFATYYCQQWSSNPLTFGGG

TKLEIK;

or (g) an immunoglobulin heavy chain variable (V$_H$) region comprising an amino acid sequence that is at least about 80% identical to (SEQ ID NO: 30)
QVQLVQSGAEVAKPGASVKLSCKASGYTFTNYWMQWIKQAPGQGLEWIG

AVYPGDGDTRHTQKFKGKATLTADKSTSTAYMEVSSLRSEDTAVYYCAR

GFTAYGMDYWGQGTTVTVSS, and an immunoglobulin light chain variable (V$_L$) region comprising an amino acid sequence that is at least about 80% identical to (SEQ ID NO: 31)
EIVLTQSPATMSASPGERVTMSCSASSSVSYMHWYQQKSGQSPKRWIYD

TSKLASGVPARFSGSGSGTDYTFTISSMEPEDFATYYCQQWSSNPLTFG

GGTKLEIK.

In some embodiments, the pharmaceutical composition comprises a humanized anti-ADGRE2 antibody or antibody fragment thereof comprises:

a heavy chain complementarity determining region (HCDR) 1 comprising an amino acid sequence of GYTFTNYW (SEQ ID NO: 1), an HCDR2 comprising an amino acid sequence of VYPGDGDT (SEQ ID NO: 2), an HCDR3 comprising an amino acid sequence of ARGFTAYGMDY (SEQ ID NO: 3); and a light chain complementarity determining region (LCDR) 1 comprising an amino acid sequence of SSVSY (SEQ ID NO: 4), an LCDR2 comprising an amino acid sequence of DTS (SEQ ID NO: 5), and an LCDR3 comprising an amino acid sequence of QQWSSNPLT (SEQ ID NO: 6).

In some embodiments, the pharmaceutical composition comprises a humanized anti-ADGRE2 antibody or antigen-binding fragment thereof, wherein the humanized anti-ADGRE2 antibody or antigen-binding fragment thereof is selected from the group consisting of an IgA antibody, IgG antibody, IgE antibody, IgM antibody, bi- or multispecific antibody, Fab fragment, Fab' fragment, F(ab')2 fragment, Fd' fragment, Fd fragment, isolated CDRs or sets thereof; single-chain variable fragment (scFv), polypeptide-Fc fusion, single domain antibody, cameloid antibody; masked antibody, Small Modular ImmunoPharmaceutical ("SMIPs™"), single chain, Tandem diabody, VHHs, Anticalin, Nanobody, minibodies, BiTE, ankyrin repeat protein, DARPIN, Avimer, DART, TCR-like antibody, Adnectin, Affilin, Trans-body; Affibody, TrimerX, MicroProtein, Fynomer, Centyrin; and KALBITOR.

In some embodiments, the pharmaceutical composition comprises a humanized anti-ADGRE2 antibody or antigen-binding fragment thereof, wherein the anti-ADGRE2 antibody or fragment thereof is a monoclonal antibody or a single-chain variable fragment (scFv).

In some embodiments, the humanized anti-ADGRE2 antibody or antigen-binding fragment thereof is an antibody comprising an IgG constant region.

In some embodiments, the humanized anti-ADGRE2 antibody or antigen-binding fragment thereof is a single-chain variable fragment (scFv).

In some embodiments, the scFv comprises a signal sequence, a heavy chain variable sequence, a GS-Linker, and a light chain variable sequence.

In some embodiments, the scFv comprises a sequence having at least about 80% identity to:

(a)
(SEQ ID NO: 19)
QVQLQQSGAEVAKPGASVKLSCKASGYTFTNYWMQWIKQAPGQGLEWIG

AVYPGDGDTRHTQKFKGKATLTADKSTSTAYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGQSPKRWIYDTSKLASGVPARFSG

SGSGTDYTFTISSMEPEDFATYYCQQWSSNPLTFGGGTKLEIK;

(b)
(SEQ ID NO: 20)
QVQLQQSGAEVKKPGASVKLSCKASGYTFTNYWMQWIRQAPGQGLEWIG

AVYPGDGDTRYTQKFQGRATLTADTSISTAYMEVSRLRSDDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;

(c)
(SEQ ID NO: 21)
QVQLQQSGAEVKKPGASVKLSCKASGYTFTNYWMQWVRQAPGQGLEWIG

AVYPGDGDTRYTQKFQGRATLTADTSTSTVYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;
or (d)
(SEQ ID NO: 22)
QVQLQQSGAEVKKPGASVKVSCKASGYTFTNYWMQWVRQAPGQGLEWMG

AVYPGDGDTRHTQKFKGRVTMTRDTSTSTVYMELSSLRSEDTAVYYCAR

GFTAYGMDYWGQGTLVTVSSASTGGGGSGGGGSGGGGSEIVLTQSPATL

SLSPGERATLSCSASSSVSYMHWYQQKPGLAPRLLIYDTSKLASGIPDR

FSGSGSGTDFTLTISRLEPEDFAVYYCQQWSSNPLTFGQGTKVEIK.

In some embodiments, the single-chain variable fragment (scFV) comprises a sequence of:

(a)
(SEQ ID NO: 19)
QVQLQQSGAEVAKPGASVKLSCKASGYTFTNYWMQWIKQAPGQGLEWIG

AVYPGDGDTRHTQKFKGKATLTADKSTSTAYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGQSPKRWIYDTSKLASGVPARFSG

SGSGTDYTFTISSMEPEDFATYYCQQWSSNPLTFGGGTKLEIK;

(b)
(SEQ ID NO: 20)
QVQLQQSGAEVKKPGASVKLSCKASGYTFTNYWMQWIRQAPGQGLEWIG

AVYPGDGDTRYTQKFQGRATLTADTSISTAYMEVSRLRSDDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;

(c)
(SEQ ID NO: 21)
QVQLQQSGAEVKKPGASVKLSCKASGYTFTNYWMQWVRQAPGQGLEWIG

AVYPGDGDTRYTQKFQGRATLTADTSTSTVYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;
or (d)
(SEQ ID NO: 22)
QVQLQQSGAEVKKPGASVKVSCKASGYTFTNYWMQWVRQAPGQGLEWMG

AVYPGDGDTRHTQKFKGRVTMTRDTSTSTVYMELSSLRSEDTAVYYCAR

GFTAYGMDYWGQGTLVTVSSASTGGGGSGGGGSGGGGSEIVLTQSPATL

SLSPGERATLSCSASSSVSYMHWYQQKPGLAPRLLIYDTSKLASGIPDR

FSGSGSGTDFTLTISRLEPEDFAVYYCQQWSSNPLTFGQGTKVEIK.

In some embodiments, provided herein is a nucleic acid sequence encoding an amino acid sequence that is at least about 90% identical to any one of SEQ ID Nos: 7-18.

In some embodiments, provided herein is a vector comprising the nucleic acid sequence.

In some embodiments, provided herein is a cell comprising the vector.

In some aspects, provided herein is a method of treating cancer comprising administering a humanized anti-ADGRE2 antibody or antigen-binding fragment thereof to a subject in need thereof, the humanized anti-ADGRE2 antibody comprising:

(a) an immunoglobulin heavy chain variable ($V_H$) region comprising an amino acid sequence that is at least about 80% identical to (SEQ ID NO: 7)
QVQLQQSGAEVAKPGASVKLSCKASGYTFTNYWMQWIKQAPGQGLEWIG
AVYPGDGDTRHTQKFKGKATLTADKSTSTAYMEVSSLRSEDTAVYYCAR
GFTAYGMDYWGQGTTVTVSS, and
an immunoglobulin light chain variable ($V_L$) region comprising an amino acid sequence that is at least about 80% identical to (SEQ ID NO: 8)
EIVLTQSPATLSLSPGERATLSCSASSSVSYMHWYQQKPGLAPRLLIYD
TSKLASGIPDRFSGSGSGTDFTLTISRLEPEDFAVYYCQQWSSNPLTFG
QGTKVEIK;

(b) an immunoglobulin heavy chain variable ($V_H$) region comprising an amino acid sequence that is at least about 80% identical to (SEQ ID NO: 9)
QVQLQQSGAEVKKPGASVKLSCKASGYTFTNYWMQWIRQAPGQGLEWIG
AVYPGDGDTRYTQKFQGRATLTADTSISTAYMEVSRLRSDDTAVYYCAR
GFTAYGMDYWGQGTTVTVSS, and
an immunoglobulin light chain variable ($V_L$) region comprising an amino acid sequence that is at least about 80% identical to (SEQ ID NO: 10)
EIVLTQSPATMSASPGERVTMSCSASSSVSYMHWYQQKSGLSPKRWIYD
TSKLASGVPDRFSGSGSGTDYTFTISRMEPEDFATYYCQQWSSNPLTFG
GGTKLEIK;

(c) an immunoglobulin heavy chain variable (V_H) region comprising an amino acid sequence that is at least about 80% identical to (SEQ ID NO: 11)
QVQLQQSGAEVKKPGASVKLSCKASGYTFTNYWMQWVRQAPGQGLEWIG
AVYPGDGDTRYTQKFQGRATLTADTSTSTVYMEVSSLRSEDTAVYYCAR
GFTAYGMDYWGQGTTVTVSS, and an immunoglobulin light chain variable (V_L) region comprising an amino acid sequence that is at least about 80% identical to (SEQ ID NO: 12)
EIVLTQSPATMSASPGERVTMSCSASSSVSYMHWYQQKSGLSPKRWIYD
TSKLASGVPDRFSGSGSGTDYTFTISRMEPEDFATYYCQQWSSNPLTFG
GGTKLEIK;

(d) an immunoglobulin heavy chain variable (V_H) region comprising an amino acid sequence that is at least about 80% identical to (SEQ ID NO: 13)
QVQLQQSGAEVKKPGASVKVSCKASGYTFTNYWMQWVRQAPGQGLEWMG
AVYPGDGDTRHTQKFKGRVTMTRDTSTSTVYMELSSLRSEDTAVYYCAR
GFTAYGMDYWGQGTLVTVSS, and an immunoglobulin light chain variable (V_L) region comprising an amino acid sequence that is at least about 80% identical to (SEQ ID NO: 14)
EIVLTQSPATMSASPGERVTMSCSASSSVSYMHWYQQKSGQSPKRWIYD
TSKLASGVPARFSGSGSGTDYTFTISSMEPEDFATYYCQQWSSNPLTFG
GGTKLEIK;

(e) an immunoglobulin heavy chain variable (V_H) region comprising an amino acid sequence that is at least about 80% identical to (SEQ ID NO: 15)
QVQLQQSGAEVKKPGASVKVSCKASGYTFTNYWMQWVRQAPGQGLEWIG
AVYPGDGDTRHTQKFKGRVTMTADKSTSTVYMELSSLRSEDTAVYYCAR
GFTAYGMDYWGQGTLVTVSS, and an immunoglobulin light chain variable (V_L) region comprising an amino acid sequence that is at least about 80% identical to (SEQ ID NO: 16)
QIVLTQSPATLSLSPGERATLTCSASSSVSYMHWYQQKPGLSPKRWIYD
TSKLASGVPDRFSGSGSGTDYTFTIRRLEPEDFATYYCQQWSSNPLTFG
QGTKVEIK;

or (f) an immunoglobulin heavy chain variable (V_H) region comprising an amino acid sequence that is at least about 80% identical to (SEQ ID NO: 17)
QVQLQQSGAEVKKPGASVKLSCKASGYTFTNYWMQWIRQAPGQGLEWIG
AVYPGDGDTRYTQKFQGRATLTADTSTSTAYMEVSSLRSEDTAVYYCAR
GFTAYGMDYWGQGTTVTVSS, and an immunoglobulin light chain variable (V_L) region comprising an amino acid sequence that is at least about 80% identical to (SEQ ID NO: 18)
EIVLTQSPATLSASPGERVTMSCSASSSVSYMHWYQQKPGLAPRRWIYD
TSKLASGVPDRFSGSGSGTDYTFTISRMEPEDFATYYCQQWSSNPLTFG
GGTKLEIK;

or (g) an immunoglobulin heavy chain variable (V_H) region comprising an amino acid sequence that is at least about 80% identical to (SEQ ID NO: 30)
QVQLVQSGAEVAKPGASVKLSCKASGYTFTNYWMQWIKQAPGQGLEWIGA
VYPGDGDTRHTQKFKGKATLTADKSTSTAYMEVSSLRSEDTAVYYCARGF
TAYGMDYWGQGTTVTVSS, and an immunoglobulin light chain variable (V_L) region comprising an amino acid sequence that is at least about 80% identical to (SEQ ID NO: 31)
EIVLTQSPATMSASPGERVTMSCSASSSVSYMHWYQQKSGQSPKRWIYD
TSKLASGVPARFSGSGSGTDYTFTISSMEPEDFATYYCQQWSSNPLTFG
GGTKLEIK.

In some embodiments, provided herein is a method of treating cancer comprising administering a humanized anti-ADGRE2 antibody or antigen-binding fragment thereof to a subject in need thereof, wherein the humanized anti-ADGRE2 antibody comprises:

(a) an immunoglobulin heavy chain variable (V_H) region comprising an amino acid sequence of (SEQ ID NO: 7)
QVQLQQSGAEVAKPGASVKLSCKASGYTFTNYWMQWIKQAPGQGLEWIGA
VYPGDGDTRHTQKFKGKATLTADKSTSTAYMEVSSLRSEDTAVYYCARGF
TAYGMDYWGQGTTVTVSS, and an immunoglobulin light chain variable (V_L) region comprising an amino acid sequence of (SEQ ID NO: 8)
EIVLTQSPATLSLSPGERATLSCSACCCVSYMHWYQQKPGLAPRLLIYDT
SKLASGIPDRFSGSGSGTDFTLTISRLEPEDFAVYYCQQWSSNPLTFGQG
TKVEIK;

(b) an immunoglobulin heavy chain variable (V<sub>H</sub>) region comprising an amino acid sequence of (SEQ ID NO: 9)
QVQLQQSGAEVKKPGASVKLSCKASGYTFTNYWMQWIRQAPGQGLEWIGA

VYPGDGDTRYTQKFQGRATLTADTSISTAYMEVSRLRSDDTAVYYCARGF

TAYGMDYWGQGTTVTVSS, and
an immunoglobulin light chain variable (V<sub>L</sub>) region comprising an amino acid sequence of (SEQ ID NO: 10)
EIVLTQSPATMSASPGERVTMSCSASSSVSYMHWYQQKSGLSPKRWIYDT

SKLASGVPDRFSGSGSGTDYTFTISRMEPEDFATYYCQQWSSNPLTFGGG

TKLEIK;

(c) an immunoglobulin heavy chain variable (V<sub>H</sub>) region comprising an amino acid sequence of (SEQ ID NO: 11)
QVQLQQSGAEVKKPGASVKLCKASGYTFTNYWMQWVRQAPGQGLEWIGAV

YPGDGDTRYRQKFQGRATLTADTSTSTVYMEVSSLRSEDTAVYYVARGFT

AYGMDYWGQGTTVTVSS, and
an immunoglobulin light chain variable (V<sub>L</sub>) region comprising an amino acid sequence of (SEQ ID NO: 12)
EIVLTQSPATMSASPGERVTMSCSASSSVSYMHWYQQKSGLSPKRWIYDT

SKLASGVPDRFSGSGSGTDYTFTISRMEPEDFATYYCQQWSSNPLTFGGG

TKLEIK;

(d) an immunoglobulin heavy chain variable (V<sub>H</sub>) region comprising an amino acid sequence of (SEQ ID NO: 13)
QVQLQQSGAEVKKPGASVKVSCKASGYTFTNYWMQWVRQAPGQGLEWMGA

VYPGDGTRHTQKFKGRVTMTRDTSTSTVYMELSSLRSEDTAVYYCARGFT

AYGMDYWGQGTLVTVSS, and
an immunoglobulin light chain variable (V<sub>L</sub>) region comprising an amino acid sequence of (SEQ ID NO: 14)
EIVLTQSPATMSASPGERVTMSCSASSSVSYMHWYQQKSGQSPKRWIYDT

SKLASGVPARFSGSGSGTDYTFTISSMEPEDFATYYCQQWSSNPLTFGGG

TKLEIK;

(g) an immunoglobulin heavy chain variable (V<sub>H</sub>) region comprising an amino acid sequence of (SEQ ID NO: 15)
QVQLQQSGAEVKKPGASVKVSCKASGYTFTNYWMQWVRQAPGQGLEWIGA

VYPGDGDTRHTQKFKGRVTMTADKSTSTVYMELSSLRSEDTAVYYCARGF

TAYGMDYWGQGTLVTVSS, and
an immunoglobulin light chain variable (V<sub>L</sub>) region comprising an amino acid sequence of (SEQ ID NO: 16)
QIVLTQSPATLSLSPGERATLTCSASSSVSYMHWYQQKPGLSPKRWIYDT

SKLASGVPDRFSGSGSGTDYTFTIRRLEPEDFATYYCQQWSSNPLTFGQG

TKVEIK;

or
(h) an immunoglobulin heavy chain variable (V<sub>H</sub>) region comprising an amino acid sequence of (SEQ ID NO: 17)
QVQLQQSGAEVKKPGASVKLSCKASGYTFTNYWMQWIRQAPGQGLEWIGA

VYPGDGDTRYTQKFQGRATLTADTSTSTAYMEVSSLRSEDTAVYYCARGF

TAYGMDYWGQGTTVTVSS, and
an immunoglobulin light chain variable (V<sub>L</sub>) region comprising an amino acid sequence of (SEQ ID NO: 18)
EIVLTQSPATLSASPGERVTMSCSASSSVSYMHWYQQKPGLAPRRWIYD
TSKLASGVPDRFSGSGSGTDYTFTISRMEPEDFATYYCQQWSSNPLTFG
GGTKLEIK;

or
(g) an immunoglobulin heavy chain variable (V<sub>H</sub>) region comprising an amino acid sequence of (SEQ ID NO: 30)
QVQLVQSGAEVAKPGASVKLSCKASGYTFTNYWMQWIKQAPGQGLEWIGA

VYPGDGDTRHTQKFKGKATLTADKSTSTAYMEVSSLRSEDTAVYYCARGF

TAYGMDYWGQ, and
an immunoglobulin light chain variable (V<sub>L</sub>) region comprising an amino acid sequence that of (SEQ ID NO: 31)
EIVLTQSPATMSASPGERVTMSCSASSSVSYMHWYQQKSGQSPKRWIYDT

SKLASGVPARFSGSGSGTDYTFTISSMEPEDFATYYCQQWSSNPLTFGGG

TKLEIK,

In some embodiments, provided herein is a method of treating cancer comprising administering a humanized anti-ADGRE2 antibody or antigen-binding fragment thereof to a subject in need thereof, wherein the humanized anti-ADGRE2 antibody comprises:
a heavy chain complementarity determining region (HCDR) 1 comprising an amino acid sequence of GYTFTNYW (SEQ ID NO: 1), an HCDR2 comprising an amino acid sequence of VYPGDGDT (SEQ ID NO: 2), an HCDR3 comprising an amino acid sequence of ARGFTAYGMDY (SEQ ID NO: 3); and a light chain complementarity determining region (LCDR) 1 comprising an amino acid sequence of SSVSY (SEQ ID NO: 4), an LCDR2 comprising an amino acid sequence of DTS (SEQ ID NO: 5), and an LCDR3 comprising an amino acid sequence of QQWSSNPLT (SEQ ID NO: 6).

In some embodiments, provided herein is a method of treating cancer comprising administering a humanized anti-ADGRE2 antibody or antigen-binding fragment thereof to a subject in need thereof, wherein the humanized anti-ADGRE2 antibody or antigen-binding fragment thereof is a monoclonal antibody or a single-chain variable fragment (scFv).

In some embodiments, provided herein is a method of treating cancer comprising administering a humanized anti-ADGRE2 antibody or antigen-binding fragment thereof to a subject in need thereof, wherein the humanized anti-ADGRE2 antibody or fragment thereof is an antibody comprising an IgG constant region.

In some embodiments, the anti-humanized ADGRE2 antibody or fragment thereof is a single-chain variable fragment (scFv).

In some embodiments, the scFv comprises a leader sequence, a heavy chain variable sequence, a GS-Linker, and a light chain variable sequence.

In some embodiments, the scFv comprises a sequence having at least about 80% identity to:

(a)
(SEQ ID NO: 19)
QVQLQQSGAEVAKPGASVKLSCKASGYTFTNYWMQWIKQAPGQGLEWIG

AVYPGDGDTRHTQKFKGKATLTADKSTSTAYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGQSPKRWIYDTSKLASGVPARFSG

SGSGTDYTFTISSMEPEDFATYYCQQWSSNPLTFGGGTKLEIK;

(b)
(SEQ ID NO: 20)
QVQLQQSGAEVKKPGASVKLSCKASGYTFTNYWMQWIRQAPGQGLEWIG

AVYPGDGDTRYTQKFQGRATLTADTSISTAYMEVSRLRSDDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;

(c)
(SEQ ID NO: 21)
QVQLQQSGAEVKKPGASVKLSCKASGYTFTNYWMQWVRQAPGQGLEWIG

AVYPGDGDTRYTQKFQGRATLTADTSTSTVYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;
or (d)
(SEQ ID NO: 22)
QVQLQQSGAEVKKPGASVKVSCKASGYTFTNYWMQWVRQAPGQGLEWMG

AVYPGDGDTRHTQKFKGRVTMTRDTSTSTVYMELSSLRSEDTAVYYCAR

GFTAYGMDYWGQGTLVTVSSASTGGGGSGGGGSGGGGSEIVLTQSPATL

SLSPGERATLSCSASSSVSYMHWYQQKPGLAPRLLIYDTSKLASGIPDR

FSGSGSGTDFTLTISRLEPEDFAVYYCQQWSSNPLTFGQGTKVEIK.

In some embodiments, the single-chain variable fragment (scFv) comprises a sequence of:

(SEQ ID NO: 19)
QVQLQQSGAEVAKPGASVKLSCKASGYTFTNYWMQWIKQAPGQGLEWIG

AVYPGDGDTRHTQKFKGKATLTADKSTSTAYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGQSPKRWIYDTSKLASGVPARFSG

SGSGTDYTFTISSMEPEDFATYYCQQWSSNPLTFGGGTKLEIK;

(SEQ ID NO: 20)
QVQLQQSGAEVKKPGASVKLSCKASGYTFTNYWMQWIRQAPGQGLEWIG

AVYPGDGDTRYTQKFQGRATLTADTSISTAYMEVSRLRSDDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;

(SEQ ID NO: 21)
QVQLQQSGAEVKKPGASVKLSCKASGYTFTNYWMQWVRQAPGQGLEWIG

AVYPGDGDTRYTQKFQGRATLTADTSTSTVYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGLSPKRWIYDTSKLASGVPDRFSG

SGSGTDYTFTISRMEPEDFATYYCQQWSSNPLTFGGGTKLEIK;
or (SEQ ID NO: 22)
QVQLQQSGAEVKKPGASVKVSCKASGYTFTNYWMQWVRQAPGQGLEWMG

AVYPGDGDTRHTQKFKGRVTMTRDTSTSTVYMELSSLRSEDTAVYYCAR

GFTAYGMDYWGQGTLVTVSSASTGGGGSGGGGSGGGGSEIVLTQSPATL

SLSPGERATLSCSASSSVSYMHWYQQKPGLAPRLLIYDTSKLASGIPDR

FSGSGSGTDFTLTISRLEPEDFAVYYCQQWSSNPLTFGQGTKVEIK.

In some embodiments, the cancer is selected from leukemia, lymphoma, or myeloma.

In some embodiments, the treatment comprises administration of one or more additional agents.

In some embodiments, the one or more additional agents is selected from an antibody, a chemotherapeutic, or radiation therapy.

Definitions

A or An: The articles "a" and "an" are used herein to refer to one or to more than one (i.e., to at least one) of the grammatical object of the article. By way of example, "an element" means one element or more than one element.

Affinity: As used herein, the term "affinity" refers to the characteristics of a binding interaction between a binding moiety (e.g., an antigen binding moiety (e.g., variable domain described herein) and/or Fc receptor binding moiety (e.g., FcRn binding moiety described herein)) and a target (e.g., an antigen (e.g., ADGRE2) and/or FcR (e.g., FcRn)) and that indicates the strength of the binding interaction. In some embodiments, the measure of affinity is expressed as a dissociation constant ($K_D$). In some embodiments, a binding moiety has a high affinity for a target (e.g., a $K_D$ of less than about $10^{-7}$ M, less than about $10^{-8}$ M, or less than about $10^{-9}$ M). In some embodiments, a binding moiety has a low affinity for a target (e.g., a $K_D$ of higher than about $10^{-7}$ M, higher than about $10^{-6}$ M, higher than about $10^{-5}$ M, or higher than about $10^{-4}$ M). In some embodiments, a binding moiety has high affinity for a target at a first pH, has low affinity for the target at a second pH, and has an intermediate affinity for the target at a pH level between the first pH and the second pH.

Approximately or about: As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Antibody: As used herein, the term "antibody" refers to a polypeptide that includes at least one immunoglobulin variable region, e.g., an amino acid sequence that provides an immunoglobulin variable domain or immunoglobulin variable domain sequence. For example, an antibody can include a heavy (H) chain variable region (abbreviated herein as VH), and a light (L) chain variable region (abbreviated herein as VL). In another example, an antibody includes two heavy (H) chain variable regions and two light (L) chain variable regions. The term "antibody" encompasses antigen-binding fragments of antibodies (e.g., single chain antibodies, Fab, F(ab')$_2$, Fd, Fv, and dAb fragments) as well as complete antibodies, e.g., intact immunoglobulins of types IgA, IgG, IgE, IgD, IgM (as well as subtypes thereof). The light chains of the immunoglobulin can be of types kappa or lambda.

Binding Moiety: As used herein, a "binding moiety" is any molecule or part of a molecule capable of specifically binding a target, e.g., a target of interest (e.g., an antigen (e.g., ADGRE2) and/or FcR (e.g., FcRn)). Binding moieties include, e.g., antibodies, antigen-binding fragments thereof, Fc regions or Fc fragments thereof, antibody mimetics, peptides, and aptamers.

Antigen-binding fragment or antibody fragment thereof refers to a portion of an intact antibody. An antigen-binding fragment or antibody fragment thereof refers to a portion of an intact antibody that binds to an antigen (e.g., ADGRE2). An antigen-binding fragment can contain the antigenic determining variable regions of an intact antibody. Examples of antibody fragments include, but are not limited to Fab, Fab', F(ab')2, and Fv fragments, linear antibodies, antibody mimetics, scFvs, and single chain antibodies.

Complementarity Determining Region (CDR): A "CDR" of a variable domain are amino acid residues within the variable region that are identified in accordance with the definitions of the Kabat, Chothia, the accumulation of both Kabat and Chothia, AbM, contact, and/or conformational definitions or any method of CDR determination well known in the art. Antibody CDRs may be identified as the hypervariable regions originally defined by Kabat et al. See, e.g., Kabat et al., 1992, Sequences of Proteins of Immunological Interest, 5th ed., Public Health Service, NIH, Washington D.C. The positions of the CDRs may also be identified as the structural loop structures originally described by Chothia and others. See, e.g., Chothia et al., Nature 342:877-883, 1989. Other approaches to CDR identification include the "AbM definition," which is a compromise between Kabat and Chothia and is derived using Oxford Molecular's AbM antibody modeling software (now Accelrys®), or the "contact definition" of CDRs based on observed antigen contacts, set forth in MacCallum et al., J. Mol. Biol., 262:732-745, 1996. In another approach, referred to herein as the "conformational definition" of CDRs, the positions of the CDRs may be identified as the residues that make enthalpic contributions to antigen binding. See, e.g., Makabe et al., Journal of Biological Chemistry, 283: 1 156-1166, 2008. Still other CDR boundary definitions may not strictly follow one of the above approaches, but will nonetheless overlap with at least a portion of the Kabat CDRs, although they may be shortened or lengthened in light of prediction or experimental findings that particular residues or groups of residues or even entire CDRs do not significantly impact antigen binding. As used herein, a CDR may refer to CDRs defined by any approach known in the art, including combinations of approaches. The methods used herein may utilize CDRs defined according to any of these approaches. For any given embodiment containing more than one CDR, the CDRs may be defined in accordance with any of Kabat, Chothia, extended, AbM, contact, and/or conformational definitions.

Constant region: As used herein, the term "constant region" refers to a polypeptide that corresponds to, or is derived from, one or more constant region immunoglobulin domains of an antibody. A constant region can include any or all of the following immunoglobulin domains: a CH1 domain, a hinge region, a CH2 domain, a CH3 domain (derived from an IgA, IgD, IgG, IgE, or IgM), and a CH4 domain (derived from an IgE or IgM).

Epitope: As used herein, an "epitope" is a term in the art and refers to a localized region of an antigen to which an antibody can specifically bind. An epitope can be, for example, contiguous amino acids of a polypeptide (linear or contiguous epitope) or an epitope can, for example, come together from two or more non-contiguous regions of a polypeptide or polypeptides (conformational, non-linear, discontinuous, or non-contiguous epitope). In certain embodiments, the epitope to which an antibody binds can be determined by, e.g., NMR spectroscopy, X-ray diffraction crystallography studies, ELISA assays, hydrogen/deuterium exchange coupled with mass spectrometry (e.g., liquid chromatography electrospray mass spectrometry), array-based oligo-peptide scanning assays, and/or mutagenesis mapping (e.g., site-directed mutagenesis mapping). For X-ray crystallography, crystallization may be accomplished using any of the known methods in the art (e.g., Giege R et al, (1994) Acta Crystallogr D Biol Crystallogr 50(Pt 4): 339-350; McPherson A (1990) Eur J Biochem 189: 1-23; Chayen N E (1997) Structure 5: 1269-1274; McPherson A (1976) J Biol Chem 251: 6300-6303). Antibody:antigen crystals may be studied using well known X-ray diffraction techniques and may be refined using computer software known in the art, e.g., Refmac and Phenix. Mutagenesis mapping studies may be accomplished using any method known to one of skill in the art. See, e.g., Champe M et al, (1995) J Biol Chem 270: 1388-1394 and Cunningham B C & Wells J A (1989)

Science 244: 1081-1085 for a description of mutagenesis techniques, including alanine scanning mutagenesis techniques.

Fc region: As used herein, the term "Fc region" refers to a dimer of two "Fc polypeptides", each "Fc polypeptide" comprising the constant region of an antibody excluding the first constant region immunoglobulin domain. In some embodiments, an "Fc region" includes two Fc polypeptides linked by one or more disulfide bonds, chemical linkers, or peptide linkers. "Fc polypeptide" refers to the last two constant region immunoglobulin domains of IgA, IgD, and IgG, and the last three constant region immunoglobulin domains of IgE and IgM, and may also include part or all of the flexible hinge N-terminal to these domains. For IgG, "Fc polypeptide" comprises immunoglobulin domains Cgamma2 (Cγ2) and Cgamma3 (Cγ3) and the lower part of the hinge between Cgamma1 (Cγ1) and Cγ2. Although the boundaries of the Fc polypeptide may vary, the human IgG heavy chain Fc polypeptide is usually defined to comprise residues starting at T223 or C226 or P230, to its carboxyl-terminus, wherein the numbering is according to the EU index as in Kabat et al. (1991, NIH Publication 91-3242, National Technical Information Services, Springfield, VA). For IgA, Fc polypeptide comprises immunoglobulin domains Calpha2 (Cα2) and Calpha3 (Cα3) and the lower part of the hinge between Calpha1 (Cα1) and Cα2. An Fc region can be synthetic, recombinant, or generated from natural sources such as IVIG.

Humanized antibodies: As used herein, humanized antibodies are antibodies derived from non-human species whose protein sequences have been modified to increase their similarity to antibody variants produced naturally in humans. "Humanization" is usually applied to monoclonal antibodies developed for administration to humans (for example, anti-ADGRE2 antibodies developed as anti-cancer drugs). In some embodiments, humanization is employed when developing a specific antibody in a non-human immune system (such as that in mice).

$K_a$: As used herein, "$K_a$" refers to an association rate of a particular binding moiety and a target to form a binding moiety/target complex.

$K_d$: As used herein, "$K_d$" refers to a dissociation rate of a particular binding moiety/target complex.

$K_D$: As used herein, "$K_D$" refers to a dissociation constant, which is obtained from the ratio of $K_d$ to $K_a$ (i.e., $K_d/K_a$) and is expressed as a molar concentration (M). $K_D$ values can be determined using methods well established in the art, e.g., by using surface plasmon resonance, or using a biosensor system such as a Biacore® system.

Reference: A "reference" entity, system, amount, set of conditions, etc., is one against which a test entity, system, amount, set of conditions, etc. is compared as described herein. For example, in some embodiments, a "reference" antibody is a control antibody that is not engineered as described herein.

Selective binding: As used herein, "selective binding", "selectively binds" "specific binding", or "specifically binds" refers to, with respect to a binding moiety and a target, preferential association of a binding moiety to a target and not to an entity that is not the target. A certain degree of non-specific binding may occur between a binding moiety and a non-target. In some embodiments, a binding moiety selectively binds a target if binding between the binding moiety and the target is greater than 2-fold, greater than 5-fold, greater than 10-fold, or greater than 100-fold as compared with binding of the binding moiety and a non-target. In some embodiments, a binding moiety selectively binds a target if the binding affinity is less than about $10^{-5}$ M, less than about $10^{-6}$ M, less than about $10^{-7}$ M, less than about $10^{-8}$ M, or less than about $10^{-9}$ M. In some embodiments, a molecule that specifically binds to an antigen may bind to other peptides or polypeptides, generally with lower affinity as determined by, e.g., immunoassays, BIACORE®, KinExA 3000 instrument (Sapidyne Instruments, Boise, ID), or other assays known in the art.

Single-chain variablefragment (scFv): As used herein, the term "single-chain variable fragment" or "scFv" refers to a fusion protein of the variable regions of the heavy ($V_H$) and light chains ($V_L$) of an immunoglobulin (e.g., mouse or human) covalently linked to form a $V_H$::VL heterodimer. The heavy ($V_H$) and light chains ($V_L$) are either joined directly or joined by a peptide-encoding linker (e.g., 10, 15, 20, 25 amino acids), which connects the N-terminus of the $V_H$ with the C-terminus of the $V_L$, or the C-terminus of the $V_H$ with the N-terminus of the $V_L$. The linker is usually rich in glycine for flexibility, as well as serine or threonine for solubility. The linker can link the heavy chain variable region and the light chain variable region of the extracellular antigen-binding domain. Non-limiting examples of linkers are disclosed in Shen et al., Anal. Chem. 80(6):1910-1917 (2008) and WO 2014/087010, the contents of which are hereby incorporated by reference in their entireties.

Subject: The term "subject", as used herein, means any subject for whom diagnosis, prognosis, or therapy is desired. For example, a subject can be a mammal, e.g., a human or non-human primate (such as an ape, monkey, orangutan, or chimpanzee), a dog, cat, guinea pig, rabbit, rat, mouse, horse, cattle, or cow.

Target: As used herein, a "target" is any molecule specifically bound by a binding moiety of an antibody or an antigen-binding fragment thereof. In some embodiments, a target is an antigen described herein (e.g., ADGRE2). In some embodiments, a target is an FcR (e.g., FcRn). The terms "first target" and "second target" are used herein to refer to molecules of two distinct molecular species, rather than two molecules of the same molecular species. For example, in some embodiments, a first target is a serum protein and a second target is FcRn.

Therapeutically effective amount: As used herein, the term "therapeutically effective amount" refers to an amount of a therapeutic molecule (e.g., an anti-ADGRE2 antibody described herein) which confers a therapeutic effect on a treated subject, at a reasonable benefit/risk ratio applicable to any medical treatment. Therapeutic effect may be objective (i.e., measurable by some test or marker) or subjective (i.e., subject gives an indication of or feels an effect). In particular, the "therapeutically effective amount" refers to an amount of a therapeutic molecule or composition effective to treat, ameliorate, or prevent a particular disease or condition, or to exhibit a detectable therapeutic or preventative effect, such as by ameliorating symptoms associated with the disease, preventing or delaying the onset of the disease, and/or also lessening the severity or frequency of symptoms of the disease. A therapeutically effective amount can be administered in a dosing regimen that may comprise multiple unit doses. For any particular therapeutic molecule, a therapeutically effective amount (and/or an appropriate unit dose within an effective dosing regimen) may vary, for example, depending on route of administration, on combination with other pharmaceutical agents. Also, the specific therapeutically effective amount (and/or unit dose) for any particular subject may depend upon a variety of factors including the disorder being treated and the severity of the disorder; the activity of the specific pharmaceutical agent employed; the specific composition employed; the age, body weight, general health, sex and diet of the subject; the time of administration, route of administration, and/or rate of excretion or metabolism of the specific therapeutic molecule employed; the duration of the treatment; and like factors as is well known in the medical arts.

Treatment: As used herein, the term "treatment" (also "treat" or "treating") refers to any administration of a therapeutic molecule (e.g., an anti-ADGRE2 antibody described herein) that partially or completely alleviates, ameliorates, relieves, inhibits, delays onset of, reduces severity of and/or reduces incidence of one or more symptoms or features of a particular disease, disorder, and/or condition. Such treatment may be of a subject who does not exhibit signs of the relevant disease, disorder and/or condition and/or of a subject who exhibits only early signs of the disease, disorder, and/or condition. Alternatively or additionally, such treatment may be of a subject who exhibits one or more established signs of the relevant disease, disorder and/or condition.

BRIEF DESCRIPTION OF DRAWINGS

Drawings are for illustration purposes only; not for limitation.

FIG. 1 depicts a table that shows number of residues changed in humanized ADGRE2 antibodies relative to mouse reference sequence. The table also shows number of residues different from germline sequence.

FIG. 2 depicts a table that shows number of residues changed in humanized ADGRE2 antibodies relative to mouse reference sequence. The table also shows number of residues different from germline sequence.

FIG. 3A-3D show two dimensional projections for an exemplary antibody VH sequence. The amino acid sequence is shown forming nine antiparallel β strands of the immunoglobulin fold. The N to C-terminus of the primary sequence is traceable from the upper left to the bottom right.

DETAILED DESCRIPTION

Figure 3A:
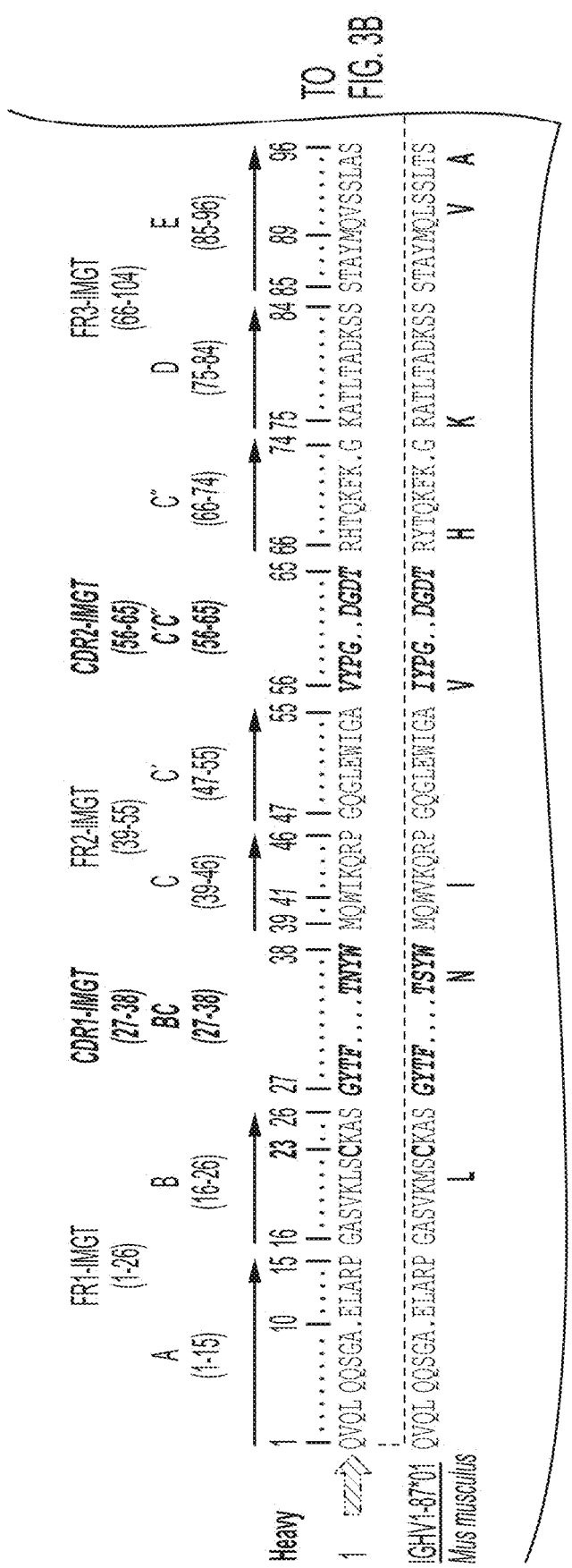

The present disclosure is based, in part, on the discovery of engineered antibodies and antigen-binding fragments thereof that exhibit binding to Adhesion G Protein-Coupled Receptor E2, ADGRE2 (e.g., human ADGRE2). In some embodiments, a humanized anti-ADGRE2 antibody and fragments thereof are presented herein. ADGRE2, also known as EMR2, CD312, VBU or CD97, is a cell surface receptor that is a member of the adhesion G-protein coupled receptor (GPCR) family. ADGRE2 binds to the chondroitin sulfate moiety of glycosaminoglycan chains and promotes cell attachment.

ADGRE2 is expressed by monocytes, macrophages, dendritic cells and granulocytes playing a role in chemotaxis, cell adhesion and degranulation. In macrophages, ADGRE2 promotes the release of inflammatory cytokines, including IL8 and TNF, signaling through G-proteins.

ADGRE2 is highly expressed in cancerous cells, including for example in relapsed and refractory acute myeloid leukemia. In some embodiments, inhibiting ADGRE2 is used to treat cancers. In some embodiments, inhibiting ADGRE2 is used to treat relapsed and refractory acute myeloid leukemia.

Antibodies

Anti-ADGRE2 antibody binds to ADGRE2 antigen. In some embodiments, the anti-ADGRE2 antibody binds human ADGRE2. ADGRE2 is described in the art and is described, for example, in Uniprot sequence reference Q9UHX3-1.

In some embodiments, human ADGRE2 comprises an EGF-like 1 domain, an EGF-like 2 domain, an EGF-like 3 domain, an EGF-like 4 domain, an EGF-like 5 domain, and a GPS domain.

An anti-ADGRE2 antibody described herein can be an immunoglobulin, heavy chain antibody, light chain antibody, LRR-based antibody, or other protein scaffold with antibody-like properties, as well as other immunological binding moiety known in the art, including, e.g., a Fab, Fab', Fab'2, $Fab_2$, $Fab_3$, $F(ab')_2$, Fd, Fv, Feb, scFv, SMIP, antibody, diabody, triabody, tetrabody, minibody, maxibody, tandab, DVD, BiTe, TandAb, or the like, or any combination thereof. The subunit structures and three-dimensional configurations of different classes of antibodies are known in the art.

An antibody can be an immunoglobulin molecule of four polypeptide chains, e.g., two heavy (H) chains and two light (L) chains. A heavy chain can include a heavy chain variable domain and a heavy chain constant domain. A heavy chain constant domain can include CH1, hinge, CH2, CH3, and in some instances CH4 regions. A suitable heavy chain constant region may be derived from any immunoglobulin (e.g., IgA, IgG, or IgE). In some embodiments, a suitable heavy chain constant region may be derived from IgG1, IgG2, or IgG4. In particular embodiments, a suitable heavy chain constant region is derived from IgG1. A light chain can include a light chain variable domain and a light chain constant domain. A light chain constant domain can include either a kappa light chain or a lambda light chain. A heavy chain variable domain of a heavy chain and a light chain variable domain of a light chain can typically be further subdivided into regions of variability, termed complementarity determining regions (CDRs), interspersed with regions that are more conserved, termed framework regions (FR). Such heavy chain and light chain variable domains can each include three CDRs and four framework regions, arranged from amino-terminus to carboxyl-terminus in the following order: FR1, CDR1, FR2, CDR2, FR3, CDR3, FR4, one or more of which can be engineered as described herein. The assignment of amino acids to each domain is in accordance with the definitions of Kabat Sequences of Proteins of Immunological Interest (National Institutes of Health, Bethesda, Md. (1987 and 1991)), or Chothia & Lesk *J. Mol. Biol.* 196:901-917 (1987); Chothia et al. *Nature* 342:878-883 (1989). As used herein, CDRs are referred to for each of the heavy (HCDR1, HCDR2, HCDR3) and light (LCDR1, LCDR2, LCDR3) chains.

Embodiments of the invention include antibodies comprising the CDRs found in the VH and VL domains described herein that are identified using conventional numbering systems, such as the IMGT, Kabat and Clothia numbering systems. Such numbering systems are well-known in the art. In certain embodiments, the CDRs are identified or numbered according to the IMGT numbering system.

Exemplary Antibodies

In some embodiments, the anti-ADGRE2 antibodies or fragments thereof described herein comprise a common heavy chain variable region.

In certain embodiments, the CDRs are identified according to the IMGT numbering system.

In some embodiments, the anti-ADGRE2 antibody comprises heavy chain variable region (VH) complementarity determining region (CDR) sequences: VH CDR1:

GYTFTNYW (SEQ ID NO: 1), VH CDR2: VYPGDGDT (SEQ ID NO: 2) and VH CDR3: ARGFTAYGMDY (SEQ ID NO: 3).

In some embodiments, the heavy chain variable comprises an amino afdC-127,DNA sequence of (SEQ ID NO: 7)
QVQLQQSGAEVKKPGASVKLSCKASGYTFTNYWMQWIKQAPGQGLEWIGA

VYPGDGDTRYTQKFKGKATLTADKSTSTAYMEVSSLRSEDTAVYYCARGF

TAYGMDYWGQGTTVTVSS.

In some embodiments, the heavy chain variable comprises an amino acid sequence of (SEQ ID NO: 9)
QVQLQQSGAEVKKPGASVKLSCKASGYTFTNYWMQWIRQAPGQGLEWIGA

VYPGDGDTRYTQKFQGRATLTADTSISTAYMEVSRLRSDDTAVYYCARGF

TAYGMDYWGQGTTVTVSS.

In some embodiments, the heavy chain variable comprises an amino acid sequence of (SEQ ID NO: 11)
QVQLQQSGAEVKKPGASVKLSCKASGYTFTNYWMQWVRQAPGQGLEWIGA

VYPGDGDTRYTQKFQGRATLTADTSTSTVYMEVSSLRSEDTAVYYCARGF

TAYGMDYWGQGTTVTVSS.

In some embodiments, the heavy chain variable comprises an amino acid sequence of (SEQ ID NO: 13)
QVQLQQSGAEVKKPGASVKVSCKASGYTFTNYWMQWVRQAPGQGLEWMGA

VYPGDGDTRHTQKFKGRVTMTRDTSTSTVYMELSSLRSEDTAVYYCARGF

TAYGMDYWGQGTLVTVSS.

In some embodiments, the heavy chain variable comprises an amino acid sequence of (SEQ ID NO: 15)
QVQLQQSGAEVKKPGASVKVSCKASGYTFTNYWMQWVRQAPGQGLEWIGA

VYPGDGDTRHTQKFKGRVTMTADTSTSTVYMELSSLRSEDTAVYYCARGF

TAYGMDYWGQGTLVTVSS.

In some embodiments, the heavy chain variable comprises an amino acid sequence of (SEQ ID NO: 17)
QVQLQQSGAEVKKPGASVKLSCKASGYTFTNYWMQWIRQAPGQGLEWIGA

VYPGDGDTRHTQKFQGRATLTADTSTSTAYMEVSSLRSEDTAVYYCARGF

TAYGMDYWGQGTTVTVSS.

In some embodiments, the heavy chain variable comprises an amino acid sequence of (SEQ ID NO: 30)
QVQLVQSGAEVAKPGASVKLSCKASGYTFTNYWMQWIKQAPGQGLEWIGA

VYPGDGDTRHTQKTKGKATLTADKSTSTAYMEVSSLRSEDTAVYYCARGF

TAYGMDYWGQGTTVTVSS.

In some embodiments, the anti-ADGRE2 antibody comprises a heavy chain amino acid sequence having at least about 85%, about 90%, about 91%, about 92%, about 93%, about 94%, about 95%, about 96%, about 97%, about 98%, or about 99% sequence identity to SEQ ID NO: 7, 9, 11, 13, 15, 17, or 30.

In some embodiments, the anti-ADGRE2 antibody comprises a heavy chain amino acid sequence having at least about 85%, about 90%, about 91%, about 92%, about 93%, about 94%, about 95%, about 9%, at 97%, about 98%, or about 99% sequence identity to SEQ ID NO: 7, 9, 11, 13, 15, 17, or 30 while also including one or more of the VH CDR1, vHCDR2, and/or vHCDR3 sequences described herein.

In some embodiments, the engineered antibodies comprise a heavy chain amino acid sequence identical to SEQ ID NO: 7, 9, 11, 13, 15, 17 or 30. In certain embodiments, the $V_H$ comprises an amino acid sequence that is at least about 80% (e.g., at least about 85%, at least about 90%, or at least about 95%) identical or homologous to the amino acid sequence set forth in SEQ ID NO: 7, 9, 11, 13, 15, 17 or 30. For example, the $V_H$ comprises an amino acid sequence that is about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99% or about 100% identical or homologous to the amino acid sequence set forth in SEQ ID NO: 7, 9, 11, 13, 15, 17 or 30. In some embodiments, the anti-ADGRE2 antibody comprises no more than 30, 29, 28, 27, 26, 25, 24, 23, 22, 21, 20, 19, 18, 17, 16, 15, 14, 13, 12, 11, 10, 9, 8, 7, 6, 5, 4, 3, or 2 amino acid substitutions relative to SEQ ID NO: 7, 9, 11, 13, 15, 17 or 30.

In some embodiments, the anti-ADGRE2 heavy chain variable is encoded by a polynucleotide that comprises the nucleic acid sequence encoding the amino acid sequence of the humanized ADGRE2.

As will be understood by those of skill in the art, any such heavy chain CDR sequence may be readily combined, e.g., by techniques of molecular biology, with any other antibody sequences or domains provided herein or otherwise known in the art, including any framework regions, CDRs, or constant domains, or portions thereof as disclosed herein or otherwise known in the art, as may be present in an antibody or an antigen-binding fragment thereof of any format as disclosed herein or otherwise known in the art.

In various engineered antibodies described herein, a heavy chain constant domain can be of any class (or subclass). In various engineered antibodies described herein, a heavy chain constant domain can include the amino acid sequence of any of one or more of IgG, IgM, IgA, IgD, or IgE, including subclasses such as IgG1, IgG2, IgG3, IgG4, IgA1, and IgA2. In various embodiments, a constant domain of engineered antibodies described herein can include a mixture of two or more classes (or subclasses) of immunoglobulin heavy chain constant domain. For example, an anti-ADGRE2 antibody can include a first portion of a constant domain that has a sequence of an immunoglobulin constant domain selected from an IgG, IgM, IgA, IgD, or IgE class constant domain and a second portion of a constant domain that has a sequence of an immunoglobulin constant domain different from the first and selected from an IgG, IgM, IgA, IgD, or IgE class constant domain. In some instances, a constant domain of an anti-ADGRE2 antibody described herein can include a mixture of two or more subclasses of a particular class of constant domain, e.g., a first portion of a constant domain that has a sequence of an immunoglobulin constant domain selected from an IgG1, IgG2, IgG3, or IgG4 subclass constant domain and a second portion of a constant domain that has a sequence of an immunoglobulin constant domain different from the first and selected from an IgG1, IgG2, IgG3, or IgG4 subclass constant domain. In some particular embodiments, a constant domain includes all or a portion of an IgG2 constant domain and all or a portion of an IgG4 constant domain.

In some instances, an anti-ADGRE2 antibody includes an antibody constant region, Fc region or Fc fragment that exhibits altered binding (as compared to a reference constant region) to one or more Fc receptors (e.g., FcγRI, FcγRIIA, FcγRIIB, FcγRIIIA, FcγRIIIB, FcγRIV, or FcRn receptor). In some embodiments, a constant region, Fc region or Fc fragment is engineered to bind to a target (e.g., an FcRn receptor) in an altered manner (e.g., in a pH sensitive manner (e.g., in a more or less pH sensitive manner) and/or decreased or increased binding) relative to a reference constant region, Fc region or Fc fragment. In some embodiments, an anti-ADGRE2 antibody includes an antibody constant region, Fc region or Fc fragment that exhibits decreased binding (as compared to a reference constant region) to one or more Fcγ receptor (e.g., FcγRI, FcγRIIA, FcγRIIB, FcγRIIIA, FcγRIIIB, or FcγRIV). In some embodiments, anti-ADGRE2 antibody includes an antibody constant region, Fc region or Fc fragment that exhibits increased binding to the FcRn receptor (as compared to a reference constant region) at serum pH and/or at intracellular pH.

For example, an anti-ADGRE2 antibody can include a constant region, Fc region or Fc fragment of an IgG antibody engineered to include an amino acid addition, deletion, or substitution, of one or more of amino acid residues 251-256, 285-290, 308-314, 385-389, and 428-436 (Kabat numbering (Kabat et al., (1991) Sequences of Proteins of Immunological Interest, NIH)). Without wishing to be bound by theory, it is believed that one or more of these constant region, Fc region, or Fc fragment amino acids mediate interaction with an Fc receptor, e.g., FcRn. In some embodiments, one or more of these disclosed amino acids is substituted with histidine, arginine, lysine, aspartic acid, glutamic acid, serine, threonine, asparagine, or glutamine. In some embodiments, a non-histidine residue is substituted with a histidine residue. In some embodiments, a histidine residue is substituted with a non-histidine residue.

In some embodiments, an anti-ADGRE2 antibody includes a constant region, Fc region or Fc fragment of an IgG antibody having amino acid modifications at one or more of positions 308, 309, 311, 312, and 314, more specifically, having substitutions at one or more of positions 308, 309, 311, 312 and 314 with threonine, proline, serine, aspartic acid and leucine respectively. In some embodiments, residues at one or more of positions 308, 309, and 311 are substituted with isoleucine, proline, and glutamic acid, respectively. In yet other embodiments, residues at one or more of positions 308, 309, 311, 312, and 314, are substituted with threonine, proline, serine, aspartic acid, and leucine, respectively.

In some embodiments, an anti-ADGRE2 antibody includes a constant region, Fc region or Fc fragment of an IgG antibody having amino acid modifications at one or more of positions 251, 252, 254, 255, and 256, more specifically, having substitutions at one or more of these positions. In some embodiments, residue 251 is substituted with leucine or arginine, residue 252 is substituted with leucine, tyrosine, phenylalanine, serine, tryptophan or threonine, residue 254 is substituted with threonine or serine, residue 255 is substituted with leucine, glycine, isoleucine or arginine, and/or residue 256 is substituted with serine, phenylalanine, arginine, glutamine, glutamic acid, aspartic acid, alanine, asparagine or threonine. In some embodiments, residue 251 is substituted with leucine, residue 252 is substituted with tyrosine or leucine, residue 254 is substituted with threonine or serine, and/or residue 255 is substituted with arginine. In yet other embodiments, residue 252 is substituted with phenylalanine and/or residue 256 is substituted with aspartic acid. In some embodiments, residue 251 is substituted with leucine, residue 252 is substituted with tyrosine, residue 254 is substituted with threonine or serine, and/or residue 255 is substituted with arginine.

In some embodiments, an anti-ADGRE2 antibody includes a constant region, Fc region or Fc fragment of an IgG antibody having amino acid modifications at one or more of positions 428, 433, 434, 435, and 436, more specifically, having substitutions at one or more of these positions. In some embodiments, residue 428 is substituted with methionine, threonine, leucine, phenylalanine, or serine, residue 433 is substituted with lysine, arginine, serine, isoleucine, proline, glutamine, or histidine, residue 434 is substituted with phenylalanine, tyrosine, or histidine, residue 435 is substituted with tyrosine, and/or residue 436 is substituted with histidine, asparagine, arginine, threonine, lysine, methionine, or threonine. In some embodiments, residues at one or more positions 433, 434, 435, and 436 are substituted with lysine, phenylalanine, tyrosine, and histidine, respectively. In some embodiments, residue 428 is substituted with methionine and/or residue 434 is substituted with tyrosine.

In some embodiments, an anti-ADGRE2 antibody includes a constant region, Fc region or Fc fragment of an IgG antibody having amino acid modifications at one or more of positions 385, 386, 387, and 389, more specifically, having substitutions at one or more of these positions. In some embodiments, residue 385 is substituted with arginine, aspartic acid, serine, threonine, histidine, lysine, or alanine, residue 386 is substituted with threonine, proline, aspartic acid, serine, lysine, arginine, isoleucine, or methionine, residue 387 is substituted with arginine, histidine, serine, threonine, alanine, or proline and/or residue 389 is substituted with proline or serine. In some embodiments, residues at one or more of positions 385, 386, 387, and 389 are substituted with arginine, threonine, arginine, and proline, respectively. In some embodiments, residues at one or more of positions 385, 386, and 389 are substituted with aspartic acid, proline, and serine, respectively.

In some embodiments, an anti-ADGRE2 antibody includes a constant region, Fc region or Fc fragment of an IgG antibody having one or more of the following substitutions: leucine at residue 251, tyrosine or leucine at residue 252, threonine or serine at residue 254, arginine at residue 255, threonine at residue 308, proline at residue 309, serine at residue 311, aspartic acid at residue 312, leucine at residue 314, arginine at residue 385, threonine at residue 386, arginine at residue 387, proline at residue 389, methionine at residue 428, lysine at residue 433, phenylalanine or tyrosine at residue 434, tyrosine at position 435, and/or tyrosine at position 436. Additional amino acid substitutions that can be included in a constant region, Fc region or Fc fragment include those described in, e.g., U.S. Pat. Nos. 6,277,375; 8,012,476; and 8,163,881.

In some embodiments, an anti-ADGRE2 antibody described herein includes a heavy chain constant domain that includes the Ala-Ala mutation described in, e.g., PCT Publication nos. WO 94/28027 and WO 98/47531; and Xu et al. (2000) Cell Immunol 200:16-26. Thus, in some embodiments, an anti-ADGRE2 antibody with one or more mutations within the heavy chain constant region including the Ala-Ala mutation has reduced or no effector function. According to these embodiments, the constant region of an anti-ADGRE2 antibody described herein can comprise a substitution to an alanine at position 234 and/or a mutation to an alanine at position 235 (EU numbering).

As will be understood by those of skill in the art, any such heavy chain constant domain sequence may be readily combined, e.g., by techniques of molecular biology, with any other antibody sequences or domains provided herein or otherwise known in the art, including any framework regions, CDRs, or constant domains, or portions thereof as disclosed herein or otherwise known in the art, as may be present in an antibody or an antigen-binding fragment thereof of any format as disclosed herein or otherwise known in the art.

The present invention additionally provides an anti-ADGRE2 antibody or fragment thereof comprising various specified sequences in one or more light chain variable regions, including in the light chain complementary determining regions LCDR1-3. In various embodiments, molecules with specified light chain variable regions are provided with heavy chain sequences as discussed above. In certain embodiments, the CDRs are identified according to the IMGH numbering system.

Thus, in one aspect, the present invention provides an anti-ADGRE2 antibody or fragment thereof comprising a light chain variable region with complementarity determining region (CDR) sequences of SSVSY (SEQ ID NO: 4), an LCDR2 comprising an amino acid sequence of DTS (SEQ ID NO: 5), and an LCDR3 comprising an amino acid sequence of QQWSSNPLT (SEQ ID NO: 6).

In some embodiments, the anti-ADGRE2 antibody or fragment thereof comprises an immunoglobulin light chain variable (VL) region comprising an amino acid sequence that is at least about 90% identical to SEQ ID NO: 8, 10, 12, 14, 16, 18, or 31 and an immunoglobulin heavy chain variable (VH) region comprising an amino acid sequence that is at least about 90% identical to SEQ ID NO: 7, 9, 11, 13, 15, 17 or 30.

In some embodiments, the VL region comprises an amino acid sequence that is at least about 95% identical to SEQ ID NOs: 8, 10, 12, 14, 16, 18, or 31.

In some embodiments, the anti-ADGRE2 antibody or fragment thereof comprises a light chain variable region (VL) comprising an amino acid sequence of

```
                                        (SEQ ID NO: 8)
EIVLTQSPATLSLSPGERATLSCSASSSVSYMHWYQQKPGLAPRLLIYDT

SKLASGIPDRFSGSGSGTDFTLTISRLEPEDFAVYYCQQWSSNPLTFGQG

TKVEIK.
```

In some embodiments, the light chain variable comprises an amino acid sequence of

```
                                        (SEQ ID NO: 10)
EIVLTQSPATMSASPGERVTMSCSASSSVSYMHWYQQKSGLSPKRWIYDT

SKLASGVPDRFSGSGSGTDYTFTISRMEPEDFATYYCQQWSSNPLTFGGG

TKLEIK.
```

In some embodiments, the light chain variable comprises an amino acid sequence of

```
                                        (SEQ ID NO: 12)
EIVLTQSPATMSASPGERVTMSCSASSSVSYMHWYQQKSGLSPKRWIYDT

SKLASGVPDRFSGSGSGTDYTFTISRMEPEDFATYYCQQWSSNPLTFGGG

TKLEIK
```

In some embodiments, the light chain variable comprises an amino acid sequence of

```
                                        (SEQ ID NO: 14)
EIVLTQSPATMSASPGERVTMSCSASSSVSYMHWYQQKSGQSPKRWIYDT

SKLASGVPARFSGSGSGTDYTFTISSMEPEDFATYYCQQWSSNPLTFGGG

TKLEIK.
```

In some embodiments, the light chain variable comprises an amino acid sequence of

```
                                        (SEQ ID NO: 16)
QIVLTQSPATLSLSPGERATLTCSASSSVSYMHWYQQKPGLSPKRWIYDT

SKLASGVPDRFSGSGSGTDYTFTIRRLEPEDFATYYCQQWSSNPLTFGQG

TKVEIK.
```

In some embodiments, the light chain variable comprises an amino acid sequence of

```
                                        (SEQ ID NO: 18)
EIVLTQSPATLSASPGERVTMSCSASSSVSYMHWYQQKPGLAPRRWIYDT

SKLASGVPDRFSGSGSGTDYTFTISRMEPEDFATYYCQQWSSNPLTFGGG

TKLEIK.
```

In some embodiments, the light chain variable comprises an amino acid sequence of

```
                                        (SEQ ID NO: 31)
ETVLTQSPATMSASPGERVTMSCSASSSVSYMHWYQQKSGQSPKRWIYDT

SKLASGVPARFSGSGSGTDYTFTISSMEPEDFATYYCQQWSSNPLTFGGG

TKLEIK.
```

In some embodiments, the anti-ADGRE2 antibody comprises a light chain amino acid sequence having at least about 85%, about 90%, about 91%, about 92%, about 93%, about 94%, about 95%, about 96%, about 97%, about 98%, or about 99% sequence identity to SEQ ID NOs: 8, 10, 12, 14, 16, 18 or 31.

In some embodiments, the anti-ADGRE2 antibody comprises a light chain amino acid sequence having at least about 85%, about 90%, about 95%, about 98%, or about 99% sequence identity to SEQ ID NOs: 8, 10, 12, 14, 16, 18 or 31 while also including one or more of the VL CDR1, vLCDR2, and/or vLCDR3 sequences described herein.

In some embodiments, the anti-ADGRE2 antibody or fragment thereof comprises a light chain amino acid sequence identical to SEQ ID NOs: 8, 10, 12, 14, 16, 18 or 31. In some embodiments, the anti-ADGRE2 antibody comprises no more than 30, 29, 28, 27, 26, 25, 24, 23, 22, 21, 20, 19, 18, 17, 16, 15, 14, 13, 12, 11, 10, 9, 8, 7, 6, 5, 4, 3, or 2 amino acid substitutions relative to SEQ ID NOs: 8, 10, 12, 14, 16, 18 or 31.

As will be understood by those of skill in the art, any such light chain CDR sequence may be readily combined, e.g., by techniques of molecular biology, with any other antibody sequences or domains provided herein or otherwise known in the art, including any framework regions, CDRs, or constant domains, or portions thereof as disclosed herein or otherwise known in the art, as may be present in an antibody or an antigen-binding fragment thereof of any format as disclosed herein or otherwise known in the art.

In some embodiments, an anti-ADGRE2 antibody described herein includes a light chain that includes any light chain constant domain sequence, e.g., a constant sequence of a light chain known to those of skill in the art. As those of skill in the art will be aware, a light chain constant domain may be a kappa light chain constant domain or a lambda light chain constant domain. In certain embodiments, the constant domain of a light chain as disclosed herein is a kappa light chain constant domain. In various embodiments, an anti-ADGRE2 antibody described herein includes a light chain constant domain.

Engineered antibodies can include various heavy chains and light chains described herein. In some embodiments, an anti-ADGRE2 antibody can include two heavy chains and light chains. In various embodiments, the present disclosure encompasses an antibody including at least one heavy chain and/or light chain as disclosed herein, at least one heavy chain and/or light chain framework domain as disclosed herein, at least one heavy chain and/or light chain CDR domain as disclosed herein, and/or any heavy chain and/or light chain constant domain as disclosed herein.

Thus, in one aspect, the present invention provides an anti-ADGRE2 antibody or fragment thereof comprising a heavy chain variable region with complementarity determining region (CDR) sequences of VH CDR1: GYTFTNYW (SEQ ID NO: 1), VH CDR2: VYPGDGDT (SEQ ID NO: 2) and VH CDR3: ARGFTAYGMDY (SEQ ID NO: 3), and light chain variable region with complementarity determining region (CDR) sequences of SSVSY (SEQ ID NO: 4), an LCDR2 comprising an amino acid sequence of DTS (SEQ ID NO: 5), and an LCDR3 comprising an amino acid sequence of QQWSSNPLT (SEQ ID NO: 6).

The table below shows exemplary heavy chain variable region(VH) and light chain variable region sequences of humanized ADGRE2 antibodies disclosed herein.

| Domain | Anti-ADGRE Variable Heavy and Light Chain Sequences |
|---|---|
| VH_1 | QVQLQQSGAEVAKPGASVKLSCKASGYTFTNYWMQWIKQAPGQGLEWIGAVYPGDGDTRHTQKFKGKATLTADKSTSTAYMEVSSLRSEDTAVYYCARGFTAYGMDYWGQGTTVTVSS (SEQ ID NO: 7) |
| VL_1 | EIVLTQSPATMSASPGERVTMSCSASSSVSYMHWYQQKSGQSPKRWIYDTSKLASGVPARFSGSGSGTDYTFTISSMEPEDFATYYCQQWSSNPLTFGGGTKLEIK (SEQ ID NO: 14) |
| VH_2 | QVQLQQSGAEVKKPGASVKLSCKASGYTFTNYWMQWIRQAPGQGLEWIGAVYPGDGDTRYTQKFQGRATLTADTSISTAYMEVSRLRSDDTAVYYCARGFTAYGMDYWGQGTTVTVSS (SEQ ID NO: 9) |
| VL_2 | EIVLTQSPATMSASPGERVTMSCSASSSVSYMHWYQQKSGLSPKRWIYDTSKLASGVPDRFSGSGSGTDYTFTISRMEPEDFATYYCQQWSSNPLTFGGGTKLEIK (SEQ ID NO: 10) |
| VH_3 | QVQLQQSGAEVKKPGASVKLSCKASGYTFTNYWMQWVRQAPGQGLEWIGAVYPGDGDTRYTQKFQGRATLTADTSTSTVYMEVSSLRSEDTAVYYCARGFTAYGMDYWGQGTTVTVSS (SEQ ID NO: 11) |
| VH_4 | QVQLQQSGAEVKKPGASVKVSCKASGYTFTNYWMQWVRQAPGQGLEWMGAVYPGDGDTRHTQKFKGRVTMTRDTSTSTVYMELSSLRSEDTAVYYCARGFTAYGMDYWGQGTLVTVSS (SEQ ID NO: 13) |
| VL_4 | EIVLTQSPATLSLSPGERATLSCSASSSVSYMHWYQQKPGLAPRLLIYDTSKLASGIPDRFSGSGSGTDFTLTISRLEPEDFAVYYCQQWSSNPLTFGQGTKVEIK (SEQ ID NO: 8) |
| VH_5 | QVQLQQSGAEVICKPGASVKVSCKASGYTFTNYWMQWVRQAPGQGLEWIGAVYPGDGDTRHTQKFKGRVTMTADKSTSTVYMELSSLRSEDTAVYYCARGFTAYGMDYWGQGTLVTVSS (SEQ ID NO: 15) |
| VL_5 | QIVLTQSPATLSLSPGERATLTCSASSSVSYMHWYQQKPGLSPKRWIYDTSKLASGVPDRFSGSGSGTDYTFTIRRLEPEDFATYYCQQWSSNPLTFGQGTKVEIK (SEQ ID NO: 16) |
| VH_6 | QVQLQQSGAEVKKPGASVKLSCKASGYTFTNYWMQWIRQAPGQGLFAVIGAVYPGDGDTRYTQKFQGRATITADTSTSTAYMEVSSLRSEDTAVYYCARGFTAYGMDYWGQGTTVTVSS (SEQ ID NO: 17) |
| VL_6 | EIVLTQSPATLSASPGERVTMSCSASSSVSYMHWYQQKPGLAPRRWIYDTSKLASGVPDRFSGSGSGTDYTFTISRMEPEDFATYYCQQWSSNPLTFGGGTKLEIK (SEQ ID NO: 18). |

-continued

| Domain | Anti-ADGRE Variable Heavy and Light Chain Sequences |
|---|---|
| VH_7 | QVQLVQSGAEVAKPGASVKLSCKASGYTFTNYWMQWIKQAPGQG<br>LEWIGAVYPGDGDTRHTQKFKGKATLTADKSTSTAYMEVSSLRSE<br>DTAVYYCARGFTAYGMDYWGQGTTVTVSS (SEQ ID NO: 30) |
| VL_7 | EIVLTQSPATMSASPGERVTMSCSASSSVSYMHWYQQKSGQSPKR<br>WIYDTSKLASGVPARFSGSGSGTDYTFTISSMEPEDFATYYCQQWS<br>SNPLTFGGGTKLEIK (SEQ ID NO: 31). |

In various embodiments, an anti-ADGRE2 antibody disclosed herein is a homodimeric monoclonal antibody. In various embodiments, an anti-ADGRE2 antibody disclosed herein is a heterodimeric antibody. In various embodiments, an anti-ADGRE2 antibody is, e.g., a typical antibody or a diabody, triabody, tetrabody, minibody, maxibody, tandab, DVD, BiTe, scFv, TandAb scFv, Fab, Fab$_2$, Fab$_3$, F(ab')$_2$, or the like, or any combination thereof.

In some embodiments, the disclosure provides fusion proteins comprising one or more variable domains or engineered antibodies as described herein, or portion thereof, and one or more additional polypeptides.

Exemplary Single Chain Variable Fragments

In some embodiments, the disclosure provides a single-chain variable fragment. In some embodiments, the scFv is a human scFv. A "single-chain variable fragment" or "scFv" refers to a fusion protein of the variable regions of the heavy ($V_H$) and light chains ($V_L$) of an immunoglobulin (e.g., mouse or human) covalently linked to form a $V_H$:$V_L$ heterodimer. The heavy ($V_H$) and light chains ($V_L$) are either joined directly or joined by a peptide-encoding linker (e.g., 10, 15, 20, 25 amino acids), which connects the N-terminus of the $V_H$ with the C-terminus of the $V_L$, or the C-terminus of the $V_H$ with the N-terminus of the $V_L$. The linker is usually rich in glycine for flexibility, as well as serine or threonine for solubility. The linker can link the heavy chain variable region and the light chain variable region of the extracellular antigen-binding domain. Non-limiting examples of linkers are disclosed in Shen et al., Anal. Chem. 80(6):1910-1917 (2008) and WO 2014/087010, the contents of which are hereby incorporated by reference in their entireties. In certain embodiments, the linker is a G4S linker.

Alternatively or additionally, the scFv may be derived from Fab's (instead of from an antibody, e.g., obtained from Fab libraries). In certain embodiments, the anti-ADGRE2 antibody or fragment thereof is a Fab. In certain embodiments, the Fab is crosslinked. In certain embodiments, the anti-ADGRE2 antibody or fragment thereof is a F(ab)$_2$. Any of the foregoing molecules may be comprised in a fusion protein with a heterologous sequence to form an anti-ADGRE2 antigen antibody or an antigen-binding fragment thereof.

In certain embodiments, the anti-ADGRE2 antibody or fragment thereof binds to ADGRE2 (e.g., human ADGRE2) with a dissociation constant ($K_D$) of at least about $1 \times 10^{-6}$ M, at least about $1 \times 10^{-7}$ M, at least about $1 \times 10^{-8}$ M, at least about $1 \times 10^{-9}$ M, or at least about $1 \times 10^{-10}$ M. In certain embodiments, the anti-ADGRE2 antibody or fragment thereof binds to ADGRE2 (e.g., human ADGRE2) with a dissociation constant ($K_D$) of at least about $2 \times 10^{-8}$ M. In certain embodiments, the anti-ADGRE2 antibody or fragment thereof binds to ADGRE2 (e.g., human ADGRE2) with a dissociation constant ($K_D$) of between about $2 \times 10^{-8}$ M and about $8 \times 10^{-9}$ M.

In some embodiments, the anti-ADGRE2 antibody or fragment thereof binds to ADGRE2 (e.g., human ADGRE2) with a dissociation constant ($K_D$) between about 1 nM and 50 nM, about 5 nM and 30 nM, about 5 nM and 25 nM, or about 8 nM and 20 nM. In some embodiments, the anti-ADGRE2 antibody or fragment thereof binds to ADGRE2 (e.g., human ADGRE2) with a dissociation constant ($K_D$) of at least about 50 nM, at least about 40 nM, at least about 35 nM, at least about 30 nM, at least about 25 nM, at least about 20 nM, at least about 19 nM, at least about 18 nM, at least about 17 nM, at least about 16 nM, at least about 15 nM, at least about 14 nM, at least about 13 nM, at least about 12 nM, at least about 11 nM, at least about 10 nM, at least about 9 nM, at least about 8 nM, at least about 7 nM, at least about 6 nM, at least about 5 nM.

In some embodiments, the anti-ADGRE2 scFv comprises a heavy chain variable region comprising the amino acid sequence set forth in SEQ ID NO: 19, SEQ ID NO: 20, SEQ ID NO: 21, or SEQ ID NO: 22.

In some embodiments, the anti-ADGRE2 scFv comprises a linker comprises or consists of the amino acid sequence set forth in SEQ ID NO: 24, which is provided below:

(SEQ ID NO: 24)
GGGGSGGGGSGGGGS

In some embodiments, the linker comprises or consists of the amino acid sequence set forth in SEQ ID NO: 25, which is provided below:

(SEQ ID NO: 25)
GGGGSGGGGSGGGSGGGGS

In some embodiments, the linker comprises or consists of the amino acid sequence set forth in SEQ ID NO: 26, which is provided below:

(SEQ ID NO: 26)
GGGGSGGGGSGGGGSGGGSGGGGS

In some embodiments, the linker comprises or consists of the amino acid sequence set forth in SEQ ID NO: 27, which is provided below:

(SEQ ID NO: 27)
GGGGSGGGGSGGGGSGGGGSGGGSGGGGS

In some embodiments, the anti-ADGRE2 antibody or fragment thereof comprises a conservative sequence modification (e.g., anti-ADGRE2 antibody or fragment thereof described herein). In some embodiments, the conservative sequence modification is an amino acid modification that does not significantly affect or alter the binding characteristics of the presently disclosed anti-ADGRE2 antibody or fragment thereof (e.g., the antibody or fragment thereof) comprising the amino acid sequence. Conservative modifications can include amino acid substitutions, additions and deletions. Modifications can be introduced into the anti-ADGRE2 antibodies or fragments thereof by standard techniques known in the art, such as site-directed mutagenesis and PCR-mediated mutagenesis. Amino acids can be classified into groups according to their physicochemical properties such as charge and polarity. Conservative amino acid substitutions are ones in which the amino acid residue is replaced with an amino acid within the same group. For example, amino acids can be classified by charge: positively-charged amino acids include lysine, arginine, histidine, negatively-charged amino acids include aspartic acid, glutamic acid, neutral charge amino acids include alanine, asparagine, cysteine, glutamine, glycine, isoleucine, leucine, methionine, phenylalanine, proline, serine, threonine, tryptophan, tyrosine, and valine. In addition, amino acids can be classified by polarity: polar amino acids include arginine (basic polar), asparagine, aspartic acid (acidic polar), glutamic acid (acidic polar), glutamine, histidine (basic polar), lysine (basic polar), serine, threonine, and tyrosine; non-polar amino acids include alanine, cysteine, glycine, isoleucine, leucine, methionine, phenylalanine, proline, tryptophan, and valine. Thus, one or more amino acid residues within a CDR region can be replaced with other amino acid residues from the same group and the altered antibody can be tested for retained function. In certain embodiments, no more than one, no more than two, no more than three, no more than four, no more than five residues within a specified sequence or a CDR region are altered.

In some embodiments, the light chain and/or heavy chain of the anti-ADGRE2 scFv comprise a signal peptide. In some embodiments, the signal peptide comprises an amino acid sequence having at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, or at least about 99% homology or identity to the amino acid sequence MALPVTALLLPLALLLHA (SEQ ID NO: 32), METDTLLLWVLLLWVPGSTG (SEQ ID NO: 33), MYRMQLLSCIALSLALVTNS (SEQ ID NO: 34), METPAQLLFLLLLWLPDTTG (SEQ ID NO: 35), MALPVTALLLPLALLLHAARP (SEQ ID NO: 36), MKWVTFISLLFSSAYS (SEQ ID NO: 37), MDSKGSSQKGSRLLLLLVVSNLLLCQGVVS (SEQ ID NO: 38), MDMRVPAQLLGLLLLWLPDTRC (SEQ ID NO: 28), or MEFGLSWVFLVALLRGVQC (SEQ ID NO: 29). In some embodiments, the signal peptide comprises MALPVTALLLPLALLLHA (SEQ ID NO: 32). In some embodiments, the signal peptide comprises METDTLLLWVLLLWVPGSTG (SEQ ID NO: 33). In some embodiments, the signal peptide comprises MYRMQLLSCIALSLALVTNS (SEQ ID NO: 34). In some embodiments, the signal peptide comprises METPAQLLFLLLLWLPDTTG (SEQ ID NO: 35). In some embodiments, the signal peptide comprises MALPVTALLLPLALLLHAARP (SEQ ID NO: 36). In some embodiments, the signal peptide comprises MKWVTFISLLFSSAYS (SEQ ID NO: 37). In some embodiments, the signal peptide comprises MDSKGSSQKGSRLLLLLVVSNLLLCQGVVS (SEQ ID NO: 38). In some embodiments, the signal peptide comprises MDMRVPAQLLGLLLLWLPDTRC (SEQ ID NO: 28). In some embodiments, the signal peptide comprises MEFGLSWVFLVALLRGVQC (SEQ ID NO: 29).

In some embodiments, the anti-ADGRE2 scFv comprises an amino acid sequence of (SEQ ID NO: 19)
QVQLQQSGAEVAKPGASVKLSCKASGYTFTNYWMQWIKQAPGQGLEWIG

AVYPGDGDTRHTQKFKGKATLTADKSTSTAYMEVSSLRSEDTAVYYCAR

GFTAYGMDYWGQGTTVTVSSGGGGSGGGGSGGGGSEIVLTQSPATMSAS

PGERVTMSCSASSSVSYMHWYQQKSGQSPKRWIYDTSKLASGVPARFSG

SGSGTDYTFTISSMEPEDFATYYCQQWSSNPLTFGGGTKLEIK (scFv "K");

(SEQ ID NO: 20)
QVQLQQSGAEVKKPGASVKLSCKASGYTFTNYWMQWIRQAPGQGLE

WIGAVYPGDGDTRYTQKFQGRATLTADTSISTAYMEVSRLRSDDTAVYY

CARGFTAYGMDYWGQGTTVTVSSGGGGSGGGGSGGGGSEIVLTQSPATM

SASPGERVTMSCSASSSVSYMHWYQQKSGLSPKRWIYDSKLASGVPDRF

SGSGSGTDYTFTISRMEPEDFATYYCQQWSSNPLTFGGGTKLEIK (scFv "B");

(SEQ ID NO: 21)
QVQLQQSGAEVKKPGASVKLSCKASGYTFTNYWMQWVRQAPGQGL

EWIGAVYPGDGDTRYTQKFQGRATLTADTSTSTVYMEVSSLRSEDTAVY

YCARGFTAYGMDYWGQGTTVTVSSGGGGSGGGGSGGGGSEIVLTQSPAT

MSASPGERVTMSCSASSSVSYMHWYQQKSGLSPKRWIYDTSKLASGVPD

RFSGSGSGTDYTFTISRMEPEDFATYYCQQWSSNPLTFGGGTKLEIK (scFv "N");
or (SEQ ID NO: 22)
QVQLQQSGAEVKKPGASVKVSCKASGYTFTNYWMQWVRQAPGQGL

EWMGAVYPGDGDTRHTQKFKGRVTMTRDTSTSTVYMELSSLRSEDTAVY

YCARGFTAYGMDYWGQGTLVTVSSASTGGGGSGGGGSGGGGSEIVLTQS

PATLSLSPGERATLSCSASSSVSYMHWYQQKPGLAPRLLIYDTSKLASG

IPDRFSGSGSGTDFTLTISRLEPEDFAVYYCQQWSSNPLTFGQGTKVEI

K (scFv "A").

In some embodiments, anti-ADGRE2 scFv comprises an amino acid sequence having at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, or at least about 99% homology or identity to SEQ ID NO: 19, 20, 21 or 22.

In some embodiments, the anti-ADGRE2 scFv comprises the amino acid sequence set forth in SEQ ID NO: 19, 20, 21 or 22. In some embodiments, the anti-ADGRE2 scFv comprises the amino acid sequence set forth in SEQ ID NO: 19. In some embodiments, the anti-ADGRE2 scFv comprises the amino acid sequence set forth in SEQ ID NO: 20. In some embodiments, the anti-ADGRE2 scFv comprises the amino acid sequence set forth in SEQ ID NO: 21. In some embodiments, the anti-ADGRE2 scFv comprises the amino acid sequence set forth in SEQ ID NO: 22.

Nucleotide Sequences

The present disclosure includes nucleotide sequences encoding one or more heavy chains, heavy chain variable domains, heavy chain framework regions, heavy chain CDRs, heavy chain constant domains, light chains, light chain variable domains, light chain framework regions, light chain CDRs, light chain constant domains, or other immunoglobulin-like sequences, or antibodies disclosed herein. In various embodiments, such nucleotide sequences may be present in a vector. In various embodiments such nucleotides may be present in the genome of a cell, e.g., a cell of a subject in need of treatment or a cell for production of an antibody, e.g. a mammalian cell for production of a an antibody.

Engineered Antibodies and Fusion Proteins

In some embodiments, the disclosure provides fusion proteins comprising (i) one or more antigen-binding regions described herein (e.g., antigen-binding region of immunoglobulin, heavy chain antibody, light chain antibody, LRR-based antibody, or other protein scaffold with antibody-like properties, as well as other antigen binding moiety known in the art, including, e.g., a Fab, Fab', Fab'2, $Fab_2$, $Fab_3$, $F(ab')_2$, Fd, Fv, Feb, scFv, SMIP, antibody, diabody, triabody, tetrabody, minibody, maxibody, tandab, DVD, BiTe, TandAb, or the like), e.g., one or more variable domains described herein, or portion thereof (e.g., one or more CDRs described herein), and (ii) one or more additional polypeptides. For example, albumin is an abundant serum protein that is protected from degradation by pH-dependent recycling mediated by interaction with FcRn. In some embodiments, one or more variable domains or engineered antibodies as described herein, or portion thereof (e.g., one or more CDRs described herein) is fused to albumin, a portion thereof (such as a portion of albumin that binds to an FcRn), and/or an engineered variant of albumin that binds to FcRn with improved affinity. In other instances, one or more variable domains or engineered antibodies as described herein, or portion thereof (e.g., one or more CDRs described herein) is fused to a polypeptide that binds to albumin to form a fusion protein-albumin complex, which can in turn bind to an FcRn. In some embodiments, the polypeptide that binds to albumin is a single chain variable fragment (scFv). The albumin or portion thereof can include a mutation of one or more amino acids that can modify its binding to an FcRn. Such mutations are known in the art (see, e.g., Andersen et al., *Nature Communications* 3:610 doi: 10.1038/ ncomms1607 (2012)). In other instances, one or more variable domains or engineered antibodies described herein, or portion thereof (e.g., one or more CDRs described herein) is fused to transferrin. Transferrin is recycled by binding to a transferrin receptor (see, e.g., Widera et al., *Adv. Drug Deliv. Rev.* 55:1439-66 (2003)).

Engineered Antibodies and Fragments Thereof

ADGRE2 antibodies and fragments thereof according to the present disclosure are engineered to include one or more binding moieties that specifically bind one or more targets of interest. ADGRE2 antibodies and fragments thereof encompass nucleic acids (e.g., RNA and DNA), proteins (e.g., antibodies), and combination thereof. In some embodiments, pH-dependent binding moieties can be or include, for example, nucleic acids (e.g., RNA and DNA) and aptamers, polypeptides (e.g., antibodies or fragments thereof, albumin, receptors, ligands, signal peptides, avidin, and Protein A), polysaccharides, biotin, hydrophobic groups, hydrophilic groups, drugs, and any organic molecules that bind to receptors.

The ADGRE2 antibodies disclosed herein are humanized antibodies and fragments thereof. Various methods of humanization are known in the art, and include for example, Xoma humanization methods, and other bioinformatics-based methods.

Antibody or Fragment Thereof as Binding Moieties

In some embodiments, an antibody or fragment thereof described herein is an anti-ADGRE2 antibody. In some instances, one or more binding moieties described herein are or include antibodies, antigen-binding fragments thereof, and/or Fc regions (or Fc fragments) thereof. The basic structure of an IgG antibody consists of two identical light polypeptide chains and two identical heavy polypeptide chains linked together by disulfide bonds. The first domain located at the amino terminus of each chain is variable in amino acid sequence, providing antibody binding specificities found in each individual antibody. These are known as heavy chain variable (VH) and light chain variable (VL) regions. The other domains of each chain are relatively invariant in amino acid sequence and are known as constant heavy (CH) and constant light (CL) regions. For an IgG antibody, the light chain includes one variable region (VL) and one constant region (CL). An IgG heavy chain includes a variable region (VH), a first constant region (CH1), a hinge region, a second constant region (CH2), and a third constant region (CH3). In IgE and IgM antibodies, the heavy chain includes an additional constant region (CH4).

Antibodies can include, for example, monoclonal antibodies, recombinantly produced antibodies, monospecific antibodies, multispecific antibodies (including bispecific antibodies), human antibodies, engineered antibodies, humanized antibodies, chimeric antibodies, immunoglobulins, synthetic antibodies, tetrameric antibodies comprising two heavy chain and two light chain molecules, an antibody light chain monomer, an antibody heavy chain monomer, an antibody light chain dimer, an antibody heavy chain dimer, an antibody light chain-antibody heavy chain pair, intrabodies, antibody fusions (sometimes referred to herein as "antibody conjugates"), heteroconjugate antibodies, single domain antibodies, monovalent antibodies, single chain antibodies or single-chain Fvs (scFv), camelized antibodies, affybodies, Fab fragments, F(ab')2 fragments, disulfide-linked Fvs (sdFv), anti-idiotypic (anti-Id) antibodies (including, e.g., anti-anti-Id antibodies), minibodies, domain antibodies, synthetic antibodies (sometimes referred to as "antibody mimetics"), and antigen-binding fragments of any of the above. In certain embodiments, antibodies described herein refer to polyclonal antibody populations.

The term "Fc fragment", as used herein, refers to one or more fragments of an Fc region that retains an Fc function and/or activity described herein, such as binding to an Fc receptor. The term "antigen-binding fragment" of an antibody, as used herein, refers to one or more fragments of an antibody that retain the ability to specifically bind to an antigen. Examples of binding fragments encompassed within the term "antigen-binding fragment" of an antibody include a Fab fragment, a $F(ab')_2$ fragment, a Fd fragment, a Fv fragment, a scFv fragment, a dAb fragment (Ward et al., (1989) Nature 341:544-546), and an isolated complementarity determining region (CDR). These antibody fragments can be obtained using conventional techniques known to those with skill in the art, and fragments can be screened for utility in the same manner as are intact antibodies.

In some aspects the present invention provides antibodies or fragments thereof that bind to human ADGRE2 comprising human heavy and/or light constant regions, wherein the human heavy constant region comprises an isotypic variant comprising the Fc region of human IgG1, human IgG2, human IgG3, or human IgG4.

In a further aspect the present invention provides a humanized antibody or fragment thereof that binds to human ADGRE2, wherein the antibody comprises a variant human IgG Fc region which comprises amino acid substitution S324N replacing serine at amino acid position 324 of the parent antibody with asparagine, whereas the antibody comprising the variant human IgG Fc region exhibits improved complement dependent cytotoxicity (CDC) compared to the parent antibody.

Antibodies or fragments can be produced by any method known in the art for synthesizing antibodies (see, e.g., Harlow et al., Antibodies: A Laboratory Manual, (Cold Spring Harbor Laboratory Press, 2nd ed. 1988); Brinkman et al., 1995, J. Immunol. Methods 182:41-50; WO 92/22324; WO 98/46645). Chimeric antibodies can be produced using methods described in, e.g., Morrison, 1985, Science 229: 1202, and humanized antibodies by methods described in, e.g., U.S. Pat. No. 6,180,370.

Additional compositions and methods described herein are bispecific antibodies and multivalent antibodies, as described in, e.g., Segal et al., J. Immunol. Methods 248:1-6 (2001); and Tutt et al., J. Immunol. 147: 60 (1991).

Engineered Antigen-Binding Regions

In some embodiments, a binding moiety is or includes an antibody (e.g., an IgG antibody, e.g., an IgG1, IgG2, or IgG3 antibody), or an antigen-binding fragment, engineered to bind to a target (i.e., antigen) in an altered manner (e.g., in a pH sensitive manner, e.g., in a more or less pH sensitive manner) relative to a reference antibody or antigen-binding fragment. For example, an antibody can be engineered by modifying (e.g., by adding, deleting, or substituting) an amino acid within one or more antibody CDRs and/or at a position involved in antibody CDR structure. Exemplary, non-limiting sites of an antibody that can be modified include the following (amino acid positions are indicated based on the Kabat numbering (Kabat et al., (1991) Sequences of Proteins of Immunological Interest, NIH)).

Heavy chain: H27, H31, H32, H33, H35, H50, H58, H59, H61, H62, H63, H64, H65, H99, H100b, and H102

Light chain: L24, L27, L28, L32, L53, L54, L56, L90, L92, and L94.

In some embodiments, one or more of these disclosed amino acids can be substituted with histidine, arginine, lysine, aspartic acid, glutamic acid, serine, threonine, asparagine, or glutamine. Without wishing to be bound by theory, it is believed that substituting an amino acid at one or more of these positions with a histidine can result in an antibody having pH-dependent antigen-binding properties. In some embodiments, a non-histidine residue is substituted with a histidine residue. In some embodiments, a histidine residue is substituted with a non-histidine residue. Additional engineered antigen-binding regions include those described in, e.g., U.S. Publ. No. 20110229489.

Engineered Constant Regions

In some instances, a binding moiety is or includes an antibody constant region, Fc region or Fc fragment that binds one or more Fc receptors (e.g., FcγRI, FcγRIIA, FcγRIIB, FcγRIIIA, FcγRIIIB, FcγRIV, or FcRn receptor). In some embodiments, a constant region, Fc region or Fc fragment is engineered to bind to a target (e.g., an Fc receptor) in an altered manner (e.g., in a pH sensitive manner, e.g., in a more or less pH sensitive manner) relative to a reference constant region, Fc region or Fc fragment.

In some instances, a binding moiety can be or include a constant region, Fc region or Fc fragment of an IgG antibody engineered to include an amino acid addition, deletion, or substitution, of one or more of amino acid residues described herein (e.g., 251-256, 285-290, 308-314, 385-389, and 428-436 (Kabat numbering (Kabat et al., (1991) Sequences of Proteins of Immunological Interest, NIH))).

Producing ADGRE2 Antibodies and Fragments Thereof

In some embodiments, an antibody or fragment thereof described herein is engineered to include one or more binding moieties that exhibit binding to one or more targets by mutagenesis using known techniques. For example, a sequence of a reference polypeptide (e.g., a therapeutic antibody or therapeutic fusion protein) can be obtained, and one or more amino acid residues can be added, deleted, or substituted. In some embodiments, one or more amino acid residues are substituted with histidine, arginine, lysine, aspartic acid, glutamic acid, serine, threonine, asparagine, or glutamine. In some embodiments, one or more amino acids are substituted with histidine.

In some embodiments, without wishing to be bound by theory, it is believed that substitution of an amino acid residue with a histidine results in insertion of a protonation site, which can increase pH sensitivity of a binding moiety. Polypeptides can be produced using standard methods and assayed for binding to targets of interest as described herein. Additional methods of increasing pH sensitivity of a binding moiety are described in, e.g., Sarkar et al., Nature Biotechnology 20:908-913 (2002); Murtaugh et al., Protein Science 20:1619-1631 (2011); and U.S. Publ. No. 20110229489.

In some embodiments, a first target of interest is selected, and an antibody that selectively binds to the target is provided, obtained, and/or produced (e.g., using known methods as described herein). One or more amino acids of an antigen-binding region and/or an Fc region are substituted (e.g., with histidine, arginine, lysine, aspartic acid, glutamic acid, serine, threonine, asparagine, or glutamine), and pH sensitivity of binding to the target (and, additionally or alternatively, to FcRn) is determined.

In some embodiments, a polypeptide that naturally binds to a target of interest is provided, obtained, and/or produced. The polypeptide is conjugated to an Fc region or Fc fragment described herein (e.g., which binds to FcRn with a desired binding affinity) using known methods. For example, the polypeptide and Fc region or Fc fragment can be conjugated by chemical means or by recombinant expression as a fusion protein. Additionally or alternatively, one or more amino acids of the polypeptide can be substituted (e.g., with histidine, arginine, lysine, aspartic acid, glutamic acid, serine, threonine, asparagine, or glutamine), and pH sensitivity of binding of the polypeptide and the target is determined.

In some embodiments, an antibody or fragment thereof described herein is engineered to include one or more binding moieties identified and/or selected by screening. For example, an antigen-binding moiety that binds antigen can be identified using a library, e.g., a phage library, expressing antigen-binding moieties. Methods of screening recombinant antibody libraries are known (see, e.g., Hoogenboom, Nature Biotech. 23:1105-1116 (2005); U.S. Pat. Nos. 5,837, 500; 5,571,698; WO 2012/044831).

PEGylation

In certain embodiments, an anti-ADGRE2 antibody as described herein can be PEGylated to include mono- or poly- (e.g., 2-4) PEG moieties. Such PEGylated antibodies may display increased half-life in comparison to a non-PEGylated reference antibody, e.g., an antibody having the same amino acid sequence but different, a different amount of, or no PEGylation.

PEGylation can be carried out by any suitable reaction known in the art. Methods for preparing a PEGylated protein can generally include (a) reacting a polypeptide with polyethylene glycol (such as a reactive ester or aldehyde derivative of PEG) under conditions whereby the polypeptide becomes attached to one or more PEG groups; and (b) obtaining the reaction product(s). In general, the conditions for the reactions can be determined case by case based on known parameters and the desired result.

There are a number of PEG attachment methods available to those skilled in the art. For example, the step of PEGylating an antibody or fragment thereof described herein can be carried out via an acylation reaction or an alkylation reaction with a reactive polyethylene glycol molecule.

Measuring Interactions of Binding Moieties and Targets

The binding properties of an antibody or fragment thereof described herein (e.g., an anti-ADGRE2 antibody described herein) to a target (e.g., ADGRE2) can be measured by methods known in the art, e.g., one of the following methods: BIACORE analysis, Enzyme Linked Immunosorbent Assay (ELISA), x-ray crystallography, sequence analysis and scanning mutagenesis. The binding interaction of an antibody and ADGRE2 and/or FcRn can be analyzed using surface plasmon resonance (SPR). SPR or Biomolecular Interaction Analysis (BIA) detects bio-specific interactions in real time, without labeling any of the interactants. Changes in the mass at the binding surface (indicative of a binding event) of the BIA chip result in alterations of the refractive index of light near the surface. The changes in the refractivity generate a detectable signal, which are measured as an indication of real-time reactions between biological molecules. Methods for using SPR are described, for example, in U.S. Pat. No. 5,641,640; Raether (1988) Surface Plasmons Springer Verlag; Sjolander and Urbaniczky (1991) Anal. Chem. 63:2338-2345; Szabo et al. (1995) Curr. Opin. Struct. Biol. 5:699-705 and on-line resources provide by BIAcore International AB (Uppsala, Sweden). Additionally, a KinExA® (Kinetic Exclusion Assay) assay, available from Sapidyne Instruments (Boise, Id.) can also be used.

Information from SPR can be used to provide an accurate and quantitative measure of the equilibrium dissociation constant ($K_D$), and kinetic parameters, including $K_{on}$ and $K_{off}$ for the binding of a binding moiety to a target (e.g., an anti-ADGRE2 antibody to ADGRE2 and/or FcRn). Such data can be used to compare different molecules. Information from SPR can also be used to develop structure-activity relationships (SAR). For example, the kinetic and equilibrium binding parameters of particular binding moieties to targets at various pH levels can be evaluated. Variant amino acids at given positions can be identified that correlate with particular binding parameters, e.g., high affinity, low affinity, and slow $K_{off}$, at particular pH levels.

Methods of Treatment

In some embodiments, an antibody or fragment thereof described herein (e.g., an anti-ADGRE2 antibody as described herein) is used in a method of treating one or more ADGRE2-associated conditions. In some embodiments, an antibody or fragment thereof described herein (e.g. an anti-ADGRE2 antibody as described herein) is for use as a medicament. ADGRE2-associated conditions can include, without limitation, conditions that are caused by, include, include symptoms resulting in whole or in part from, or are known to occur in conjunction with ADGRE2 expression.

In some aspects, the present invention provides a method for treating a cancer comprising administering an agent that specifically binds ADGRE2 (e.g. an anti-ADGRE2 antibody described herein or fragment thereof). A cancer is a broad group of various diseases characterized by the uncontrolled growth of abnormal cells in the body. Unregulated cell division and growth results in the formation of malignant tumors that invade neighboring tissues and may also metastasize to distant parts of the body through the lymphatic system or bloodstream. In some embodiments, the "cancer" or "cancer tissue" comprises a solid tumor. Examples of cancers that can be treated by the methods of the present invention include, but are not limited to, cancers of the immune system including lymphoma, leukemia, myeloma, and other leukocyte malignancies. In some embodiments, the cancer is a acute myeloid leukemia.

In some embodiments, the lymphoma is selected from the group consisting of Acute Lymphoblastic Leukemia (ALL), AIDS-related lymphoma, ALK-positive large B-cell lymphoma, Burkitt's lymphoma, Chronic lymphocytic leukemia (CLL), Classical Hodgkin lymphoma, Diffuse large B-cell lymphoma (DLBCL), Follicular lymphoma, Intravascular large B-cell lymphoma, Large B-cell lymphoma arising in HHV8-associated multicentric Castleman's disease, Lymphomatoid granulomatosis, Lymphoplasmacytic lymphoma, Mantle cell lymphoma (MCL), Marginal zone B-cell lymphoma (MZL), Mucosa-Associated Lymphatic Tissue lymphoma (MALT), Nodal marginal zone B cell lymphoma (NMZL), Nodular lymphocyte predominant Hodgkin's lymphoma, Non-Hodgkin's lymphoma, Plasmablastic lymphoma, Primary central nervous system lymphoma, Primary effusion lymphoma, Splenic marginal zone lymphoma (SMZL), and Waldenstrom's macroglobulinemia. In some embodiments, the lymphoma is selected from the group consisting of Acute Lymphoblastic Leukemia (ALL), Chronic lymphocytic leukemia, CLL), Diffuse large B-cell lymphoma (DLBCL), Follicular lymphoma, Mantle cell lymphoma (MCL), Marginal zone B-cell lymphoma (MZL), Mucosa-Associated Lymphatic Tissue lymphoma (MALT), and Non-Hodgkin's lymphoma. In some embodiments, the lymphoma is Non-Hodgkin's lymphoma. In some embodiments, the cancer is relapsed and refractory acute myeloid leukemia.

In certain embodiments, the tumor is a cancer. In certain embodiments, the tumor is blood cancer. In certain embodiments, the tumor is selected from the group consisting of multiple myeloma, leukemia, lymphomas, and myeloid malignancies. Non-limiting examples of blood cancer include multiple myeloma, leukemia, and lymphomas. Non-limiting examples of leukemia include acute myeloid leukemia (AML), chronic myeloid leukemia (CML), acute lymphocytic leukemia (ALL), chronic lymphocytic leukemia (CLL), acute promyelocytic leukemia (APL), mixed-phenotype acute leukemia (MLL), hairy cell leukemia, and B cell prolymphocytic leukemia. The lymphoma can be Hodgkin's lymphoma or non-Hodgkin's lymphoma. Non-limiting examples of myeloid malignancies include myelodysplastic syndromes (MDS), myeloproliferative neoplasms (MPN), myeloid/lymphoid neoplasms (e.g., myeloid/lymphoid neoplasms with eosinophilia and rearrangement of Platelet Derived Growth Factor Receptor Alpha (PDGFRA), Platelet Derived Growth Factor Receptor Beta (PDGFRB), or Fibroblast Growth Factor Receptor 1 (FGFR1), or with PCM1-JAK2), acute myeloid leukemia (AML), blastic plasmacytoid dendritic cell neoplasm, B-lymphoblastic leukemia/lymphoma, and T-lymphoblastic leukemia/lymphoma. In certain embodiments, the myeloid malignancies comprises myelodysplastic syndromes.

In certain embodiments, the tumor is a B cell malignancy. Non-limiting examples of B cell malignancy include B cell lymphoma (BCL), B cell acute lymphocytic leukemia (ALL), B cell chronic lymphocytic leukemia (CLL), multiple myeloma (MM), CLL with Richter's transformation, and CNS lymphoma. B cell lymphoma includes B cell non-Hodgkin lymphoma (NHL) and B cell Hodgkin's lymphoma.

In various embodiments, administration of an antibody or fragment thereof described herein (e.g., an anti-ADGRE2 antibody described herein or fragment thereof) results in a decrease in the prevalence, frequency, level, and/or amount of one or more symptoms or biomarkers of a ADGRE2-associated condition as described herein or otherwise known in the art, e.g., a decrease of at least about 3%, about 4%, about 5%, about 6%, about 7%, about 8%, about 9%, about 10%, about 15%, about 20%, about 25%, about 30%, about 35%, about 40%, about 45%, about 50%, about 60%, about 70%, about 80%, about 90%, 95%, about 99%, or about 100% of one or more symptoms or biomarkers as compared to a prior measurement in the subject or to a reference value.

In some embodiments, administration of an antibody or fragment thereof described herein (e.g., an anti-ADGRE2 antibody described herein) to a subject having cancer results in a greater decrease or improvement in one or more symptoms or biomarkers of cancer than does a reference antibody e.g., an antibody that cross-competes for ADGRE2 binding, under comparable conditions In some embodiments, an antibody or fragment thereof described herein (e.g., an anti-ADGRE2 antibody as described herein) exhibits a decreased effective dose as compared to a reference protein (e.g., an antibody that cross-competes for ADGRE2 binding). For instance, an effective dose of an anti-ADGRE2 antibody as described herein may be, e.g., less than 1,000 mg/dose, e.g., less than 900 mg/dose, 800 mg/dose, 700 mg/dose, 600 mg/dose, 500 mg/dose, 550 mg/dose, 400 mg/dose, 350 mg/dose, 300 mg/dose, 200 mg/dose, 100 mg/dose, 50 mg/dose, 25 mg/dose, or less. In certain instances, an effective dose of an anti-ADGRE2 antibody as disclosed herein is lower than an effective or recommended or approved dosage of a reference antibody, which dosage of a reference antibody may be, e.g., 900 mg/dose or 600 mg/dose. Alternatively or in combination with a dosage as disclosed herein, an anti-ADGRE2 antibody as described herein may be effectively or usefully administered at a frequency that is less than once per week, e.g., less than once every week, 2 weeks, 3 weeks, 4 weeks, 5 weeks, 6 weeks, 7 weeks, 8 weeks, 9 weeks, 10 weeks, 11 weeks, 12 weeks, 3 months, 4 months, 5 months, 6 months, 7 months, 8 months, 9 months, 10 months, 11 months, or year. In certain instances, an effective or useful administration frequency of an anti-ADGRE2 antibody as disclosed herein is lower than an effective or recommended or approved administration frequency of a reference antibody, which administration frequency can be administered weekly (e.g., at a dosage of 300-600 mg, depending on weight of subject) or every two weeks (e.g., at a dosage of 300-1200 mg, depending on weight of subject).

In some embodiments, an antibody or fragment thereof described herein (e.g., an anti-ADGRE2 antibody described herein) can be administered at a decreased dose amount as compared to a reference protein, e.g., an antibody that cross-competes for ADGRE2 binding, while achieving an equal, equally effective, comparably effective, or substantially effective outcome, where the anti-ADGRE2 antibody is administered in an identical, equivalent, or substantially equivalent formulation and/or by an identical, equivalent, or substantially equivalent route of administration as the reference (e.g., an antibody that cross-competes for ADGRE2 binding). In some embodiments, an anti-ADGRE2 antibody described herein can be administered at an increased interval as compared to a reference antibody (e.g., an antibody that cross-competes for ADGRE2 binding) while achieving an equal, equally effective, comparably effective, or substantially effective outcome, where the anti-ADGRE2 antibody is administered in an identical, equivalent, or substantially equivalent formulation and/or by an identical, equivalent, or substantially equivalent route of administration as the reference. In some embodiments, an anti-ADGRE2 antibody described herein can be administered in a decreased number of unit dosages, and/or for a decreased period of treatment, as compared to a reference antibody while achieving an equal, equally effective, comparably effective, or substantially effective outcome, where the anti-ADGRE2 antibody is administered in an identical, equivalent, or substantially equivalent formulation and/or by an identical, equivalent, or substantially equivalent route of administration as the reference (e.g., an antibody that cross-competes for ADGRE2 binding).

In accordance with some such embodiments, an administered dose of an anti-ADGRE2 antibody described herein may be less likely to elicit an adverse response when administered to a subject, e.g., an adverse immune response, than would an effective dose of a reference antibody, e.g., e.g., an antibody that cross-competes for ADGRE2 binding. Accordingly, in various embodiments, an anti-ADGRE2 antibody as disclosed herein may be less likely than a reference antibody, per unit of activity administered to induce an adverse reaction or side effect. In various embodiments, an anti-ADGRE2 antibody as disclosed herein may less likely than a reference antibody, per unit of activity administered, to induce an adverse reaction or side effect having a particular degree of severity. In various embodiments, an anti-ADGRE2 antibody as disclosed herein may induce one or more adverse reactions or side effects to a lesser degree or in fewer patients than a reference antibody, per unit of activity administered. Examples of adverse reactions or side effects that may be associated with the administration of an antibody capable of binding ADGRE2, may include headache, nasopharyngitis, back pain, nausea, diarrhea, hypertension, upper respiratory infection, abdominal pain, vomiting, anemia, cough, peripheral edema, and/or urinary tract infection.

In some embodiments, upon administration to a subject (e.g., at a single dose), an antibody or fragment thereof described herein (e.g., an anti-ADGRE2 antibody described herein) is measured at an increased level in plasma at a defined time following administration (e.g., 1, 2, 3, 4, 5, 6, 7, 8, 9, 10, 11, 12, 13, 14, or more days), relative to level of a control at the same defined time (e.g., an antibody that cross-competes for ADGRE2 binding). For example, at a defined time following administration of a single dose, a level of an anti-ADGRE2 antibody described herein is at least about 10%, about 20%, about 30%, about 40%, about 50%, about 60%, about 70%, about 80%, about 90%, about 100%, about 150%, about 200%, about 300%, about 400%, or about 500% higher than a corresponding level of a reference antibody.

In some embodiments, an antibody or fragment thereof described herein (e.g., an anti-ADGRE2 antibody described herein) is measured at an increased level in plasma at a defined time (e.g., 1, 2, 3, 4, 5, 6, 7, 8, 9, 10, 11, 12, 13, 14, or more days) following administration (e.g., of a single dose), relative to level of a control at the same defined time. For example, at a defined time following administration, a level of an anti-ADGRE2 antibody described herein is at least about 10%, about 20%, about 30%, about 40%, about 50%, about 60%, about 70%, about 80%, about 90%, about 100%, about 150%, about 200%, about 300%, about 400%, or about 500% higher than a corresponding level of a reference antibody.

In some embodiments, an anti-ADGRE2 antibody described herein has increased half-life (e.g., relative to a control, e.g., a reference antibody, e.g., an antibody that cross-competes for ADGRE2 binding), and thus the anti-ADGRE2 antibody can be administered to a subject at increased inter-dose intervals. For example, an anti-ADGRE2 antibody can be administered once every week, every two weeks, every three weeks, every four weeks, every 6 weeks, every 8 weeks, or longer duration.

In some embodiments, a therapeutically effective amount of an antibody or fragment thereof described herein (e.g., an anti-ADGRE2 antibody described herein) is about 90%, 80%, 70%, 60%, 50%, 40%, 30%, 20%, 10%, or 5% of an effective amount of a reference therapeutic protein, e.g., an antibody that cross-competes for ADGRE2 binding). In some embodiments, a single dose of an anti-ADGRE2 antibody described herein achieves a comparable therapeutic effect as two or more doses of a reference antibody.

In some embodiments, an antibody or fragment thereof described herein (e.g., an anti-ADGRE2 antibody described herein) is administered at a dose that is about 90%, 80%, 70%, 60%, 50%, 40%, 30%, 20%, 10%, or 5% of the concentration of a target antigen (e.g., ADGRE2) in the subject.

In some embodiments, an antibody or fragment thereof described herein (e.g., an anti-ADGRE2 antibody described herein) can be physical introduced to a subject, using any of the various methods and delivery systems known to those skilled in the art. Exemplary routes of administration for the formulations disclosed herein include intravenous, intramuscular, subcutaneous, intraperitoneal, spinal or other parenteral routes of administration, for example by injection or infusion. The phrase "parenteral administration" as used herein means modes of administration other than enteral and topical administration, usually by injection, and includes, without limitation, intravenous, intramuscular, intraarterial, intrathecal, intralymphatic, intralesional, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion, as well as in vivo electroporation. In some embodiments, the formulation is administered via a non-parenteral route, including a topical, epidermal or mucosal route of administration, for example, intranasally, vaginally, rectally, sublingually or topically. Administering can also be performed, for example, once, a plurality of times, and/or over one or more extended periods.

In some embodiments, an antibody or fragment thereof described herein (e.g., an anti-ADGRE2 antibody described herein) can be used in a number of diagnostic and therapeutic applications. For example, detectably-labeled versions of engineered antibodies as described herein can be used in assays to detect the presence or amount of the ADGRE2 in a sample (e.g., a biological sample). Engineered antibodies described herein can be used in in vitro assays for studying binding to ADGRE2. In some embodiments, an anti-ADGRE2 antibody described herein can be used as a positive control in an assay designed to identify additional novel compounds that are otherwise are useful for treating a ADGRE2-associated disorder. For example, an anti-ADGRE2 antibody described herein can be used as a positive control in an assay to identify additional compounds (e.g., small molecules, aptamers, or antibodies) that bind to ADGRE2.

The antibodies or antigen-binding fragments thereof described herein may be used in monitoring a subject, e.g., a subject having, suspected of having, at risk of developing, or under treatment for one or more ADGRE2-associated conditions. Monitoring may include determining the amount or activity of ADGRE2 in a subject, e.g., in the serum of a subject. In some embodiments, the evaluation is performed at least one (1) hour, e.g., at least 2, 4, 6, 8, 12, 24, or 48 hours, or at least 1 day, 2 days, 4 days, 10 days, 13 days, 20 days or more, or at least 1 week, 2 weeks, 4 weeks, 10 weeks, 13 weeks, 20 weeks or more, after an administration of an anti-ADGRE2 antibody as described herein. The subject can be evaluated in one or more of the following periods: prior to beginning of treatment; during the treatment; or after one or more elements of the treatment have been administered. Evaluation can include evaluating the need for further treatment, e.g., evaluating whether a dosage, frequency of administration, or duration of treatment should be altered. It can also include evaluating the need to add or drop a selected therapeutic modality, e.g., adding or dropping any of the treatments for a ADGRE2-associated disorder described herein.

Formulations and Administration

In various embodiments, antibodies or antigen-binding fragments thereof described herein (e.g., an anti-ADGRE2 antibody described herein) can be incorporated into a pharmaceutical composition. Such a pharmaceutical composition can be useful, e.g., for the prevention and/or treatment of diseases, e.g., a ADGRE2-associated disorder. Pharmaceutical compositions can be formulated by methods known to those skilled in the art (such as described in Remington's Pharmaceutical Sciences, 17th edition, ed. Alfonso R. Gennaro, Mack Publishing Company, Easton, Pa. (1985)).

A suitable means of administration can be selected based on the age and condition of a subject. A single dose of the pharmaceutical composition containing an antibody or fragment thereof described herein (e.g., an anti-ADGRE2 antibody described herein) can be selected from a range of 0.001 to 1000 mg/kg of body weight. On the other hand, a dose can be selected in the range of 0.001 to 100000 mg/body weight, but the present disclosure is not limited to such ranges. The dose and method of administration varies depending on the weight, age, condition, and the like of the patient, and can be suitably selected as needed by those skilled in the art.

In various embodiments, a pharmaceutical composition can be formulated to include a pharmaceutically acceptable carrier or excipient. Examples of pharmaceutically acceptable carriers include, without limitation, any and all solvents, dispersion media, coatings, antibacterial and antifungal agents, isotonic and absorption delaying agents, and the like that are physiologically compatible. Compositions of the present invention can include a pharmaceutically acceptable salt, e.g., an acid addition salt or a base addition salt.

In various embodiments, a composition including an antibody as described herein, e.g., a sterile formulation for injection, can be formulated in accordance with conventional pharmaceutical practices using distilled water for injection as a vehicle. For example, physiological saline or an isotonic solution containing glucose and other supplements such as D-sorbitol, D-mannose, D-mannitol, and sodium chloride may be used as an aqueous solution for injection, optionally in combination with a suitable solubilizing agent, for example, alcohol such as ethanol and polyalcohol such as propylene glycol or polyethylene glycol, and a nonionic surfactant such as polysorbate 80™, HCO-50 and the like.

As disclosed herein, a pharmaceutical composition may be in any form known in the art. Such forms include, e.g., liquid, semi-solid and solid dosage forms, such as liquid solutions (e.g., injectable and infusible solutions), dispersions or suspensions, tablets, pills, powders, liposomes and suppositories.

Selection or use of any particular form may depend, in part, on the intended mode of administration and therapeutic application. For example, compositions containing a composition intended for systemic or local delivery can be in the form of injectable or infusible solutions. Accordingly, the compositions can be formulated for administration by a parenteral mode (e.g., intravenous, subcutaneous, intraperitoneal, or intramuscular injection). As used herein, parenteral administration refers to modes of administration other than enteral and topical administration, usually by injection, and include, without limitation, intravenous, intranasal, intraocular, pulmonary, intramuscular, intraarterial, intrathecal, intracapsular, intraorbital, intracardiac, intradermal, intrapulmonary, intraperitoneal, transtracheal, subcutaneous, subcuticular, intraarticular, subcapsular, subarachnoid, intraspinal, epidural, intracerebral, intracranial, intracarotid and intrastemal injection and infusion.

Route of administration can be parenteral, for example, administration by injection, transnasal administration, transpulmonary administration, or transcutaneous administration. Administration can be systemic or local by intravenous injection, intramuscular injection, intraperitoneal injection, subcutaneous injection.

In various embodiments, a pharmaceutical composition of the present invention can be formulated as a solution, microemulsion, dispersion, liposome, or other ordered structure suitable for stable storage at high concentration. Sterile injectable solutions can be prepared by incorporating a composition described herein in the required amount in an appropriate solvent with one or a combination of ingredients enumerated above, as required, followed by filter sterilization. Generally, dispersions are prepared by incorporating a composition described herein into a sterile vehicle that contains a basic dispersion medium and the required other ingredients from those enumerated above. In the case of sterile powders for the preparation of sterile injectable solutions, methods for preparation include vacuum drying and freeze-drying that yield a powder of a composition described herein plus any additional desired ingredient (see below) from a previously sterile-filtered solution thereof. The proper fluidity of a solution can be maintained, for example, by the use of a coating such as lecithin, by the maintenance of the required particle size in the case of dispersion and by the use of surfactants. Prolonged absorption of injectable compositions can be brought about by including in the composition a reagent that delays absorption, for example, monostearate salts, and gelatin.

A pharmaceutical composition can be administered parenterally in the form of an injectable formulation comprising a sterile solution or suspension in water or another pharmaceutically acceptable liquid. For example, the pharmaceutical composition can be formulated by suitably combining therapeutic molecule with pharmaceutically acceptable vehicles or media, such as sterile water and physiological saline, vegetable oil, emulsifier, suspension agent, surfactant, stabilizer, flavoring excipient, diluent, vehicle, preservative, binder, followed by mixing in a unit dose form required for generally accepted pharmaceutical practices. The amount of active ingredient included in the pharmaceutical preparations is such that a suitable dose within the designated range is provided. Nonlimiting examples of oily liquid include sesame oil and soybean oil, and it may be combined with benzyl benzoate or benzyl alcohol as a solubilizing agent. Other items that may be included are a buffer such as a phosphate buffer, or sodium acetate buffer, a soothing agent such as procaine hydrochloride, a stabilizer such as benzyl alcohol or phenol, and an antioxidant. The formulated injection can be packaged in a suitable ampule.

In some embodiments, a composition can be formulated for storage at a temperature below 0° C. (e.g., −20° C. or −80° C.). In some embodiments, the composition can be formulated for storage for up to 2 years (e.g., one month, two months, three months, four months, five months, six months, seven months, eight months, nine months, 10 months, 11 months, 1 year, 1½ years, or 2 years) at 2-8° C. (e.g., 4° C.). Thus, in some embodiments, the compositions described herein are stable in storage for at least 1 year at 2-8° C. (e.g., 4° C.).

In particular instances, a pharmaceutical composition can be formulated as a solution. In some embodiments, a composition can be formulated, for example, as a buffered solution at a suitable concentration and suitable for storage at 2-8° C. (e.g., 4° C.).

Compositions including one or more engineered antibodies as described herein can be formulated in immunoliposome compositions. Such formulations can be prepared by methods known in the art. Liposomes with enhanced circulation time are disclosed in, e.g., U.S. Pat. No. 5,013,556.

In certain embodiments, compositions can be formulated with a carrier that will protect the compound against rapid release, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, and polylactic acid. Many methods for the preparation of such formulations are known in the art. See, e.g., J. R. Robinson (1978) "*Sustained and Controlled Release Drug Delivery Systems,*" Marcel Dekker, Inc., New York.

In some embodiments, compositions can be formulated in a composition suitable for intrapulmonary administration (e.g., for administration via an inhaler or nebulizer) to a mammal such as a human. Methods for formulating such compositions are well known in the art. Dry powder inhaler formulations and suitable systems for administration of the formulations are also known in the art. Pulmonary administration may be oral and/or nasal. Examples of pharmaceutical devices for pulmonary delivery include metered dose inhalers, dry powder inhalers (DPIs), and nebulizers. For example, a composition described herein can be administered to the lungs of a subject by way of a dry powder inhaler. These inhalers are propellant-free devices that deliver dispersible and stable dry powder formulations to the lungs. Dry powder inhalers are well known in the art of medicine and include, without limitation: the TURBO-HALER® (AstraZeneca; London, England) the AIR® inhaler (ALKERMES®; Cambridge, Mass.); ROTAHALER@(GlaxoSmithKline; London, England); and ECLIPSE™ (Sanofi-Aventis; Paris, France). See also, e.g., PCT Publication Nos. WO 04/026380, WO 04/024156, and WO 01/78693. DPI devices have been used for pulmonary administration of polypeptides such as insulin and growth hormone. In some embodiments, a composition described herein can be intrapulmonarily administered by way of a metered dose inhaler. These inhalers rely on a propellant to deliver a discrete dose of a compound to the lungs. Additional devices and intrapulmonary administration methods are set forth in, e.g., U.S. Patent Application Publication Nos. 20050271660 and 20090110679, the disclosures of each of which are incorporated herein by reference in their entirety.

In some embodiments, compositions can be formulated for delivery to the eye, e.g., in the form of a pharmaceutically acceptable solution, suspension or ointment. A preparation for use in treating an eye can be in the form of a sterile aqueous solution containing, e.g., additional ingredients such as, but not limited to, preservatives, buffers, tonicity agents, antioxidants and stabilizers, nonionic wetting or clarifying agents, and viscosity-increasing agents. A preparation as described herein can be administered topically to the eye of the subject in need of treatment (e.g., a subject afflicted with AMD) by conventional methods, e.g., in the form of drops, or by bathing the eye in a therapeutic solution, containing one or more compositions.

A variety of devices for introducing drugs into the vitreous cavity of the eye may be appropriate, in certain embodiments, for administration of a composition as described herein. For example, U.S. Publication No. 2002/0026176 describes a pharmaceutical-containing plug that can be inserted through the sclera such that it projects into the vitreous cavity to deliver the pharmaceutical agent into the vitreous cavity. In another example, U.S. Pat. No. 5,443,505 describes an implantable device for introduction into a suprachoroidal space or an avascular region for sustained release of drug into the interior of the eye. U.S. Pat. Nos. 5,773,019 and 6,001,386 each disclose an implantable drug delivery device attachable to the scleral surface of an eye. Additional methods and devices (e.g., a transscleral patch and delivery via contact lenses) for delivery of a therapeutic agent to the eye are described in, e.g., Ambati and Adamis (2002) *Prog Retin Eye Res* 21(2):145-151; Ranta and Urtti (2006) *Adv Drug Delivery Rev* 58(11):1164-1181; Barocas and Balachandran (2008) *Expert Opin Drug Delivery* 5(1): 1-10(10); Gulsen and Chauhan (2004) *Invest Opthalmol Vis Sci* 45:2342-2347; Kim et al. (2007) *Ophthalmic Res* 39:244-254; and PCT publication no. WO 04/073551, the disclosures of which are incorporated herein by reference in their entirety.

In certain embodiments, administration of an antibody as described herein is achieved by administering to a subject a nucleic acid encoding the antibody. Nucleic acids encoding a therapeutic antibody described herein can be incorporated into a gene construct to be used as a part of a gene therapy protocol to deliver nucleic acids that can be used to express and produce antibody within cells. Expression constructs of such components may be administered in any therapeutically effective carrier, e.g. any formulation or composition capable of effectively delivering the component gene to cells in vivo. Approaches include insertion of the subject gene in viral vectors including recombinant retroviruses, adenovirus, adeno-associated virus, lentivirus, and herpes simplex virus-1 (HSV-1), or recombinant bacterial or eukaryotic plasmids. Viral vectors can transfect cells directly; plasmid DNA can be delivered with the help of, for example, cationic liposomes (lipofectin) or derivatized, polylysine conjugates, gramicidin S, artificial viral envelopes or other such intracellular carriers, as well as direct injection of the gene construct or $CaPO_4$ precipitation (see, e.g., WO04/060407). Examples of suitable retroviruses include pLJ, pZIP, pWE and pEM which are known to those skilled in the art (see, e.g., Eglitis et al. (1985) *Science* 230:1395-1398; Danos and Mulligan (1988) *Proc Natl Acad Sci USA* 85:6460-6464; Wilson et al. (1988) *Proc Natl Acad Sci USA* 85:3014-3018; Armentano et al. (1990) *Proc Natl Acad Sci USA* 87:6141-6145; Huber et al. (1991) *Proc Natl Acad Sci USA* 88:8039-8043; Ferry et al. (1991) *Proc Natl Acad Sci USA* 88:8377-8381; Chowdhury et al. (1991) *Science* 254:1802-1805; van Beusechem et al. (1992) *Proc Natl Acad Sci USA* 89:7640-7644; Kay et al. (1992) *Human Gene Therapy* 3:641-647; Dai et al. (1992) *Proc Natl Acad Sci USA* 89:10892-10895; Hwu et al. (1993)*J Immunol* 150:4104-4115; U.S. Pat. Nos. 4,868,116 and 4,980,286; and PCT Publication Nos. WO89/07136, WO89/02468, WO89/05345, and WO92/07573). Another viral gene delivery system utilizes adenovirus-derived vectors (see, e.g., Berkner et al. (1988) *BioTechniques* 6:616; Rosenfeld et al. (1991) *Science* 252:431-434; and Rosenfeld et al. (1992) *Cell* 68:143-155). Suitable adenoviral vectors derived from the adenovirus strain Ad type 5 d1324 or other strains of adenovirus (e.g., Ad2, Ad3, Ad7, etc.) are known to those skilled in the art. Yet another viral vector system useful for delivery of the subject gene is the adeno-associated virus (AAV). See, e.g., Flotte et al. (1992) *Am JRespir Cell Mol Biol* 7:349-356; Samulski et al. (1989) *J Virol* 63:3822-3828; and McLaughlin et al. (1989) *J Virol* 62:1963-1973.

In various embodiments, subcutaneous administration can be accomplished by means of a device, such as a syringe, a prefilled syringe, an auto-injector (e.g., disposable or reusable), a pen injector, a patch injector, a wearable injector, an ambulatory syringe infusion pump with subcutaneous infusion sets, or other device for combining with antibody drug for subcutaneous injection.

An injection system of the present disclosure may employ a delivery pen as described in U.S. Pat. No. 5,308,341. Pen devices, most commonly used for self-delivery of insulin to patients with diabetes, are well known in the art. Such devices can comprise at least one injection needle (e.g., a 31 gauge needle of about 5 to 8 mm in length), are typically pre-filled with one or more therapeutic unit doses of a therapeutic solution, and are useful for rapidly delivering solution to a subject with as little pain as possible. One medication delivery pen includes a vial holder into which a vial of a therapeutic or other medication may be received. The pen may be an entirely mechanical device or it may be combined with electronic circuitry to accurately set and/or indicate the dosage of medication that is injected into the user. See, e.g., U.S. Pat. No. 6,192,891. In some embodiments, the needle of the pen device is disposable and the kits include one or more disposable replacement needles. Pen devices suitable for delivery of any one of the presently featured compositions are also described in, e.g., U.S. Pat. Nos. 6,277,099; 6,200,296; and 6,146,361, the disclosures of each of which are incorporated herein by reference in their entirety. A microneedle-based pen device is described in, e.g., U.S. Pat. No. 7,556,615, the disclosure of which is incorporated herein by reference in its entirety. See also the Precision Pen Injector (PPI) device, MOLLY™, manufactured by Scandinavian Health Ltd.

In some embodiments, a composition described herein can be therapeutically delivered to a subject by way of local administration. As used herein, "local administration" or "local delivery," can refer to delivery that does not rely upon transport of the composition or agent to its intended target tissue or site via the vascular system. For example, the composition may be delivered by injection or implantation of the composition or agent or by injection or implantation of a device containing the composition or agent. In certain embodiments, following local administration in the vicinity of a target tissue or site, the composition or agent, or one or more components thereof, may diffuse to an intended target tissue or site that is not the site of administration.

In some embodiments, the compositions provided herein are present in unit dosage form, which unit dosage form can be suitable for self-administration. Such a unit dosage form may be provided within a container, typically, for example, a vial, cartridge, prefilled syringe or disposable pen. A doser such as the doser device described in U.S. Pat. No. 6,302,855, may also be used, for example, with an injection system as described herein.

A suitable dose of a composition described herein, which dose is capable of treating or preventing a disorder in a subject, can depend on a variety of factors including, e.g., the age, sex, and weight of a subject to be treated and the particular inhibitor compound used. For example, a different dose of one composition including an antibody as described herein may be required to treat a subject with a ADGRE2-associated disorder as compared to the dose of a different formulation of that antibody. Other factors affecting the dose administered to the subject include, e.g., the type or severity of the disorder. For example, a subject having one ADGRE2-associated disorder may require administration of a different dosage than a subject with another ADGRE2-associated disorder. Other factors can include, e.g., other medical disorders concurrently or previously affecting the subject, the general health of the subject, the genetic disposition of the subject, diet, time of administration, rate of excretion, drug combination, and any other additional therapeutics that are administered to the subject. It should also be understood that a specific dosage and treatment regimen for any particular subject may also be adjusted based upon the judgment of the treating medical practitioner.

A composition described herein can be administered as a fixed dose, or in a milligram per kilogram (mg/kg) dose. In some embodiments, the dose can also be chosen to reduce or avoid production of antibodies or other host immune responses against one or more of the antibody or an antigen-binding fragment thereof in the composition. While in no way intended to be limiting, exemplary dosages of an antibody, such as a composition described herein include, e.g., 1-1000 mg/kg, 1-100 mg/kg, 0.5-50 mg/kg, 0.1-100 mg/kg, 0.5-25 mg/kg, 1-20 mg/kg, and 1-10 mg/kg. Exemplary dosages of a composition described herein include, without limitation, 0.1 mg/kg, 0.5 mg/kg, 1.0 mg/kg, 2.0 mg/kg, 4 mg/kg, 8 mg/kg, or 20 mg/kg.

A pharmaceutical solution can include a therapeutically effective amount of a composition described herein. Such effective amounts can be readily determined by one of ordinary skill in the art based, in part, on the effect of the administered composition, or the combinatorial effect of the composition and one or more additional active agents, if more than one agent is used. A therapeutically effective amount of a composition described herein can also vary according to factors such as the disease state, age, sex, and weight of the individual, and the ability of the composition (and one or more additional active agents) to elicit a desired response in the individual, e.g., amelioration of at least one condition parameter, e.g., amelioration of at least one symptom of the a ADGRE2-associated disorder. For example, a therapeutically effective amount of a composition described herein can inhibit (lessen the severity of or eliminate the occurrence of) and/or prevent a particular disorder, and/or any one of the symptoms of the particular disorder known in the art or described herein. A therapeutically effective amount is also one in which any toxic or detrimental effects of the composition are outweighed by therapeutically beneficial effects.

Suitable human doses of any of the compositions described herein can further be evaluated in, e.g., Phase I dose escalation studies. See, e.g., van Gurp et al. (2008) *Am J Transplantation* 8(8):1711-1718; Hanouska et al. (2007) *Clin Cancer Res* 13(2, part 1):523-531; and Hetherington et al. (2006) *Antimicrobial Agents and Chemotherapy* 50(10): 3499-3500.

Toxicity and therapeutic efficacy of compositions can be determined by known pharmaceutical procedures in cell cultures or experimental animals (e.g., animal models of any of the ADGRE2-associated disorders). These procedures can be used, e.g., for determining the $LD_{50}$ (the dose lethal to 50% of the population) and the $ED_{50}$ (the dose therapeutically effective in 50% of the population). The dose ratio between toxic and therapeutic effects is therapeutic index and it can be expressed as the ratio $LD_{50}/ED_{50}$. A composition described herein that exhibits a high therapeutic index is preferred. While compositions that exhibit toxic side effects may be used, care should be taken to design a delivery system that targets such compounds to the site of affected tissue and to minimize potential damage to normal cells and, thereby, reduce side effects.

Those of skill in the art will appreciate that data obtained from cell culture assays and animal studies can be used in formulating a range of dosage for use in humans. Appropriate dosages of compositions described herein lie generally within a range of circulating concentrations of the compositions that include the $ED_{50}$ with little or no toxicity. The dosage may vary within this range depending upon the dosage form employed and the route of administration utilized. For a composition described herein, therapeutically effective dose can be estimated initially from cell culture assays. A dose can be formulated in animal models to achieve a circulating plasma concentration range that includes the $I_0$ (i.e., the concentration of the antibody which achieves a half-maximal inhibition of symptoms) as determined in cell culture. Such information can be used to more accurately determine useful doses in humans. Levels in plasma may be measured, for example, by high performance liquid chromatography. In some embodiments, e.g., where local administration (e.g., to the eye or a joint) is desired, cell culture or animal modeling can be used to determine a dose required to achieve a therapeutically effective concentration within the local site.

Combination Therapies

In various embodiments, an anti-ADGRE2 antibody as described herein may be included in a course of treatment that further includes administration of at least one additional agent to a subject. In various embodiments, an additional agent administered in combination with an anti-ADGRE2 antibody as described herein may be an agent chemotherapy agent. In various embodiments, an additional agent administered in combination with an antibody as described herein may be an agent that inhibits inflammation.

In some embodiments, the anti-ADGRE2 antibody is a single chain variable fragment (scFv) with specificity for human ADGRE2. In some embodiments, the anti-ADGRE2 scFv can be conjugated (e.g., linked to) to a therapeutic agent (e.g., a chemotherapeutic agent and a radioactive atom) for binding to a cancer cell, delivering therapeutic agent to the cancer cell, and killing the cancer cell which expresses human ADGRE2. In some embodiments, an anti-ADGRE2 antibody is linked to a therapeutic agent. In some embodiments, therapeutic agent is a chemotherapeutic agent, a cytokine, a radioactive atom, an siRNA, or a toxin. In some embodiments, therapeutic agent is a chemotherapeutic agent. In some embodiments, the agent is a radioactive atom.

In some embodiments, the methods can be performed in conjunction with other therapies for ADGRE2-associated disorders. For example, the composition can be administered to a subject at the same time, prior to, or after, chemotherapy. In some embodiments, the composition can be administered to a subject at the same time, prior to, or after, an adoptive therapy method.

In various embodiments, an additional agent administered in combination with an anti-ADGRE2 antibody as described herein may be administered at the same time as an anti-ADGRE2 antibody, on the same day as an anti-ADGRE2 antibody, or in the same week as an anti-ADGRE2 antibody. In various embodiments, an additional agent administered in combination with an anti-ADGRE2 antibody as described herein may be administered in a single formulation with an anti-ADGRE2 antibody. In certain embodiments, an additional agent administered in a manner temporally separated from administration of an anti-ADGRE2 antibody as described herein, e.g., one or more hours before or after, one or more days before or after, one or more weeks before or after, or one or more months before or after administration of an anti-ADGRE2 antibody. In various embodiments, the administration frequency of one or more additional agents may be the same as, similar to, or different from the administration frequency of an anti-ADGRE2 antibody as described herein.

Encompassed within combination therapy is the a treatment regimen that includes administration of two distinct antibodies as described herein and/or a treatment regimen that includes administration of an antibody as described herein by a plurality of formulations and/or routes of administration.

In some embodiments, compositions can be formulated with one or more additional therapeutic agents, e.g., additional therapies for treating or preventing a ADGRE2-associated disorder (e.g., a cancer or autoimmune disorder) in a subject. Additional agents for treating a ADGRE2-associated disorder in a subject will vary depending on the particular disorder being treated, but can include, without limitation, rituximab, cyclophosphamide, doxorubicin, vincristine, prednisone, osfamide, carboplatin, etoposide, dexamethasone, cytarabine, cisplatin, cyclophosphamide, or fludarabine.

A composition described herein can replace or augment a previously or currently administered therapy. For example, upon treating with a composition described herein, administration of the one or more additional active agents can cease or diminish, e.g., be administered at lower levels, e.g., lower levels of a reference antibody that cross-competes for ADGRE2 binding) following administration of an anti-ADGRE2 antibody described herein. In some embodiments, administration of the previous therapy can be maintained. In some embodiments, a previous therapy will be maintained until the level of the composition reaches a level sufficient to provide a therapeutic effect. The two therapies can be administered in combination.

Recombinant Gene Technology

In accordance with the present disclosure, there may be employed conventional molecular biology, microbiology, and recombinant DNA techniques within the skill of the art. Such techniques are described in the literature (see, e.g., Sambrook, Fritsch & Maniatis, Molecular Cloning: A Laboratory Manual, Second Edition (1989) Cold Spring Harbor Laboratory Press, Cold Spring Harbor, N.Y.; DNA Cloning: A Practical Approach, Volumes I and II (D. N. Glover ed. 1985); Oligonucleotide Synthesis (M. J. Gait ed. 1984); Nucleic Acid Hybridization (B. D. Hamies & S. J. Higgins eds. (1985)); Transcription And Translation (B. D. Hames & S. J. Higgins, eds. (1984)); Animal Cell Culture (R. I. Freshney, ed. (1986)); Immobilized Cells and Enzymes (IRL Press, (1986)); B. Perbal, A Practical Guide To Molecular Cloning (1984); F. M. Ausubel et al. (eds.), Current Protocols in Molecular Biology, John Wiley & Sons, Inc. (1994).

Recombinant expression of a gene, such as a nucleic acid encoding a polypeptide, such as an anti-ADGRE2 antibody described herein, can include construction of an expression vector containing a nucleic acid that encodes the polypeptide. Once a polynucleotide has been obtained, a vector for the production of the polypeptide can be produced by recombinant DNA technology using techniques known in the art. Known methods can be used to construct expression vectors containing polypeptide coding sequences and appropriate transcriptional and translational control signals. These methods include, for example, in vitro recombinant DNA techniques, synthetic techniques, and in vivo genetic recombination.

An expression vector can be transferred to a host cell by conventional techniques, and the transfected cells can then be cultured by conventional techniques to produce polypeptides.

All publications, patent applications, patents, and other references mentioned herein are incorporated by reference in their entirety. In addition, the materials, methods, and examples are illustrative only and not intended to be limiting. Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described herein.

EXAMPLES

The following examples describe some of the preferred modes of making and practicing the present invention. However, it should be understood that these examples are for illustrative purposes only and are not meant to limit the scope of the invention.

Example 1. Identification and Characterization of Anti-ADGRE2 Antibodies

The present example demonstrates derivation and characterization of binding affinities of anti-ADGRE2 antibodies.

Antibodies were developed using hybridoma technology, comprising 24 humanized sequences of the mouse Reference 1 Clone. Antibodies were selected based on expression as recombinant protein variants, binding to ADGRE2-overexpressing murine lymphoma EL4 cells as measured by FACS, and immunogenicity score, 18 humanized recombinant antibodies were selected representing a range of ADGRE2 binding affinities.

Sequencing of the Reference 1 Anti-ADGRE2 Antibody

The amino acid sequence of the Reference 1 anti-ADGRE2 antibody was determined by endoprotease digestion and subsequent analysis of peptide pools by LC-MS/MS. Briefly, the heavy and light chains of the antibody were separated by SDS-PAGE under reducing conditions. After staining with Coomassie Blue, respective bands were cut from the gel and digested with Asp N, chymotrypsin, trypsin and elastase endopeptidases. In addition, antibody was digested in solution by pepsin. The pool of peptides generated from digestion was analyzed on an Orbitrap analyzer (LC-MS/MS Q-Exactive, ThermoFisher). LC-MS/MS data was processed using the PEAKS AB antibody sequencing software.

The Reference 1 anti-ADGRE2 VH and VL coding sequences were derived from the respective antibody chain sequences, and cloned with an IgG2 constant region. Recombinant Reference 1 antibody was expressed in HEK293 cells, and purified antibody was compared with commercially available Reference 1 antibody by surface plasmon resonance (SPR) $K_D$ analysis using a recombinantly produced protein comprising the extracellular domain of ADGRE2 as well as EC50 determination was carried out for binding to cells expressing ADGRE2. For subsequent antibody screening work, purified recombinant Reference 1 antibody was used as a reference antibody.

Humanization of Andi-ADGR E2 (EMR E2) Reference 1 Antibody Variable Domains

A predictive human engineering bioinformatics program called the Xoma humanization method comprising the "TSF Humanization" software was used. The software program utilizes the Kabat database germlines to engineer against and humanize murine clone Reference 1. A panel of human sequence variants representing the best human germline match(es) from the Kabat database by pairwise sequence alignment(s) was generated to introduce amino acid point mutations in the murine sequence to "surface" into a human sequence. This was carried out for both heavy and light chains of the murine antibody as shown in FIGS. 1 and 2. The original description of the humanization or human engineering recommendation is discussed in the Xoma Software User guide and US Patent #U.S. Pat. No. 5,766,886A, incorporated herein by reference in entirety.

Generation of Humanized Variants for Clone Reference 1

Figure 3B:
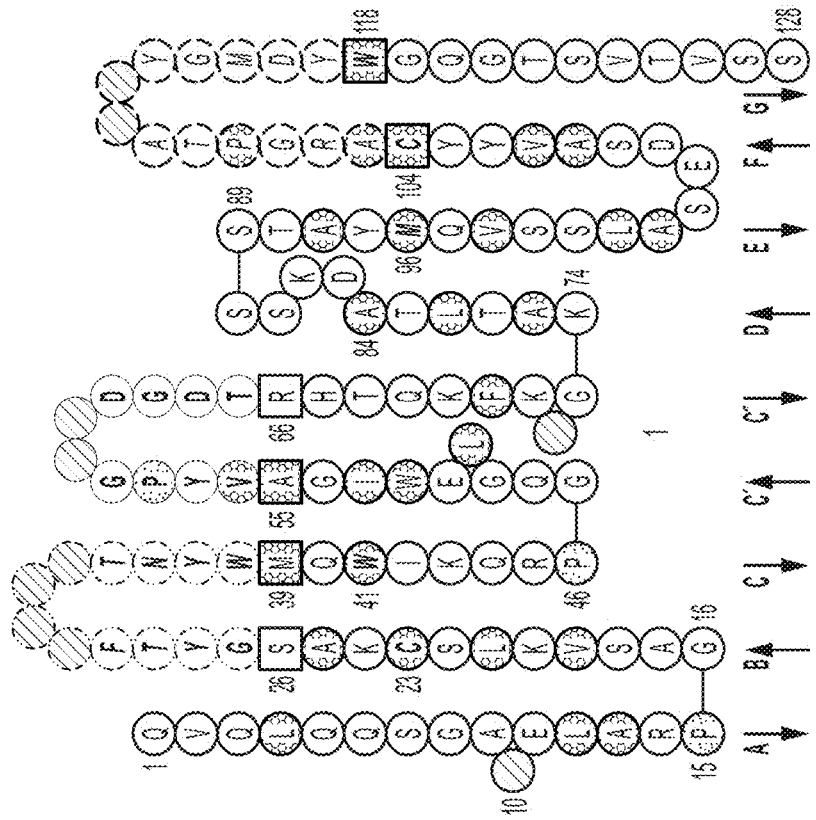
Figure 3C:
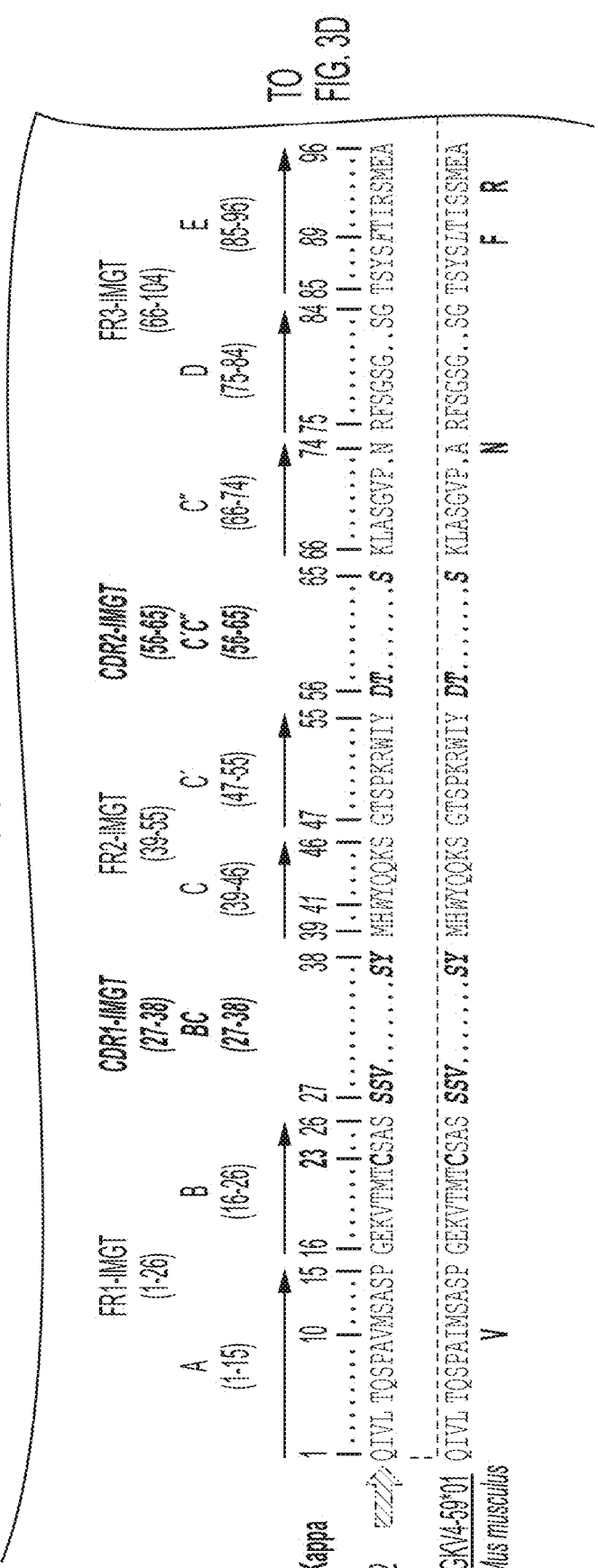

The best germline match was selected and Kabat CDR definitions were extracted from the alignment. Each was assessed for impact on binding and solvent exposure, and accordingly a "Humanized" sequence was selected. A two-dimensional projection of sequence-structure relationship was also performed (FIG. 3A-3D).

An exemplary clone was humanized by CDR grafting the largest CDRs into the human HC germline IGHV1-46*01 and Kappa germline IGKV3D-20*01. A longer GS linker was used to allow for more flexibility of the HV/LC pair. The linker utilized the 1$^{st}$ 3 amino acids of the HC constant domain followed by the standard 3×GS linker:

ASTGGGGSGGGGSGGGGS.

Example 2. On-Cell Binding of Anti-ADGRE2 Antibodies

This example illustrates the on-cell binding for the anti-ADGRE2 antibodies as measured by flow cytometry.

The on-cell binding for the anti-ADGRE2 antibodies was assessed by flow cytometry on the E4 cells overexpressing ADGRE2. Each of the scFvs were tested for binding to ADGRE2 and compared to the Reference 1 mAb.

Briefly, 100,000 cells per well, were plated in 96 well V bottom plate, scFvs were diluted to 200 nMscFv then 1:4 serially down to 0.01 nM. A dose dependent titration of the scFvs validated recombinant scFvs folding and binding to ADGRE2.

EC50 affinities were compared in order to better interpret any differences seen in-vivo that might be caused by variations in affinities resulting from the humanization process Data was analyzed using Prism software, using a four parameter regression.

The approximate EC50 values were determined using equation: $Y=Bottom+(Top-Bottom)/(1+10^{((Log\ EC50-X)*HillSlope)})$ where the fitted parameters are defined as follows: Bottom, the lower plateau describing minimum binding achievable; Top, the upper plateau describing the maximum binding achievable; Log EC50, the inflection point of the dose response curve also known as the concentration producing a half-maximal response; and Hill-Slope, the slope of the dose response curve.

TABLE 1

Binding Affinity of anti-ADGRE2 scFv

| scFv | Comprises Corresponding SEQ ID No: | Affinity (EC 50 nm) |
|---|---|---|
| A | 22 | 16.4 |
| B | 20 | 55.3 |
| E | 15 and 16 | 10.6 |
| K | 19 | 93.8 |
| M | 17 and 18 | 16.4 |
| N | 21 | 53.2 |
| Reference 1 | | 10.1 |

As shown in Table 1, the EC50 values calculated from the curves show that each of the antibodies binds cells at affinities from 10.6 to 93.8.

Overall, the results showed that the tested humanized scFvs had EC50 values comparable to the Reference 1 standard.

Example 3. In Silico Immunogenicity Analysis

This example illustrates in silico immunogenicity analysis.

Briefly, mouse Reference 1 scFv sequences was analyzed with the humanized scFvs by a human MHCI and MHCII presentation prediction software, based on various prediction databases IEDB, SMN-Align, NN-Align.

TABLE 2

Immunogenicity of anti- ADGRE2 antibodies

| scFv | Comprises SEQ ID No: | Immunogenicity | | |
|---|---|---|---|---|
| | | MHC I | MHC II | MHC I + MHC11 |
| A | 22 | 533 | 645 | 1178 |
| B | 20 | 686 | 876 | 1562 |
| E | 15 and 16 | 500 | 685 | 1185 |
| K | 19 | 647 | 995 | 1642 |
| M | 17and18 | 628 | 844 | 1472 |
| N | 21 | 643 | 941 | 1584 |
| Reference 1 | | 886 | 1183 | 2069 |

As shown in Table 2, the immunogenicity of the antibody was characterized based on MHC I or MHC II binding or binding to both MHC I and MHC II. Overall, the data predict low immunogenicity for all tested humanized antibodies.

Example 4. Off-Target Screening Panel Assay

This example illustrates the specificity of anti-ADGRE2 scFvs in an off-target binding assay.

Briefly, humanized scFv variants were tested for off-target binding. Three exemplary ADGRE2 scFv clones were run in the "Cut-down Assay" to screen for binding of to over 3000 human receptors. In the cut-down assay, the higher the binding, the higher the likelihood of the interaction being real. Generally, hits labelled "V. weak" are unlikely to be real interactions.

The results showed that all the clones tested did not show any off-target binding. Thus, these clones were found to be highly specific for ADGRE2.

Example 5. Sequencing Anti-ADGRE2 Antibody Clones

The anti-ADGRE2 antibodies were sequenced and the CDR sequences are shown in Table 3 (heavy chain CDR sequences), and Table 4 (light chain CDR sequences). These analyses confirmed the CDR sequences of the humanized antibodies.

TABLE 3

Heavy Chain CDR Sequences

| Clone | Germline | CDR1 | CDR2 | CDR3 |
|---|---|---|---|---|
| K | IGHV1-46*01 | GYTFTNYW (SEQ ID NO: 1) | VYPGDGDT (SEQ ID NO: 2) | ARGFTAYGMDY (SEQ ID NO: 3) |
| B | IGHV1-2*02 | GYTFTNYW (SEQ ID NO: 1) | VYPGDGDT (SEQ ID NO: 2) | ARGFTAYGMDY (SEQ ID NO: 3) |
| N | IGHV1-46*01 | GYTFTNYW (SEQ ID NO: 1) | VYPGDGDT (SEQ ID NO: 2) | ARGFTAYGMDY (SEQ ID NO: 3) |
| A | IGHV1-46*01 | GYTFTNYW (SEQ ID NO: 1) | VYPGDGDT (SEQ ID NO: 2) | ARGFTAYGMDY (SEQ ID NO: 3) |

TABLE 4

Light Chain CDR Sequences

| Clone # | Germline | CDR1 | CDR2 | CDR3 |
|---|---|---|---|---|
| A | IGKV3D-20*01 | SSVSY (SEQ ID NO: 4) | DTS (SEQ ID NO: 5) | QQWSSNPLT (SEQ ID NO: 6) |
| B | IGKV3D-20*01 | SSVSY (SEQ ID NO: 4) | DTS (SEQ ID NO: 5) | QQWSSNPLT (SEQ ID NO: 6) |
| N | IGKV3D-20*01 | SSVSY (SEQ ID NO: 4) | DTS (SEQ ID NO: 5) | QQWSSNPLT (SEQ ID NO: 6) |
| K | IGKV3-11*01 | SSVSY (SEQ ID NO: 4) | DTS (SEQ ID NO: 5) | QQWSSNPLT (SEQ ID NO: 6) |

OTHER EMBODIMENTS

While a number of embodiments of this invention are described herein, the present disclosure and examples may be altered to provide other methods and compositions of this invention. Therefore, it will be appreciated that the scope of this invention is to be defined by the appended claims in addition to the specific embodiments that have been represented by way of example. All references cited herein are hereby incorporated by reference.

The invention claimed is:

1. A humanized anti-adhesion G protein-coupled receptor E2 (ADGRE2) antibody or antigen-binding fragment thereof comprising:
   a heavy chain complementarity determining region (HCDR) 1 comprising an amino acid sequence of GYTFTNYW (SEQ ID NO: 1), an HCDR2 comprising an amino acid sequence of VYPGDGDT (SEQ ID NO: 2), an HCDR3 comprising an amino acid sequence of ARGFTAYGMDY (SEQ ID NO: 3); and
   a light chain complementarity determining region (LCDR) 1 comprising an amino acid sequence of SSVSY (SEQ ID NO: 4), an LCDR2 comprising an amino acid sequence of DTS (SEQ ID NO: 5), and an LCDR3 comprising an amino acid sequence of QQWSSNPLT (SEQ ID NO: 6).

2. The humanized anti-ADGRE2 antibody or antigen-binding fragment thereof of claim 1, wherein the anti-ADGRE2 antibody or fragment thereof is a monoclonal antibody or a single-chain variable fragment (scFv).

3. The humanized anti-ADGRE2 antibody or antigen-binding fragment thereof of claim 2, wherein the anti-ADGRE2 antibody or fragment thereof is a scFv comprising, a heavy chain variable sequence, a GS-Linker, and a light chain variable sequence.

4. The humanized anti-ADGRE2 antibody or antigen-binding fragment of claim 3, wherein the scFv comprises a sequence having at least about 80% identity to:
   (a) SEQ ID NO: 19;
   (b) SEQ ID NO: 20;
   (c) SEQ ID NO: 21; or
   (d) SEQ ID NO: 22.

5. A nucleic acid sequence encoding the humanized anti-ADGRE2 antibody or antigen-binding fragment thereof of claim 1.

6. The humanized anti-ADGRE2 antibody or antigen-binding fragment thereof according to claim 1 comprising:
   (a) an immunoglobulin heavy chain variable ($V_H$) region comprising an amino acid sequence that is at least about 80% identical to SEQ ID NO: 7, and
   an immunoglobulin light chain variable ($V_L$) region comprising an amino acid sequence that is at least about 80% identical to SEQ ID NO: 14;
   (b) an immunoglobulin heavy chain variable ($V_H$) region comprising an amino acid sequence that is at least about 80% identical to SEQ ID NO: 9, and
   an immunoglobulin light chain variable ($V_L$) region comprising an amino acid sequence that is at least about 80% identical to SEQ ID NO: 10;
   (c) an immunoglobulin heavy chain variable ($V_H$) region comprising an amino acid sequence that is at least about 80% identical to SEQ ID NO: 11, and
   an immunoglobulin light chain variable ($V_L$) region comprising an amino acid sequence that is at least about 80% identical to SEQ ID NO: 12; or
   (d) an immunoglobulin heavy chain variable ($V_H$) region comprising an amino acid sequence that is at least about 80% identical to SEQ ID NO: 13, and
   an immunoglobulin light chain variable ($V_L$) region comprising an amino acid sequence that is at least about 80% identical to SEQ ID NO: 8;
   (e) an immunoglobulin heavy chain variable ($V_H$) region comprising an amino acid sequence that is at least about 80% identical to SEQ ID NO: 15, and
   an immunoglobulin light chain variable ($V_L$) region comprising an amino acid sequence that is at least about 80% identical to SEQ ID NO: 16;
   (f) an immunoglobulin heavy chain variable ($V_H$) region comprising an amino acid sequence that is at least about 80% identical to SEQ ID NO: 17, and
   an immunoglobulin light chain variable ($V_L$) region comprising an amino acid sequence that is at least about 80% identical to SEQ ID NO: 18; or
   (g) an immunoglobulin heavy chain variable (VH) region comprising an amino acid sequence that is at least about 80% identical to SEQ ID NO: 30, and
   an immunoglobulin light chain variable (VL) region comprising an amino acid sequence that is at least about 80% identical to SEQ ID NO: 31.

7. The humanized anti-ADGRE2 antibody or antigen-binding fragment of claim 4, wherein the scFv comprises a sequence selected from:
   (a) SEQ ID NO: 19;
   (b) SEQ ID NO: 20;
   (c) SEQ ID NO: 21; or
   (d) SEQ ID NO: 22.

8. The humanized anti-ADGRE2 antibody or antigen-binding fragment thereof according to claim 6 comprising:
   (a) an immunoglobulin heavy chain variable ($V_H$) region comprising an amino acid sequence of SEQ ID NO: 7, and
   an immunoglobulin light chain variable ($V_L$) region comprising an amino acid sequence of SEQ ID NO: 14;

(e) an immunoglobulin heavy chain variable ($V_H$) region comprising an amino acid sequence of SEQ ID NO: 9, and
an immunoglobulin light chain variable ($V_L$) region comprising an amino acid sequence of SEQ ID NO: 10;
(f) an immunoglobulin heavy chain variable ($V_H$) region comprising an amino acid sequence of SEQ ID NO: 11, and
an immunoglobulin light chain variable ($V_L$) region comprising an amino acid sequence of SEQ ID NO: 12; or
(g) an immunoglobulin heavy chain variable ($V_H$) region comprising an amino acid sequence of SEQ ID NO: 13, and
an immunoglobulin light chain variable ($V_L$) region comprising an amino acid sequence of SEQ ID NO: 8;
(e) an immunoglobulin heavy chain variable ($V_H$) region comprising an amino acid sequence of SEQ ID NO: 15, and
an immunoglobulin light chain variable ($V_L$) region comprising an amino acid sequence of SEQ ID NO: 16;
(f) an immunoglobulin heavy chain variable ($V_H$) region comprising an amino acid sequence of SEQ ID NO: 17, and
an immunoglobulin light chain variable ($V_L$) region comprising an amino acid sequence of SEQ ID NO: 18; or
(g) an immunoglobulin heavy chain variable (VH) region comprising an amino acid sequence of SEQ ID NO: 30, and
an immunoglobulin light chain variable (VL) region comprising an amino acid sequence of SEQ ID NO: 31.

* * * * *